US011427319B2

(12) United States Patent
Deng et al.

(10) Patent No.: US 11,427,319 B2
(45) Date of Patent: Aug. 30, 2022

(54) FOLDABLE MULTI-ROTOR AERIAL VEHICLE

(71) Applicant: SZ DJI TECHNOLOGY CO., LTD., Shenzhen (CN)

(72) Inventors: Yumian Deng, Shenzhen (CN); Rongming Xiong, Shenzhen (CN); Tao Zhao, Shenzhen (CN); Yin Tang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 109 days.

(21) Appl. No.: 16/849,518

(22) Filed: Apr. 15, 2020

(65) Prior Publication Data

US 2020/0377212 A1 Dec. 3, 2020

Related U.S. Application Data

(63) Continuation of application No. 15/991,125, filed on May 29, 2018, now Pat. No. 10,625,855, which is a
(Continued)

(51) Int. Cl.
*B64C 39/02* (2006.01)
*B64C 1/30* (2006.01)
*B64C 25/52* (2006.01)

(52) U.S. Cl.
CPC ............. *B64C 39/024* (2013.01); *B64C 1/30* (2013.01); *B64C 25/52* (2013.01);
(Continued)

(58) Field of Classification Search
CPC ........ B64C 2201/024; B64C 2201/027; B64C 2201/108; B64C 2201/165; B64C 2201/20
See application file for complete search history.

(56) References Cited

U.S. PATENT DOCUMENTS 2,420,796 A 5/1947 Raschke
3,058,422 A 10/1962 Olsson
(Continued)

FOREIGN PATENT DOCUMENTS

CA 2997790 A1 11/2014
CN 100413756 C 8/2008
(Continued)

OTHER PUBLICATIONS

The World Intellectual Property Organization (WIPO) International Search Report and Written Opinion for PCT/CN2016/074302 dated Nov. 25, 2016 9 Pages.
(Continued)

*Primary Examiner* — Philip J Bonzell
(74) *Attorney, Agent, or Firm* — Anova Law Group, PLLC

(57) ABSTRACT

An unmanned aerial vehicle includes a central body and a plurality of arms extendable from the central body. Each of the plurality of arms is configured to support one or more propulsion units. Each of the plurality of arms is configured to transform between (1) a flight configuration in which the arm is extending away from the central body and (2) a compact configuration in which the arm is folded against the central body. At least one of the plurality of arms is configured to rotate about a first rotational axis and at least a portion of the at least one of the plurality of arms is configured to rotate about a second rotational axis not parallel to the first rotational axis.

19 Claims, 27 Drawing Sheets

Related U.S. Application Data continuation of application No. PCT/CN2016/074302, filed on Feb. 22, 2016.

(52) U.S. Cl.
CPC .. *B64C 2201/024* (2013.01); *B64C 2201/027* (2013.01); *B64C 2201/108* (2013.01); *B64C 2201/20* (2013.01)

(56) References Cited

U.S. PATENT DOCUMENTS

| | | | |
|---|---|---|---|
| 3,410,506 | A | 11/1968 | Hayes |
| 5,820,072 | A | 10/1998 | Na et al. |
| 7,478,995 | B2 | 1/2009 | Louis et al. |
| 7,854,410 | B2 | 12/2010 | Fanucci et al. |
| 8,052,081 | B2 | 11/2011 | Olm et al. |
| 8,292,215 | B2 | 10/2012 | Olm et al. |
| 8,453,962 | B2 | 6/2013 | Shaw |
| 9,260,184 | B2 | 2/2016 | Olm et al. |
| 9,764,829 | B1 | 9/2017 | Beckman et al. |
| 9,878,786 | B2 * | 1/2018 | Chan ............... B64C 27/52 |
| 9,919,797 | B2 * | 3/2018 | Chan ............... B64C 27/08 |
| 10,017,237 | B2 | 7/2018 | Hutson |
| 10,035,581 | B2 | 7/2018 | Wood |
| 10,632,804 | B2 * | 4/2020 | Braithwaite ........ B63G 8/001 |
| 2010/0108801 | A1 | 5/2010 | Olm et al. |
| 2012/0138732 | A1 | 6/2012 | Olm et al. |
| 2012/0292436 | A1 | 11/2012 | Karem |
| 2014/0061362 | A1 | 3/2014 | Olm et al. |
| 2015/0259066 | A1 | 9/2015 | Johannesson et al. |
| 2015/0321755 | A1 | 11/2015 | Martin et al. |
| 2016/0159471 | A1 * | 6/2016 | Chan ............... B64C 27/08 244/39 |
| 2016/0304199 | A1 * | 10/2016 | Chan ............... B64C 27/08 |
| 2016/0340028 | A1 | 11/2016 | Datta |
| 2018/0105254 | A1 * | 4/2018 | Tian ............... B64C 27/08 |
| 2018/0312023 | A1 * | 11/2018 | Braithwaite ........ B29C 64/209 |
| 2019/0084673 | A1 * | 3/2019 | Chen ............... B64C 39/024 |
| 2020/0079495 | A1 * | 3/2020 | Yang ............... B64C 1/16 |

FOREIGN PATENT DOCUMENTS

| | | | |
|---|---|---|---|
| CN | 101391651 | A | 3/2009 |
| CN | 201249818 | Y | 6/2009 |
| CN | 201365264 | Y | 12/2009 |
| CN | 101712379 | A | 5/2010 |
| CN | 101992854 | A | 3/2011 |
| CN | 201891727 | U | 7/2011 |
| CN | 102224349 | A | 10/2011 |
| CN | 102941920 | A | 2/2013 |
| CN | 103318405 | A | 9/2013 |
| CN | 203461110 | U | 3/2014 |
| CN | 103693194 | A | 4/2014 |
| CN | 203528812 | U | 4/2014 |
| CN | 103979107 | A | 8/2014 |
| CN | 204056294 | U | 12/2014 |
| CN | 104260878 | A | 1/2015 |
| CN | 204078065 | U | 1/2015 |
| CN | 104386249 | A | 3/2015 |
| CN | 204210727 | U | 3/2015 |
| CN | 204223178 | U | 3/2015 |
| CN | 204279918 | U | 4/2015 |
| CN | 104648664 | A | 5/2015 |
| CN | 204334686 | U | 5/2015 |
| CN | 104691737 | A | 6/2015 |
| CN | 104691749 | A | 6/2015 |
| CN | 204368421 | U | 6/2015 |
| CN | 104859836 | A | 8/2015 |
| CN | 104859837 | A | 8/2015 |
| CN | 204568050 | U | 8/2015 |
| CN | 204623830 | U | 9/2015 |
| CN | 204674824 | U | 9/2015 |
| CN | 204713418 | U | 10/2015 |
| CN | 105035303 | A | 11/2015 |
| CN | 105035317 | A | 11/2015 |
| CN | 105035318 | A | 11/2015 |
| CN | 105059528 | A | 11/2015 |
| CN | 204750552 | U | 11/2015 |
| CN | 204776013 | U | 11/2015 |
| CN | 105270613 | A | 1/2016 |
| CN | 204956909 | U | 1/2016 |
| CN | 204979215 | U | 1/2016 |
| CN | 204998749 | U | 1/2016 |
| CN | 204998752 | U | 1/2016 |
| CN | 205010478 | U | 2/2016 |
| CN | 205554560 | U | 9/2016 |
| CN | 106143870 | A * | 11/2016 |
| DE | 247187 | A1 | 7/1987 |
| DE | 20102208 | U1 | 6/2001 |
| EP | 2233393 | A2 | 9/2010 |
| FR | 2909972 | A1 | 6/2008 |
| JP | H04324099 | A | 11/1992 |
| JP | 2015137092 | A | 7/2015 |
| JP | 2015223995 | A | 12/2015 |
| KR | 101527544 | B1 | 6/2015 |
| KR | 101589263 | B1 | 1/2016 |
| KR | 101592290 | B1 | 2/2016 |
| WO | 2010015866 | A2 | 2/2010 |
| WO | 2014059549 | A1 | 4/2014 |
| WO | 2015200209 | A1 | 12/2015 |
| WO | 2017120654 | A1 | 7/2017 |

OTHER PUBLICATIONS

The World Intellectual Property Organization (WIPO) International Search Report and Written Opinion for PCT/CN2016/078404 dated Nov. 25, 2016 6 pages.

The World Intellectual Property Organization (WIPO) International Search Report and Written Opinion for PCT/CN2016/078403 dated Nov. 30, 2016 6 pages.

The World Intellectual Property Organization (WIPO) International Search Report and Written Opinion for PCT/CN2016/078399 dated Nov. 9, 2016 8 pages.

The World Intellectual Property Organization (WIPO) International Search Report and Written Opinion for PCT/CN2016/080748 dated Jul. 4, 2016 5 pages.

* cited by examiner

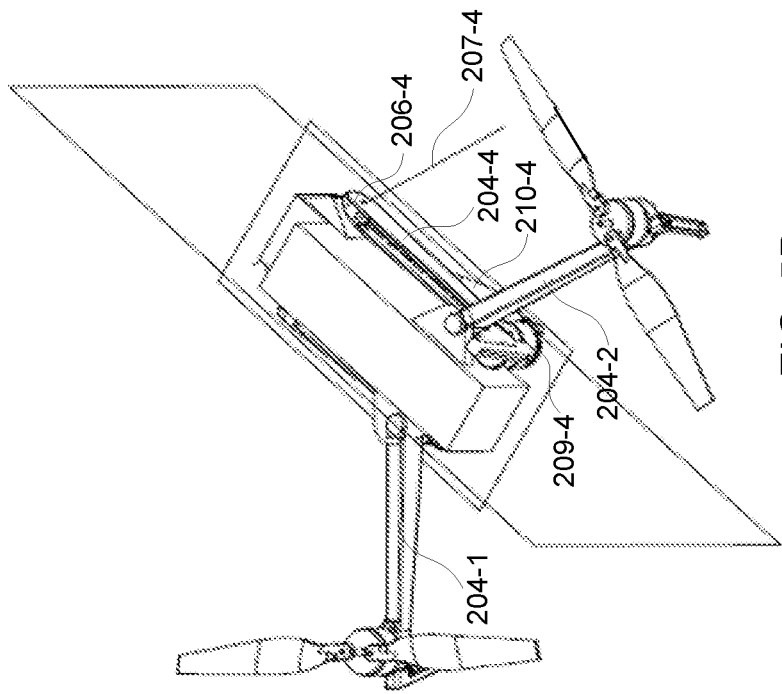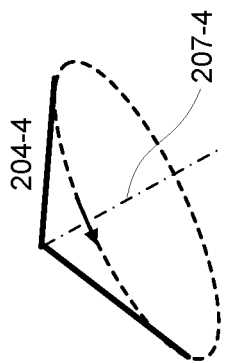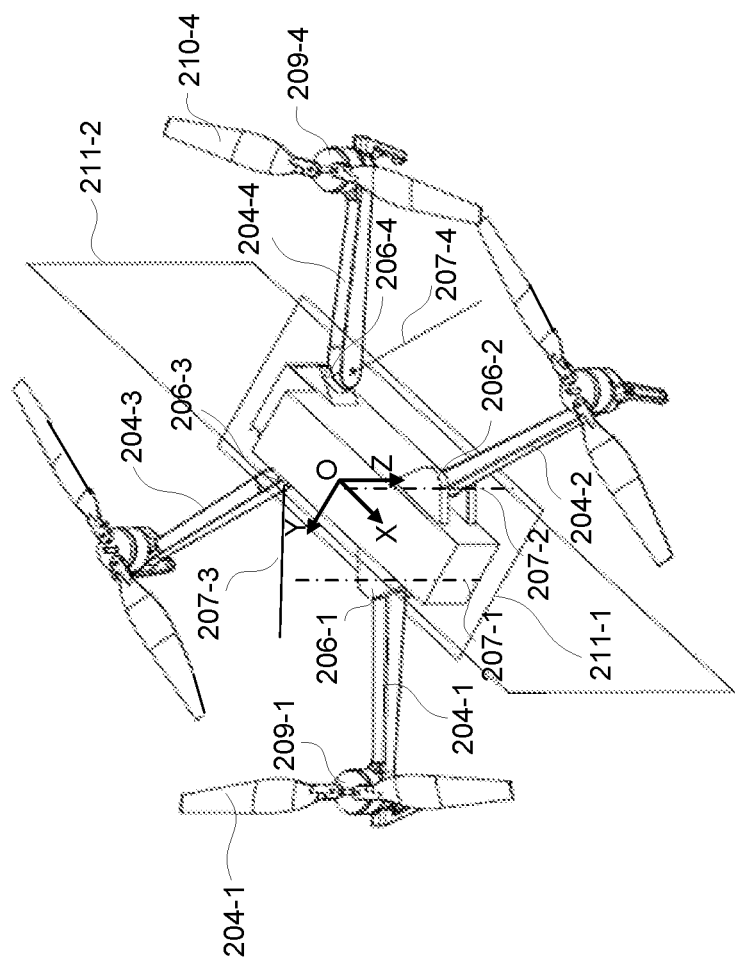
FIG. 5B
FIG. 5C
FIG. 5A

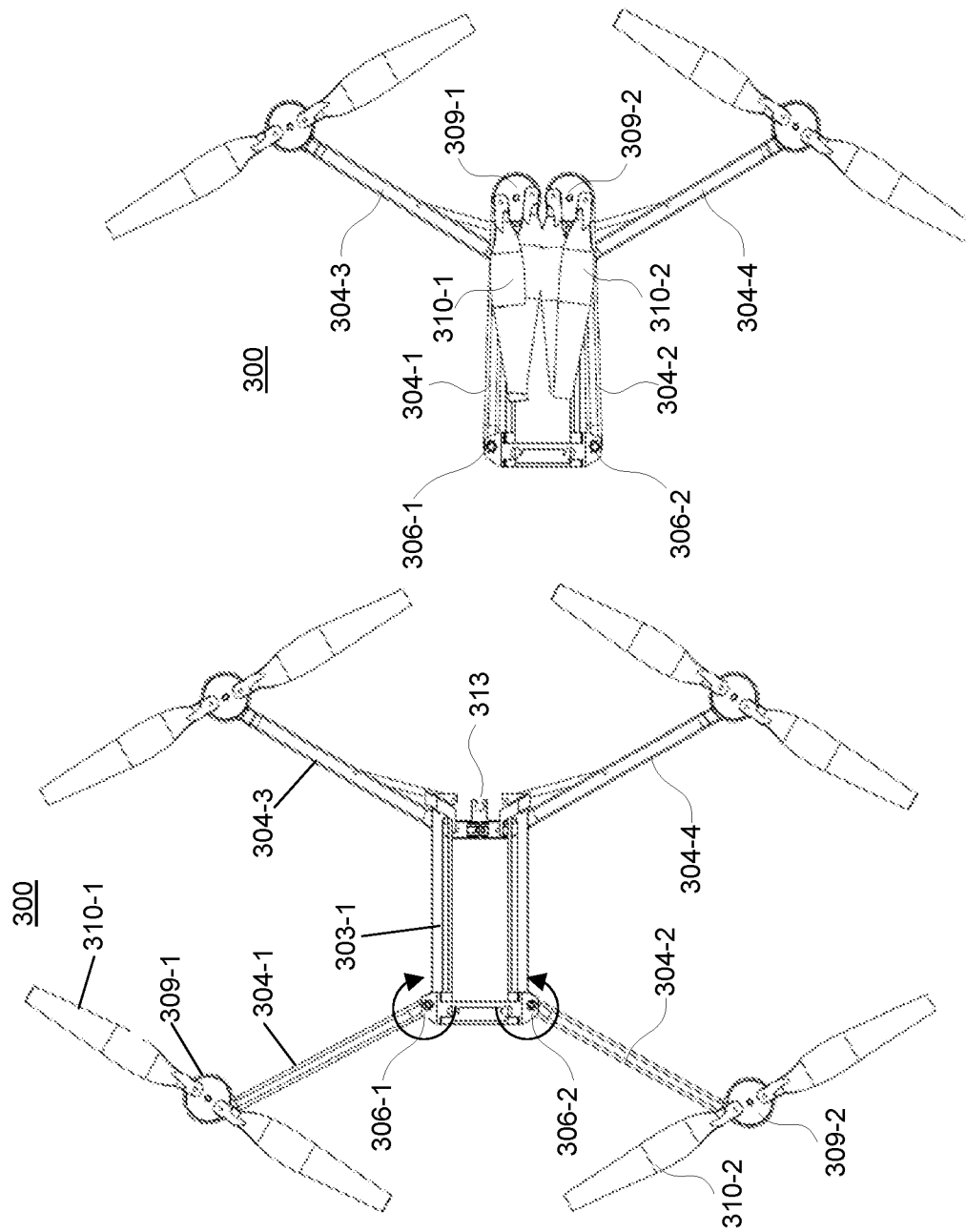

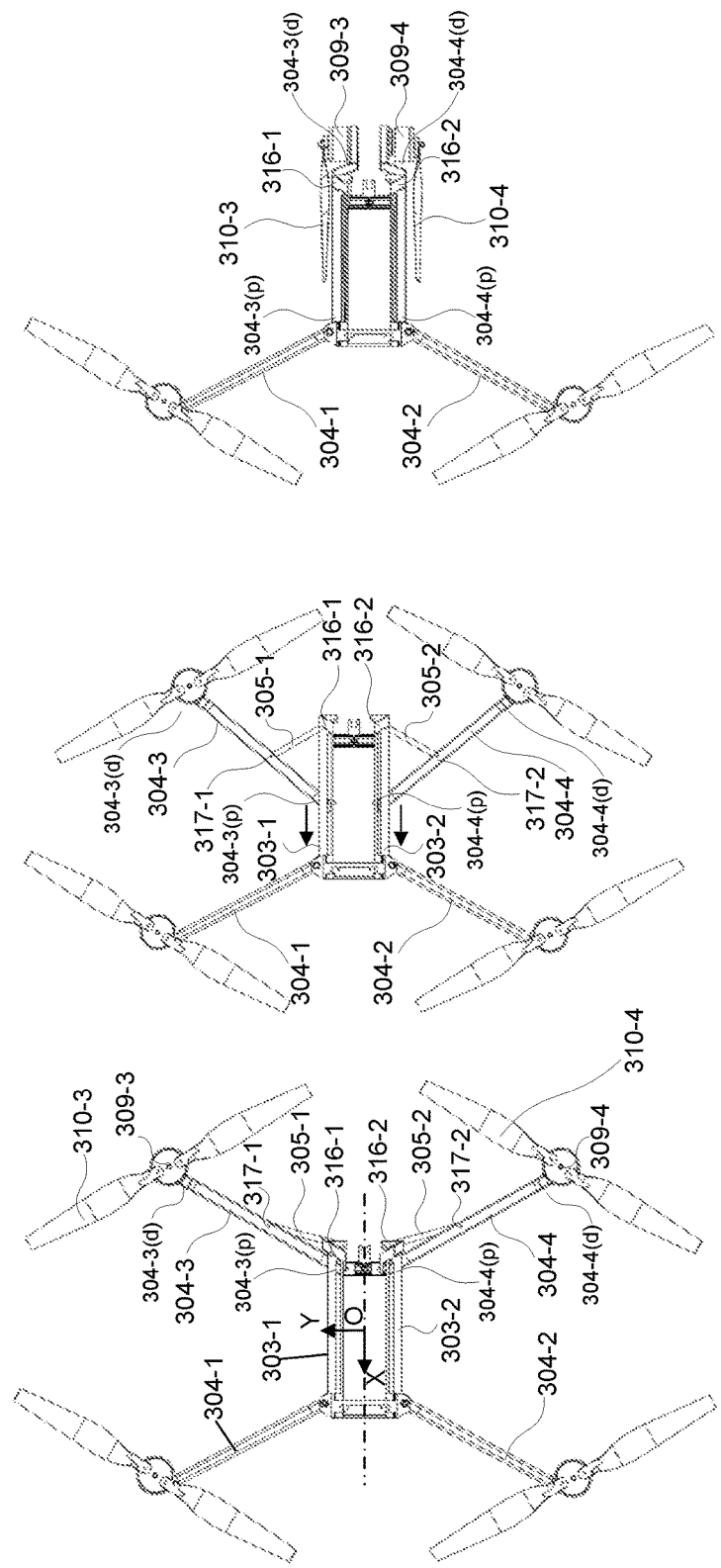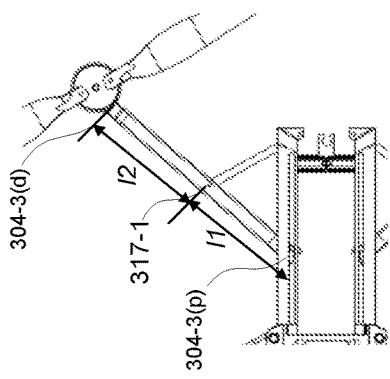

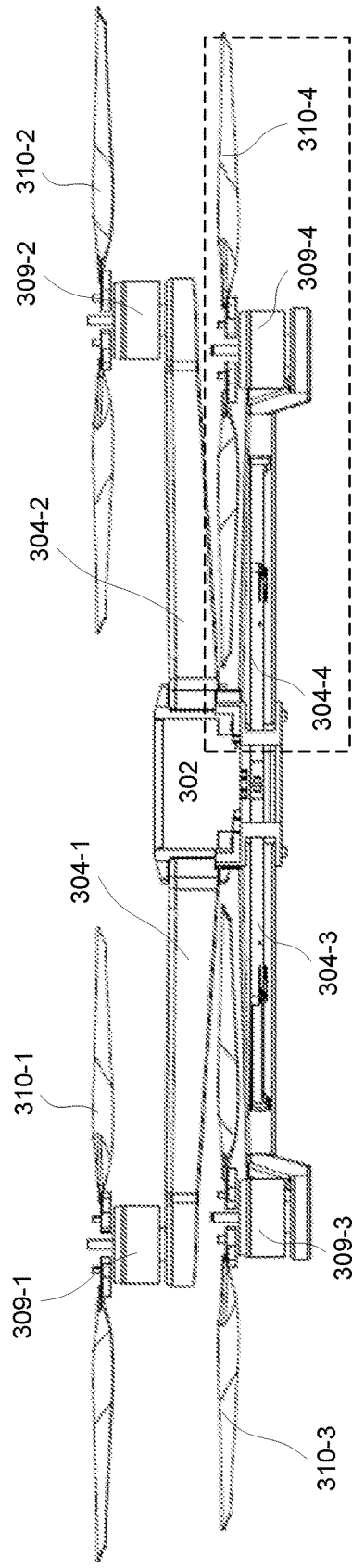
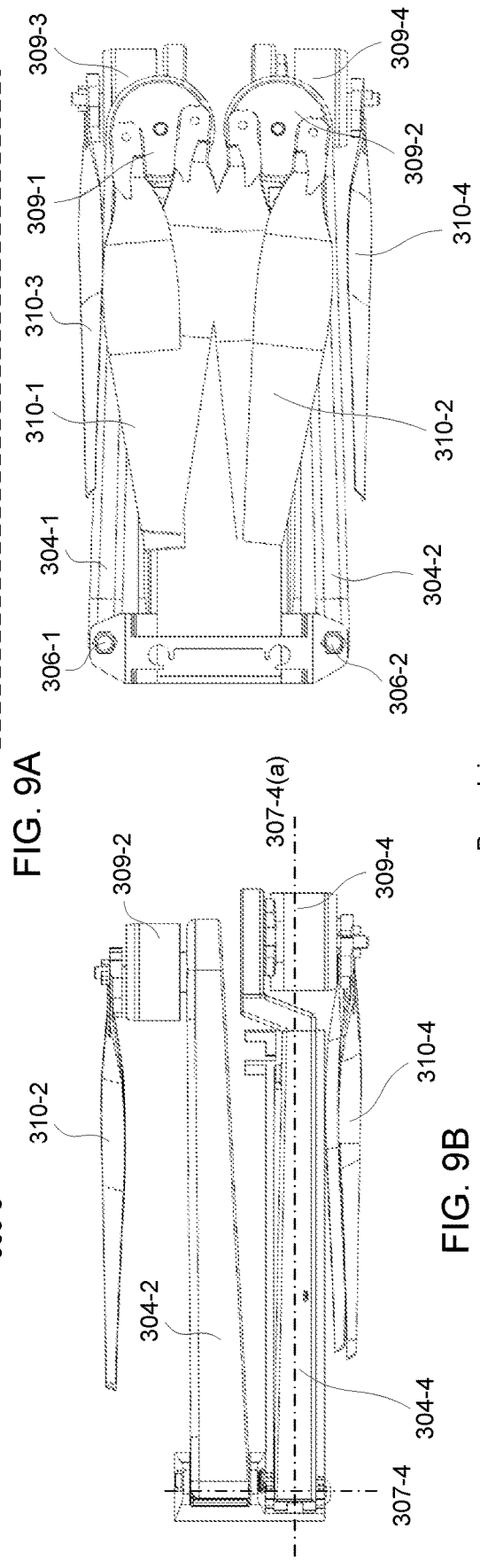
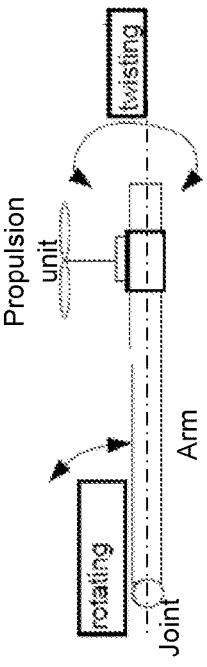

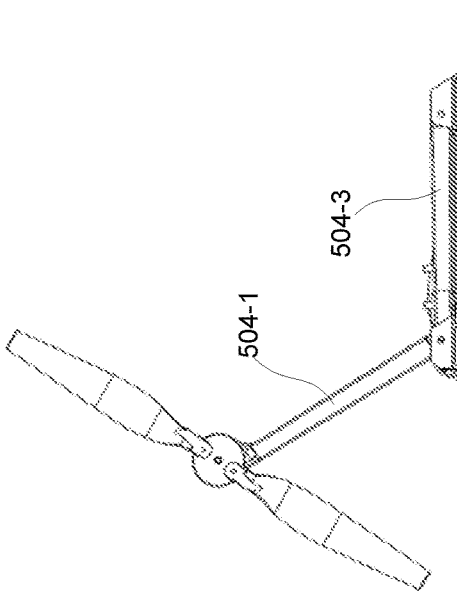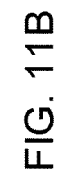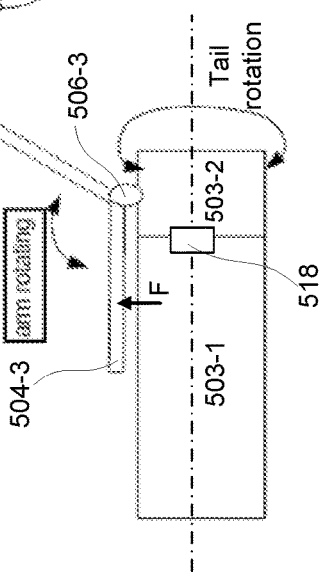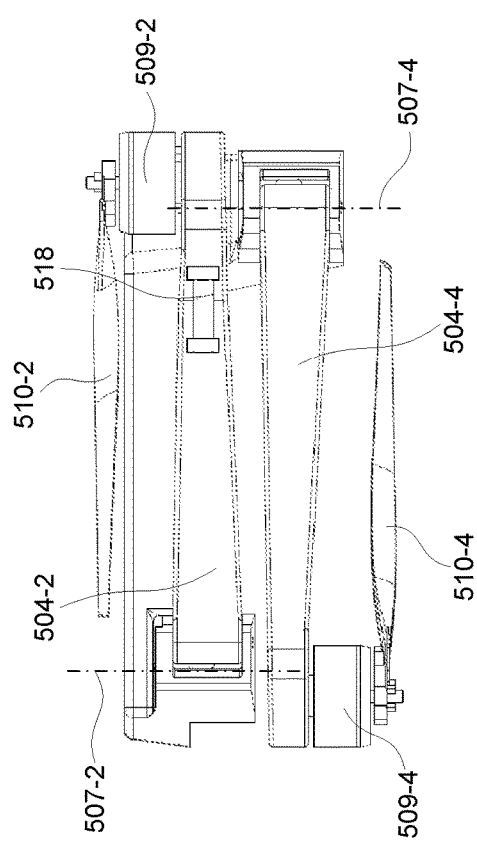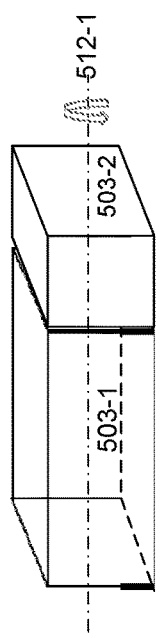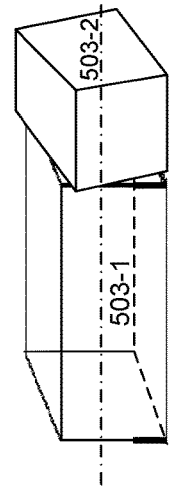
FIG. 11A  FIG. 11B  FIG. 11C  FIG. 11D

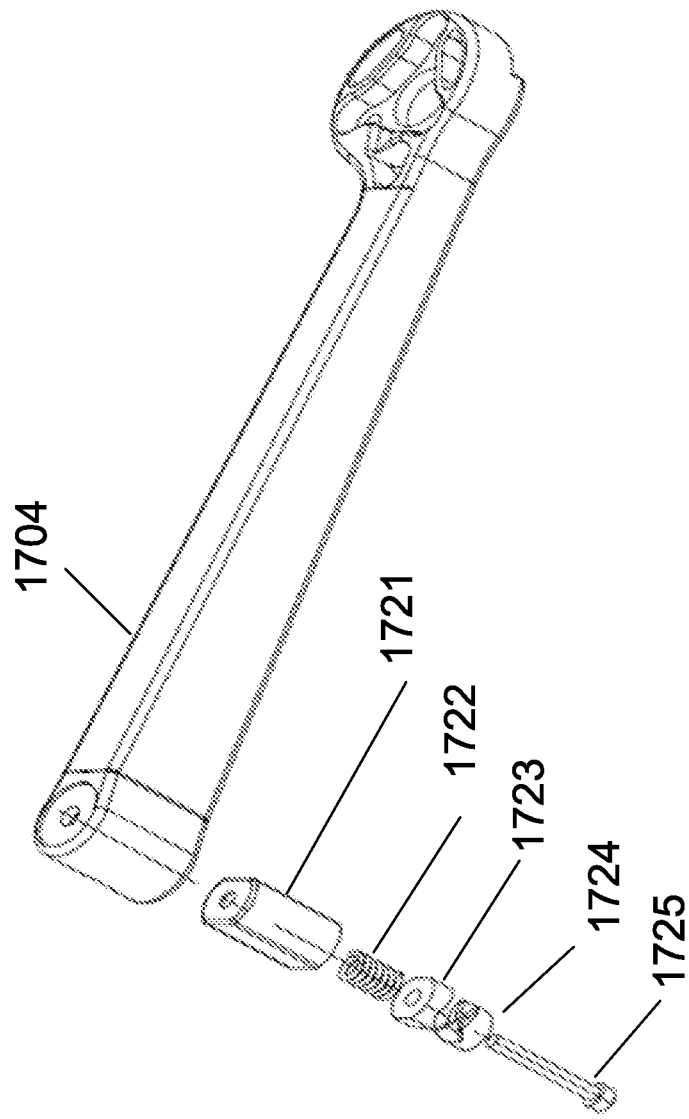
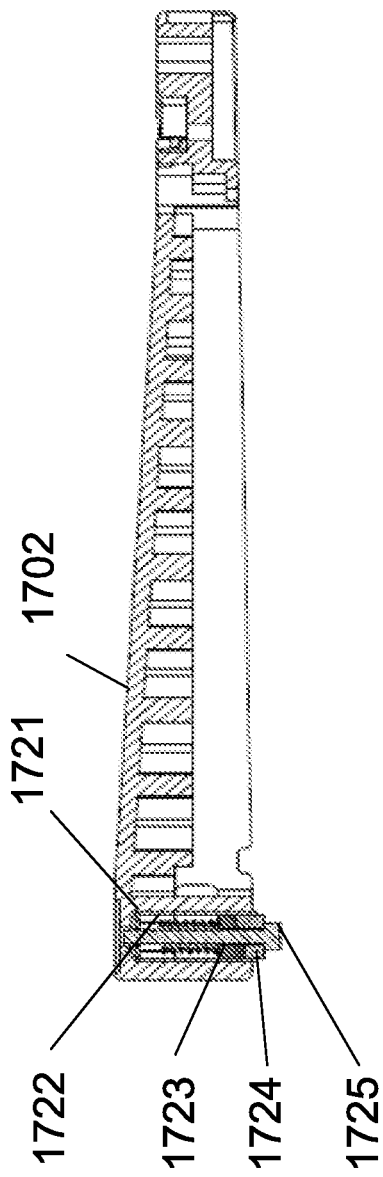
FIG. 17A
FIG. 17B

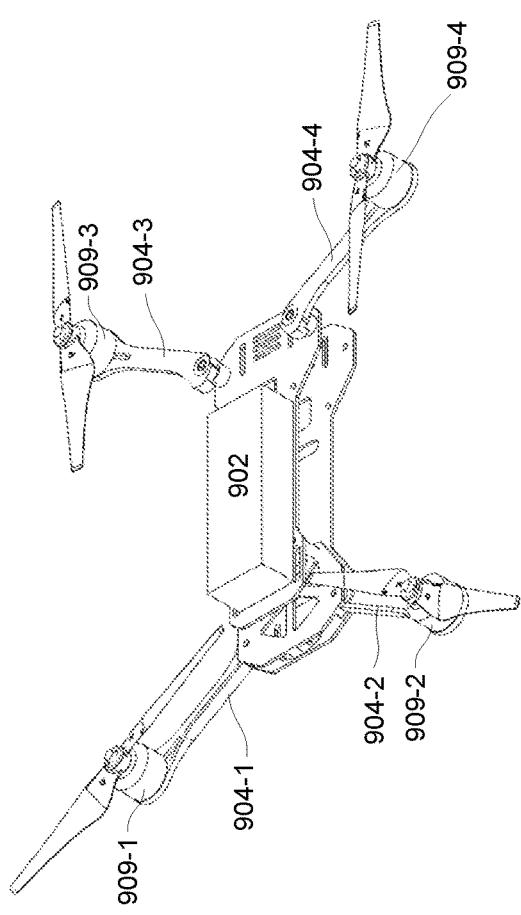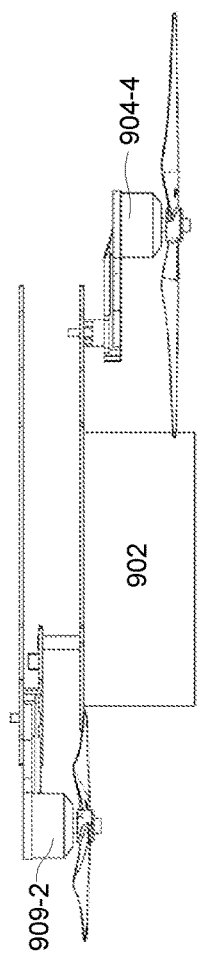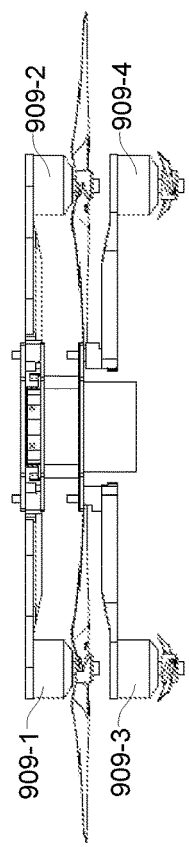
FIG. 23A
FIG. 23B
FIG. 23C

FOLDABLE MULTI-ROTOR AERIAL VEHICLE

CROSS-REFERENCE TO RELATED APPLICATIONS

This application is a continuation application of application Ser. No. 15/991,125, filed on May 29, 2018, which is a continuation application of International Application No. PCT/CN2016/074302, filed on Feb. 22, 2016, the entire contents of both of which are incorporated herein by reference.

BACKGROUND

Aerial vehicles such as unmanned aerial vehicles (UAVs) can be used for performing surveillance, reconnaissance, and exploration tasks for a great variety of military and civilian applications. UAVs may be outfitted with a functional payload, such as sensors for collecting data from the surrounding environment. For example, remote-controlled UAVs, which include fixed-wing aircraft and multi-rotor aircraft, can be used to provide aerial imagery of otherwise inaccessible environments. The design of UAVs involves tradeoffs between vehicle size, weight, portability, payload capacity, energy consumption, and cost.

SUMMARY

In some instances, an aerial vehicle may comprise a plurality of arms extending in an outward configuration from a central body of the aerial vehicle. A propulsion unit comprising one or more rotor blades may be disposed at a distal end of each arm, and configured to generate a lift force for the aerial vehicle. The outward extension of the arms and the rotor blades typically increase a volume occupied by the aerial vehicle. Increased form factor may reduce the portability of, for example, unmanned aerial vehicles (UAVs).

To improve form factor and portability, an aerial vehicle may include one or more foldable sections that can be folded to the sides of the airframe, and that can extend out during flight or operation. The foldable sections may include arms that are movable relative to the airframe. However, a width of the airframe may be constrained by the size of the propulsion units supported by the arms. In some cases, the head and tail portions of the airframe may need to be widened in order to accommodate the rotatable joints of the foldable sections. The widening of the head and tail portions, while maintaining a narrow width of the mid-portion of the airframe, may affect the appearance of the aerial vehicle and aesthetic factor. The irregularity in the shape/size of the airframe may result in poor optimization in usage of the internal space within the airframe.

Additionally, existing devices or methods for foldable aerial vehicles typically utilize locking mechanisms to secure folded and/or extended arms and/or blades. The locking mechanisms may be manual (e.g., requiring a user to manually lock the arms and/or blades), thus increasing the complexity and time spent on folding/retracting the arms and/or blades. Additionally, the locking mechanisms may have a number of moving parts, that may be subject to reliability issues under constant use over time. Furthermore, the locking mechanisms may increase the weight of the aerial vehicle.

Accordingly, there exists a considerable need for systems, apparatus, and methods that enable an aerial vehicle to transform between a compact configuration and a flight configuration without substantially increasing the dimensions of the airframe, and that improves the form factor and portability of the aerial vehicle.

The present disclosure addresses this need and provides related advantages as well.

According to an aspect of the disclosure, an unmanned aerial vehicle (UAV) comprises a central body, and a plurality of arms extendable from the central body. Each arm of the plurality of arms is configured to support one or more propulsion units. Each arm of the plurality of arms is configured to transform between (1) a flight configuration wherein the arm is extending away from the central body, and (2) a compact configuration wherein the arm is folded against the central body. At least one arm of the plurality of arms is arranged such that its propulsion unit carries one or more rotor blades facing a first direction when the arm is in the flight configuration, and the one or more rotor blades facing a second direction when the arm is in the compact configuration, wherein the second direction is different from the first direction.

Further aspects of the disclosure may be directed to a method of assembling an unmanned aerial vehicle (UAV). The method comprises providing a central body of the UAV, and attaching to the central body a plurality of arms that are extendable from the central body. Each arm of the plurality of arms is configured to support one or more propulsion units, thereby assembling the UAV. Each arm of the plurality of arms is configured to transform between (1) a flight configuration wherein the arm is extending away from the central body, and (2) a compact configuration wherein the arm is folded against the central body. At least one arm of the plurality of arms is arranged such that its propulsion unit carries one or more rotor blades facing a first direction when the arm is in the flight configuration, and the one or more rotor blades facing a second direction when the arm is in the compact configuration, wherein the second direction is different from the first direction.

A kit may be provided in accordance with an additional aspect of the disclosure. The kit comprises a plurality of arms that are configured to be attached to a central body of an unmanned aerial vehicle (UAV). Each arm of the plurality of arms is configured to support one or more propulsion units. The kit further comprises instructions for assembling the UAV, such that when the UAV is assembled according to the instructions, the assembled UAV is characterized in that: each of the plurality of arms when attached to the central body is configured to transform between (1) a flight configuration wherein the arm is extending away from the central body, and (2) a compact configuration wherein the arm is folded against the central body, and wherein at least one arm of the plurality of arms is arranged such that its propulsion unit carries one or more rotor blades facing a first direction when the arm is in the flight configuration, and the one or more rotor blades supported facing a second direction when the arm is in the compact configuration, wherein the second direction is different from the first direction.

According to another aspect of the disclosure, an unmanned aerial vehicle (UAV) comprises a central body, and a plurality of arms extendable from the central body. Each arm of the plurality of arms is configured to support one or more propulsion units. At least one of the plurality of arms having a proximal end and a distal end relative to the central body is configured to transform between (1) a flight configuration wherein the arm is extending away from the central body, and (2) a compact configuration wherein the arm is folded against the central body. The proximal end of the at least one of the plurality of arms is located at a first location when the arm is extended, and the distal end of the arm is located at or nearby the first location when the arm is in the compact configuration.

Further aspects of the disclosure may be directed to a method of assembling an unmanned aerial vehicle (UAV). The method comprises providing a central body of the UAV, and attaching to the central body a plurality of arms extendable from the central body. Each arm of the plurality of arms is configured to support one or more propulsion units. At least one of the plurality of arms having a proximal end and a distal end relative to the central body is configured to transform between (1) a flight configuration wherein the arm is extending away from the central body, and (2) a compact configuration wherein the arm is folded against the central body. A proximal end of the at least one of the plurality of arms is located at a first location when the arm is extended, and the distal end of the arm is located at or nearby the first location when the arm is in the compact configuration.

A kit may be provided in accordance with an additional aspect of the disclosure. The kit comprises a plurality of arms that are configured to be attached to a central body of an unmanned aerial vehicle (UAV). Each arm of the plurality of arms is configured to support one or more propulsion units. The kit further comprises instructions for assembling the UAV, such that when the UAV is assembled according to the instructions, the assembled UAV is characterized in that: at least one of the plurality of arms having a proximal end and a distal end relative to the central body is configured to transform between (1) a flight configuration wherein the arm is extending away from the central body, and (2) a compact configuration wherein the arm is folded against the central body, and wherein a proximal end of the at least one of the plurality of arms is located at a first location when the arm is extended, and the distal end of the arm is located at or nearby the first location when the arm is in the compact configuration.

According to another aspect of the disclosure, an unmanned aerial vehicle (UAV) comprises a central body, and a plurality of arms extendable from the central body. Each arm of the plurality of arms is configured to support one or more propulsion units. Each arm of the plurality of arms is configured to transform between (1) a flight configuration wherein the arm is extending away from the central body, and (2) a compact configuration wherein the arm is folded against the central body. At least one of the plurality of arms is configured to rotate about a first rotational axis and then about a second rotational axis not parallel to the first rotational axis when transforming between the flight configuration and the compact configuration.

Further aspects of the disclosure may be directed to a method of assembling an unmanned aerial vehicle (UAV). The method comprises providing a central body of the UAV, and attaching to the central body a plurality of arms extendable from the central body. Each arm of the plurality of arms is configured to support one or more propulsion units. Each arm of the plurality of arms is configured to transform between (1) a flight configuration wherein the arm is extending away from the central body, and (2) a compact configuration wherein the arm is folded against the central body. At least one of the plurality of arms is configured to rotate about a first rotational axis and then about a second rotational axis not parallel to the first rotational axis when transforming between the flight configuration and the compact configuration.

A kit may be provided in accordance with an additional aspect of the disclosure. The kit comprises a plurality of arms that are configured to be attached to a central body of an unmanned aerial vehicle (UAV). Each arm of the plurality of arms is configured to support one or more propulsion units. The kit further comprises instructions for assembling the UAV, such that when the UAV is assembled according to the instructions, the assembled UAV is characterized in that: each of the plurality of arms is configured to transform between (1) a flight configuration wherein the arm is extending away from the central body, and (2) a compact configuration wherein the arm is folded against the central body, and at least one of the plurality of arms is configured to rotate about a first rotational axis and then about a second rotational axis not parallel to the first rotational axis when transforming between the flight configuration and the compact configuration.

According to another aspect of the disclosure, an unmanned aerial vehicle (UAV) comprises a central body, and a plurality of arms extendable from the central body. Each arm of the plurality of arms is configured to support one or more propulsion units. Each arm of the plurality of arms is configured to transform between (1) a flight configuration wherein the arm is extending away from the central body, and (2) a compact configuration wherein the arm is folded against the central body. At least one of the plurality of arms is configured to be rotated about a first rotational axis that causes a distal end of the at least one of the plurality of arms to move both horizontally and vertically relative to the central body when transforming between the flight configuration and compact configuration.

Further aspects of the disclosure may be directed to a method of assembling an unmanned aerial vehicle (UAV). The method comprises providing a central body of the UAV, and attaching to the central body a plurality of arms extendable from the central body. Each arm of the plurality of arms is configured to support one or more propulsion units. Each arm of the plurality of arms is configured to transform between (1) a flight configuration wherein the arm is extending away from the central body, and (2) a compact configuration wherein the arm is folded against the central body. At least one of the plurality of arms is configured to be rotated about a first rotational axis that causes a distal end of the at least one of the plurality of arms to move both horizontally and vertically relative to the central body when transforming between the flight configuration and compact configuration.

A kit may be provided in accordance with an additional aspect of the disclosure. The kit comprises a plurality of arms that are configured to be attached to a central body of an unmanned aerial vehicle (UAV). Each arm of the plurality of arms is configured to support one or more propulsion units. The kit further comprises instructions for assembling the UAV, such that when the UAV is assembled according to the instructions, the assembled UAV is characterized in that: each of the plurality of arms is configured to transform between (1) a flight configuration wherein the arm is extending away from the central body, and (2) a compact configuration wherein the arm is folded against the central body, and at least one of the plurality of arms is configured to be rotated about a first rotational axis that causes a distal end of the at least one of the plurality of arms to move both horizontally and vertically relative to the central body when transforming between the flight configuration and compact configuration.

According to an aspect of the disclosure, an unmanned aerial vehicle (UAV) comprises a central body, and a plurality of arms extendable from the central body. Each arm of the plurality of arms is configured to support one or more propulsion units. Extension of at least one arm beyond a threshold position triggers operation of one or more components on board said UAV or an external device in communication with the UAV.

According to an aspect of the disclosure, an unmanned aerial vehicle (UAV) comprises a central body, and a plurality of arms extendable from the central body. Each arm of the plurality of arms is configured to support one or more propulsion units each comprising one or more rotor blades. Extension of at least one arm of the plurality is effectuated by a reaction force against the arm by the central body when the one or more rotor blades act upon and push against the central body.

A kit may be provided in accordance with an additional aspect of the disclosure. The kit comprises a plurality of arms that are configured to be attached to a central body of an unmanned aerial vehicle (UAV). Each arm of the plurality of arms is configured to support one or more propulsion units each comprising one or more rotor blades. The kit further includes instructions for assembling the UAV, such that when the UAV is assembled according to the instructions, the assembled UAV is characterized in that it comprises: the plurality of arms that are extendable from the central body, wherein extension of at least one arm of the plurality of arms is effectuated by a reaction force against the arm by the central body when the one or more rotor blades act upon and push against the central body.

Further aspects of the disclosure may be directed to a method of transformation of an unmanned aerial vehicle (UAV). The method may comprise providing a UAV of any one of the above embodiments, and operating the UAV such that the UAV adopts the flight configuration and the compact configuration.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIGS. 5A-5C illustrate different schematic views of the UAV of FIGS. 3A-3C as the third and fourth arms transform to a compact configuration by rotating about axes that are disposed at an angle to a roll, pitch, and/or yaw axis of the UAV, in accordance with an embodiment;

FIGS. 7A and 7B illustrate different schematic views of a UAV as a first arm and a second arm of the UAV transform from a flight configuration to a compact configuration via a rotational motion, in accordance with an embodiment;

FIGS. 8A-8D illustrate different schematic views of the UAV of FIGS. 7A and 7B as the third and fourth arms transform from a flight configuration to a compact configuration via a rotational and translational motion, in accordance with an embodiment;

FIGS. 9A-9D illustrate different schematic views of the UAV of FIGS. 8A-8D whereby at least one arm is configured to rotate about two non-parallel axes, in accordance with an embodiment;

FIGS. 11A-11D illustrate different schematic views of a UAV as a first pair of arms transforms from a compact configuration to a flight configuration when a portion of a central body of the UAV moves relative to another portion of the central body, in accordance with an embodiment;

FIGS. 17A and 17B illustrate different schematic views of an arm and a joint comprising one or more elastic joint elements, in accordance with an embodiment;

FIGS. 23A-23C illustrate different schematic views of the UAV of FIGS. 15A and 15B when the arms are in the flight configuration;

DETAILED DESCRIPTION

Figure 1A:
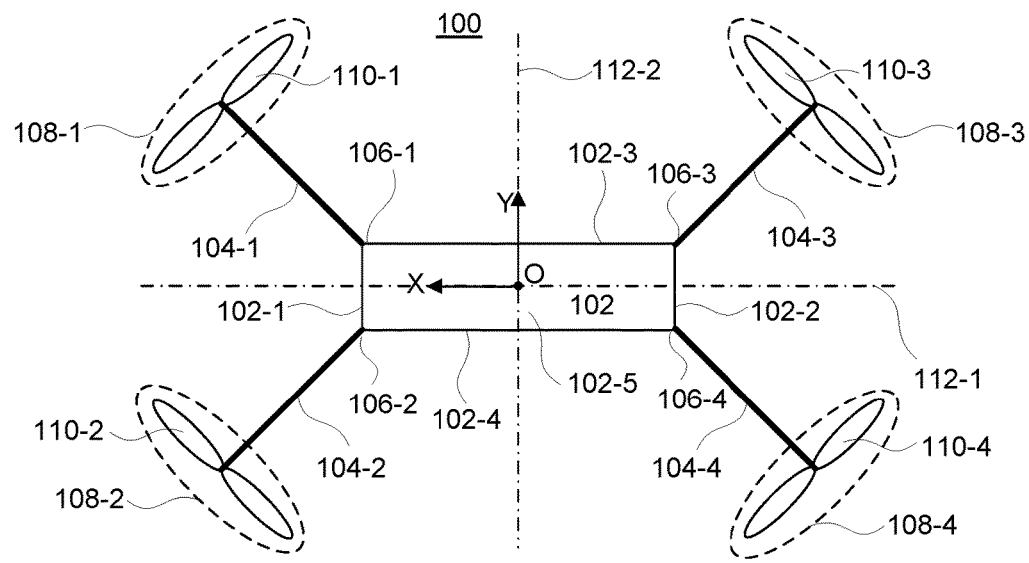
FIGS. 1A-1E illustrate different schematic views of an unmanned aerial vehicle (UAV) as its arms transform from a flight configuration to various compact configurations, in accordance with embodiments.

Systems, apparatus, and methods for improving portability and form factor of an aerial vehicle are provided. In some embodiments, the aerial vehicle can be folded into a compact configuration when not in use or operation, and transformed to a flight configuration when the aerial vehicle is in operation or ready for operation. The compact configuration is designed to improve the form factor of the aerial vehicle, for example by optimizing usage of space around a central body of the aerial vehicle to store one or more foldable sections (e.g., arms and/or propulsion units) when they are not in use. Accordingly, the portability of the aerial vehicle can be improved, and irregularities in the shape of the aerial vehicle can be reduced.

Additionally, the systems, apparatus, and methods described herein can facilitate smooth transformation of an aerial vehicle between its compact configuration and flight configuration, without requiring much manual intervention from a user. For example, the foldable sections of the aerial vehicle can be extended and retracted automatically or semi-automatically using elastic elements that provide a spring force, and/or via actuation of one or more propulsion units supported by the foldable sections.

Various embodiments of the disclosure may be directed to an aerial vehicle, for example an unmanned aerial vehicle (UAV). In one aspect of the disclosure, a UAV may comprise a central body, and a plurality of arms extendable from the central body. Each arm can be configured to support one or more propulsion units. Additionally, each arm can be configured to transform between (1) a flight configuration wherein the arm is extending away from the central body, and (2) a compact configuration wherein the arm is folded against the central body.

In some embodiments, at least one arm may be arranged such that its propulsion unit carries one or more rotor blades facing a first direction when the arm is in the flight configuration, and the one or more rotor blades facing a second direction when the arm is in the compact configuration. The second direction may be different from the first direction. For example, the second direction may be substantially opposite to the first direction or substantially orthogonal to the first direction.

In some embodiments, at least one arm may have a proximal end and a distal end relative to the central body. The proximal end of the arm may be located at a first location when the arm is extended in the flight configuration. The distal end of the arm may be located at or nearby the first location when the arm is folded in the compact configuration. In one instance, the arm may be configured to translate from the first location of the central body to a second location of the central body while transforming from the flight configuration to the compact configuration so that after the transformation, the distal end of the arm is located at or nearby the first location. In another instance, the arm may comprise a plurality of foldable portions that are rotatable relative to one another, and the arm can be folded in the compact configuration by rotating the foldable portions about two or more axes such that the distal end of the arm is located at or nearby the first location without translational motion of the proximal end of the arm.

In some embodiments, at least one arm may be configured to rotate about a first rotational axis and then about a second rotational axis not parallel to the first rotational axis when transforming between the flight configuration and the compact configuration. The rotation of the arm may occur about at least two of the axes selected from a group consisting of yaw, roll and pitch axes of the UAV. In some instances, rotation of the arm about the first rotational axis may cause one or more rotor blades supported by the arm to face a first direction, and rotation of the arm about the second rotational axis may cause the one or more rotor blades to face a second direction, whereby the second direction is different from the first direction. For example, the second direction may be substantially opposite to the first direction or substantially orthogonal to the first direction.

In some embodiments, at least one arm may be configured to be rotated about a rotational axis that causes a distal end of the arm to move both horizontally and vertically relative to the central body when transforming between the flight configuration and compact configuration. The rotational axis may be disposed at an angle to at least one of roll, pitch and/or yaw axis of the UAV, thereby resulting in the horizontal and vertical motion of the distal end of the arm during the transformation.

In some embodiments, extension of at least one arm beyond a threshold position may trigger operation of one or more components on board the UAV or an external device in communication with the UAV. Similarly, retraction of the arm beyond the threshold position may terminate the operation of the one or more components on board the UAV or the external device in communication with the UAV. The threshold position may include a threshold angle of the arm relative to the central body of the UAV. Accordingly, the positional configuration of the arm can be used as an on/off switch to power one or more components on board the UAV or the external device.

In some embodiments, extension of at least one arm of the plurality may be effectuated by a reaction force against the arm by the central body when the one or more rotor blades act upon and push against the central body. The extension may be triggered by a user input. For example, the user input may be provided via an external device in communication with the UAV. The acting upon and pushing of the one or more rotor blades against the central body may take place as the plurality of arms are being transformed from a compact configuration wherein the arms are folded against the central body, to a flight configuration wherein the arms are extended away from the central body.

Various embodiments of the disclosure are next described in detail below with reference to the drawings.

FIGS. 1A-1E illustrate different schematic views of an unmanned aerial vehicle (UAV) as its arms transform from a flight configuration to various compact configurations, in accordance with embodiments. Any description herein of a UAV may apply to any type of movable object and vice versa. The movable object may be a motorized vehicle or vessel having one or more fixed or movable arms, wings, extended sections, and/or propulsion units.

Referring to FIGS. 1A-1E, a UAV 100 may comprise a central body 102 and a plurality of arms extendable from the central body. The central body may correspond to an airframe or a housing of the UAV. The central body can have any shape and size. For example, a shape of the central body may be rectangular, prismatic, spherical, ellipsoidal, or the like. The UAV can have any number of arms. For example, the UAV can have one, two, three, four, five, six, seven, eight, nine, ten, or more than ten arms. In the example shown in FIGS. 1A-1E, the UAV 100 has four arms 104-1, 104-2, 104-3, 104-4.

A center of mass of the central body or the UAV may be denoted by a point O. A roll axis 112-1 (along the X-axis), a pitch axis 112-2 (along the Y-axis), and a yaw axis 112-3 (along the Z-axis, not shown) of the UAV may be defined relative to the point O. The UAV may be configured to rotate relative to one or more of the roll, pitch, and yaw axes during flight. The central body may have a head (nose portion) 102-1, a tail (rear portion) 102-2, a right side 102-3, a left side 102-4, a top side 102-5, and a bottom side (not shown). The head may be located at one end of the roll axis of the central body, and the tail may be located at another end of the roll axis of the central body. The right side may be located at one end of the pitch axis of the central body, and the left side may be located at another end of the pitch axis of the central body. The top side may be located at one end of the yaw axis of the central body, and the bottom side may be located at another end of the yaw axis of the central body.

Each arm may be configured to support a propulsion unit carrying one or more rotor blades. In the example shown in FIGS. 1A-1E, the arms 104-1, 104-2, 104-3, and 104-4 are configured to support propulsion units 108-1, 108-2, 108-3, and 108-4, respectively, carrying one or more rotor blades 110-1, 110-2, 110-3, and 110-4, respectively. The rotor blades may be propeller blades. The rotor blades may be actuated by a motor or an engine to generate a lift force for the UAV. For example, the rotor blades may be affixed to a rotor of a motor such that the rotor blades rotate with the rotor to generate a lift force (thrust). The arms may be affixed to the central body such that the arms and the central body are movable as a whole (as the UAV).

An arm may be any frame member, connecting member, mounting arm, connecting arm, torsion arm, elongated arm, support frame, etc. that can be used to connect the propulsion unit to the central body. Each arm may be a single component. In some embodiments, an arm may be provided in plural. An arm may have any shape, and need not be limited to a linear shape. For example, an arm can have any shape in a two-dimensional plane or in three-dimensional space. An arm may be formed as a single monolithic structure. In some embodiments, an arm may comprise a plurality of sections that can move relative to one another. Any type of structure (two-dimensional or three-dimensional) of the arm may be contemplated. An arm may be formed having any shape and/or size. An arm may be formed having a regular shape (e.g., cylindrical, rectangular block, circular or rectangular plate, etc.) or any irregular shape. Any dimension (e.g., length, width, thickness, diameter, circumference, or area) of the arm may be contemplated. For example, in some cases, a length of an arm may be about 60 mm, 70 mm, 80 mm, 90 mm, 100 mm, 110 mm, 120 mm, 130 mm, 140 mm, 150 mm, 160 mm, 170 mm, 180 mm, or 190 mm. Alternatively, the length of an arm may be less than about 60 mm or greater than about 190 mm. In some cases, a width of an arm may be about 5 mm, 6 mm, 7 mm, 8 mm, 9 mm, 10 mm, 11 mm, 12 mm, 13 mm, 14 mm, or 15 mm. Alternatively, the width of an arm may be less than about 5 mm or greater than about 15 mm. In some cases, a thickness of an arm may be about 5 mm, 6 mm, 7 mm, 8 mm, 9 mm, 10 mm, 11 mm, 12 mm, 13 mm, 14 mm, or 15 mm. Alternatively, the thickness of an arm may be less than about 5 mm or greater than about 15 mm. In some embodiments, at least one arm located near a head portion of a UAV may have a length of about 129 mm, a width of about 10 mm, and a thickness of about 21 mm. In some embodiments, at least one arm located near a tail portion of a UAV may have a length of about 117 mm, a width of about 9.2 mm, and a thickness of about 16 mm.

The plurality of arms may be rotatably coupled to the central body via a plurality of joints. The joints may be located at or near the head and tail of the central body. Optionally, the joints may be located on the sides of the central body. The plurality of joints may be configured to permit the arms to rotate relative to a plurality of rotational axes. The plurality of rotational axes may be parallel, orthogonal, or oblique to one another. The plurality of rotational axes may also be parallel, orthogonal, or oblique to one or more of the roll, pitch, and yaw axes of the UAV.

A proximal end of at least one arm may be attached to the central body near or at the head of the central body. For example, as shown in FIG. 1A, a proximal end of a first arm 104-1 may be attached to a joint 106-1 near a portion of the head, and a proximal end of a second arm 104-2 may be attached to a joint 106-2 near another portion of the head. A proximal end of at least one other arm may be attached to the central body near or at the tail of the central body. For example, as shown in FIG. 1A, a proximal end of a third arm 104-3 may be attached to a joint 106-3 near a portion of the tail, and a proximal end of a fourth arm 104-4 may be attached to a joint 106-4 near another portion of the tail.

As shown in FIG. 1A, the proximal end of an arm may be coupled to the central body 102 via a joint, and a distal end of the arm may be coupled to a propulsion unit. An arm may be coupled to the central body and a propulsion unit using any coupling mechanism, such as fasteners, actuation elements, joints, hinges, bolts, screws, etc. In some embodiments, the joint 106 may comprise one or more elastic elements. Each elastic element may be configured to cause the arm connected thereto to automatically retract when the arm is reversibly folded to a predetermined state. Each elastic element may also be configured to cause the arm connected thereto to automatically extend when the arm is reversibly extended to a predetermined state.

In some embodiments, a joint may be configured to permit translational motion of an arm relative to the central body. For example, the joint may permit the arm to translate or slide along a side portion of the central body. By controlling the rotational and/or translational motion of the plurality of arms, each arm can be configured to transform between a flight configuration and a compact configuration. The control of the arms to effect the transformation may be performed manually by a user, semi-automatically with one or more user inputs, or fully automatic, as described later in the specification.

FIG. 1A shows a schematic top view of the UAV with its arms in the flight configuration. As shown in FIG. 1A, the plurality of arms may extend in an outward manner from the central body when the arms are in the flight configuration. The plurality of arms may comprise the first arm, second arm, third arm, and fourth arm. The first and second arms may extend outwardly from the head of the central body, and at an angle to the central body when the first and second arms are in the flight configuration. The first and second arms may be laterally opposite to each other relative to the roll axis 112-1. Similarly, the third and fourth arms may extend outwardly from the tail of the central body, and at an angle to the central body when the third and fourth arms are in the flight configuration. The third and fourth arms may also be laterally opposite to each other relative to the roll axis 112-1. As shown in FIG. 1A, the first/second arms and third/fourth arms may be laterally opposite to each other relative to the pitch axis 112-2 when the arms are in the flight configuration. Although FIG. 1A shows the arms extending in a symmetrical manner in the flight configuration, the disclosure is not limited thereto. In some embodiments, two or more arms may extend at different angles to the central body such that the arms are not symmetrically disposed. The rotor blades supported by each arm may be in a fully extended position when the arm is in the flight configuration. The rotor blades may be actuated by a rotor or motor in the propulsion unit to generate a lift force for the UAV when the arm is in the flight configuration.

FIGS. 1B-1E show schematic top views of the UAV with its arms in various compact configurations. As shown in FIGS. 1B-1E, the plurality of arms may be folded against the central body when the arms are in various compact configurations. When the arms in a compact configuration, the UAV may not be in operation or in flight. Power may or may not be supplied to the UAV when the arms in a compact configuration. The rotor blades supported by each arm may be in a retracted position when the arm is in the compact configuration.

The plurality of arms and rotor blades supported thereon may be folded at different portions of the UAV, depending on the type of compact configuration. The plurality of arms and rotor blades may be located on one or more of the right side 102-3, left side 102-4, top side 102-5, bottom side, head, or tail of the central body. In some embodiments, one or more rotor blades supported by an arm may be located beneath the central body, and one or more rotor blades supported by another arm may be located beneath or above the central body in the compact configuration. In other embodiments, one or more rotor blades supported by an arm may be located against a side of the central body, and one or more rotor blades supported by another arm may be located beneath the central body, above the central body, or against a side of the central body in the compact configuration. Any placement of the rotor blades and arms relative to the central body in the compact configuration may be contemplated.

Figure 1B:
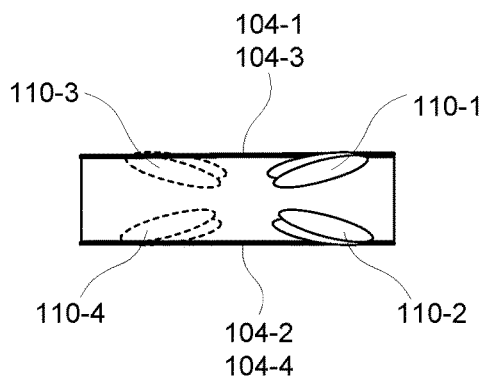

For example, in the compact configuration shown in FIG. 1B, the first and second arms may be located above the top side and/or near the left/right sides of the central body, such that first rotor blades 110-1 and second rotor blades 110-2 supported by the first and second arms are located above the top side. The third and fourth arms may be located below the bottom side and/or near the left/right sides of the central body, such that third rotor blades 110-3 and fourth rotor blades 110-4 supported by the third and fourth arms are located below the bottom side.

Figure 1C:
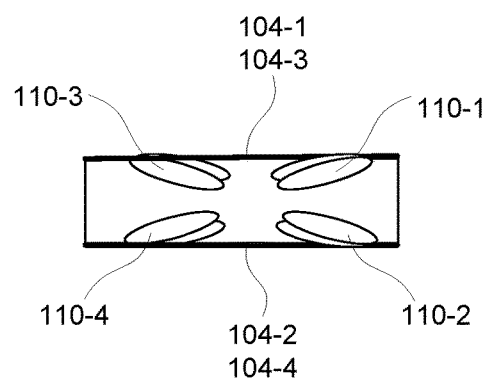
Figure 1D:
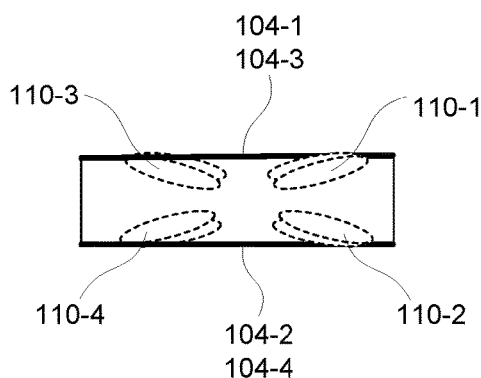

In the compact configuration shown in FIG. 1C, the first, second, third, and fourth arms may be located above the top side and/or near the left/right sides of the central body, such that the first, second, third, and fourth rotor blades supported by the arms are located above the top side. Similarly, in the compact configuration shown in FIG. 1D, the first, second, third, and fourth arms may be located below the bottom side and/or near the left/right sides of the central body, such that the first, second, third, and fourth rotor blades supported by the arms are located below the bottom side.

Figure 1E:
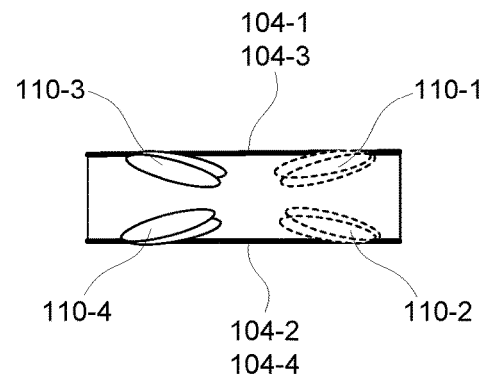

In the compact configuration shown in FIG. 1E, the first and second arms may be located below the bottom side and/or near the left/right sides of the central body, such that first rotor blades 110-1 and second rotor blades 110-2 supported by the first and second arms are located below the bottom side. The third and fourth arms may be located above the top side and/or near the left/right sides of the central body, such that third rotor blades 110-3 and fourth rotor blades 110-4 are located above the top side. However, unlike the compact configuration in FIG. 1B, the arms shown in FIG. 1E are folded via a translational and rotational motion, such that a distal end of each arm in the compact configuration is located substantially at or near a proximal end of the arm in the flight configuration. For example, comparing FIG. 1A and FIG. 1E, the proximal end of the first arm is located at or near the first joint 106-1 in the flight configuration, and the distal end of the first arm supporting the first rotor blades is located at or near the first joint 106-1 in the compact configuration.

FIGS. 2A-2D illustrate different schematic views of a UAV as its arms transform from a flight configuration to a compact configuration via rotation about different axes, in accordance with an embodiment. A UAV 200 may comprise a central body 202 and a plurality of arms extendable from the central body. In the example shown in FIGS. 2A-2D, the UAV 200 comprises four arms 204-1, 204-2, 204-3, and 204-4. The central body may correspond to an airframe or a housing of the UAV. A roll axis 212-1 (along the X-axis), a pitch axis 212-2 (along the Y-axis), and a yaw axis 212-3 (along the Z-axis, not shown) of the UAV may be defined relative to a point O corresponding to a center of mass of the central body or the UAV. The central body may have a head (nose portion) 202-1, a tail (rear portion) 202-2, a right side 202-3, a left side 202-4, a top side 202-5, and a bottom side 202-6. The head may be located at one end of the roll axis of the central body, and the tail may be located at another end of the roll axis of the central body. The right side may be located at one end of the pitch axis of the central body, and the left side may be located at another end of the pitch axis of the central body. The top side may be located at one end of the yaw axis of the central body, and the bottom side may be located at another end of the yaw axis of the central body.

Each arm may be configured to support a propulsion unit carrying one or more rotor blades. In the example shown in FIGS. 2A-2D, the arms 204-1, 204-2, 204-3, and 204-4 are configured to support propulsion units 208-1, 208-2, 208-3, and 208-4, respectively, carrying one or more rotor blades 210-1, 210-2, 210-3, and 210-4, respectively. The rotor blades may be actuated by a motor or an engine to generate a lift force for the UAV. The arms may be affixed to the central body such that the arms and the central body are movable as a whole (as the UAV).

The plurality of arms may be rotatably coupled to the central body via a plurality of joints 206-1, 206-2, 206-3, 206-4. The joints may be located at or near the head and tail of the central body. Additionally, the joints may be located on the sides of the central body. The plurality of joints may be configured to permit the arms to rotate about a plurality of rotational axes. The plurality of rotational axes may be parallel, orthogonal, or oblique to one another. The plurality of rotational axes may also be parallel, orthogonal, or oblique to one or more of the roll, pitch, and yaw axes.

Figure 2A:
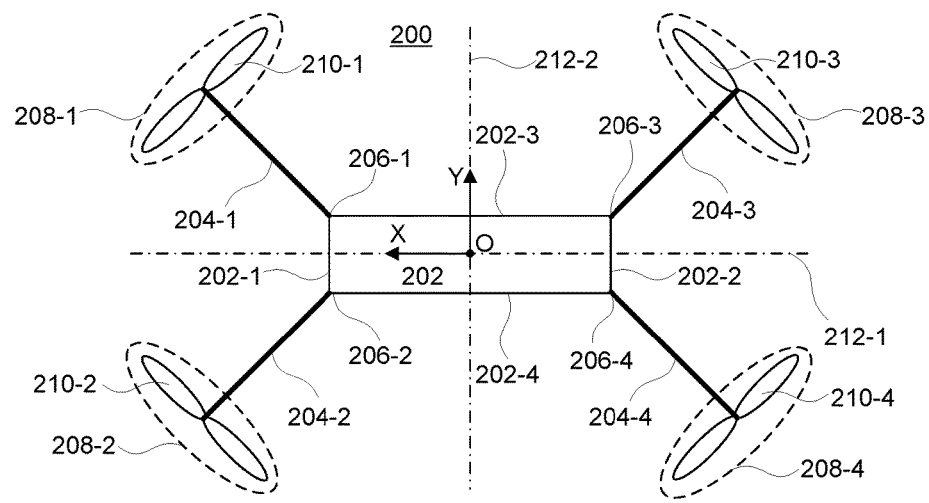
FIGS. 2A-2D illustrate different schematic views of a UAV as its arms transform from a flight configuration to a compact configuration via rotation about different axes, in accordance with an embodiment.

As shown in FIG. 2A, a proximal end of an arm may be coupled to the central body via a joint, and a distal end of the arm may be coupled to a propulsion unit. An arm may be coupled to the central body and a propulsion unit using any coupling mechanism, such as fasteners, actuation elements, joints, hinges, bolts, screws, etc. In some embodiments, the joint may comprise one or more elastic elements. Each elastic element may be configured to cause the arm connected thereto to automatically retract when the arm is reversibly folded to a predetermined state. Each elastic element may also be configured to cause the arm connected thereto to automatically extend when the arm is reversibly extended to a predetermined state.

Figure 2B:
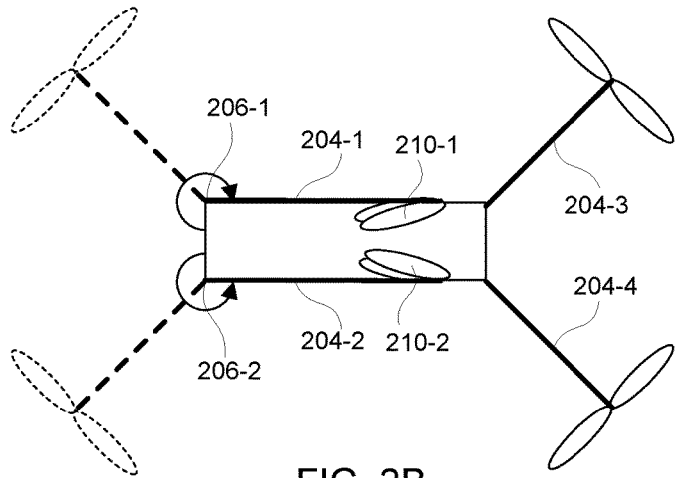

At least one arm may be configured to be rotatable about a first rotational axis and reversibly folded on a side of the central body when transforming from the flight configuration to the compact configuration, for example as shown in FIG. 2B. FIG. 2B shows a schematic top view of the UAV with its first arm 204-1 and second arm 204-2 folded in a compact configuration. FIG. 2A shows the first and second arms extending out from the head of the central body in the flight configuration. The first and second arms can be transformed to the compact configuration, by rotating the first arm about a first rotational axis in a direction (e.g., clockwise), and by rotating the second arm about a second rotational axis in another direction (e.g., counterclockwise). The first rotational axis may extend through the first joint 206-1 in a direction substantially parallel to the yaw axis, and substantially orthogonal to the roll axis and pitch axis of the central body. Similarly, the second rotational axis may extend through the second joint 206-2 in a direction substantially parallel to the yaw axis, and substantially orthogonal to the roll axis and pitch axis of the central body. After the transformation to the compact configuration, the first and second arms may be located above the top side and/or near the left/right sides of the central body, such that first rotor blades 210-1 and second rotor blades 210-2 are located above the top side.

Figure 2D:
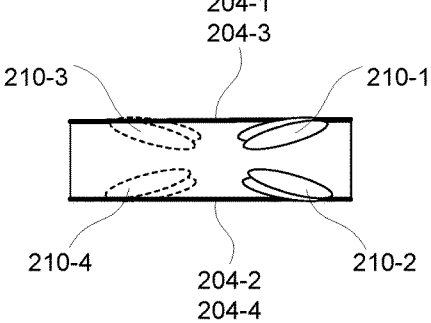
Figure 2C:
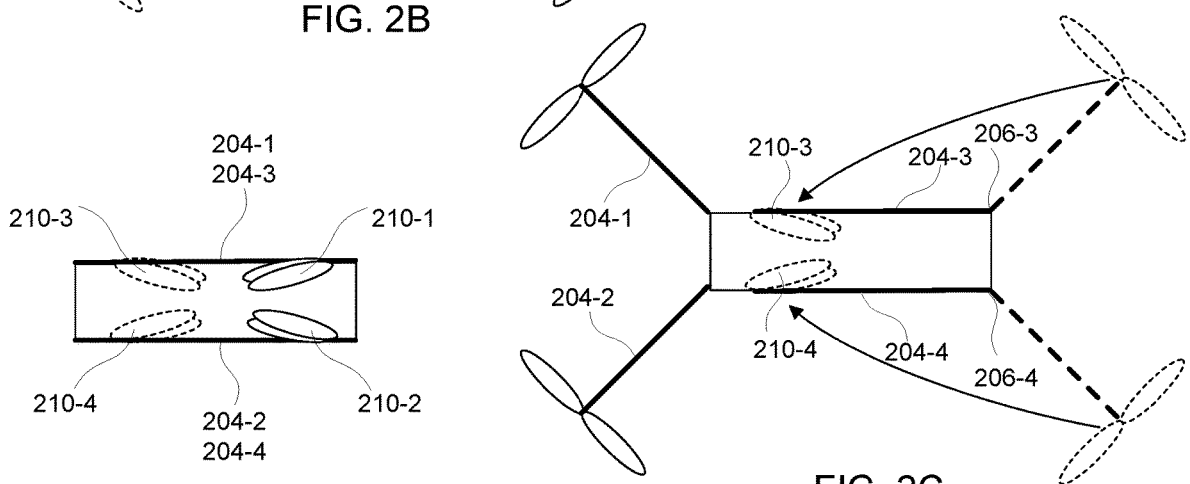

In the embodiment of FIGS. 2A-2D, at least one other of the plurality of arms may be configured to be rotatable about another rotational axis not parallel to the first/second rotational axes, and reversibly folded on another side of the central body when transforming from the flight configuration to the compact configuration, for example as shown in FIG. 2C. FIG. 2C shows a schematic top view of the UAV with its third arm 204-3 and fourth arm 204-4 folded in a compact configuration. FIG. 2A shows the third and fourth arms extending out from the tail of the central body in the flight configuration. The third and fourth arms can be transformed to the compact configuration, by rotating the third arm about a third rotational axis in a direction (e.g., clockwise), and by rotating the fourth arm about a fourth rotational axis in another direction (e.g., counterclockwise). The third rotational axis may extend through the third joint 206-3 at an acute angle or obtuse angle to at least one of the roll, pitch and yaw axis of the UAV. The fourth rotational axis may extend through the fourth joint 206-4 at an acute angle or obtuse angle to at least one of the roll, pitch and yaw axis of the UAV. In some embodiments, the third and fourth rotational axes may be laterally opposite to each other relative to the roll axis 212-1 of the central body. In some cases, the third and fourth rotational axes may extend through the third joint 206-3 and fourth joint 206-4 in a direction substantially parallel to the roll axis, and substantially orthogonal to the yaw axis and pitch axis of the central body. After the transformation to the compact configuration, the third and fourth arms may be located below the bottom side and/or near the left/right sides of the central body, such that third rotor blades 210-3 and fourth rotor blades 210-4 are located below the bottom side.

As shown in FIG. 2C, when the third/fourth rotational axes extend through the third/fourth joints at an acute angle or obtuse angle to at least one of the roll, pitch and yaw axis of the UAV, the third and fourth arms may transformed to the compact configuration by the arms traversing a 3-dimensional path in space. The 3-dimensional path may be configured to optimize the space surrounding the central body, such that the third and fourth arms can be fully extended out from the central body and folded against the central body even under tight space constraints.

FIG. 2D shows all of the arms of the UAV being transformed to the compact configuration. As shown in FIG. 2D, the first and second arms may be located above the top side and/or near the left and right sides of the central body, such that first rotor blades 210-1 and second rotor blades 210-2 are located above the top side. The third and fourth arms may be located below the bottom side and/or near the left and right sides of the central body, such that third rotor blades 210-3 and fourth rotor blades 210-4 are located below the bottom side. Although FIG. 2D shows the first/second and third/fourth rotor blades being located on opposite sides of the central body in the compact configuration, the disclosure is not limited thereto. In some embodiments, the first/second/third/fourth rotor blades may be located on a same side (e.g., a top side or a bottom side) of the central body. In some embodiments, the first/second and third/fourth rotor blades may be located on sides of the central body that are orthogonal to each other.

Figure 3A:
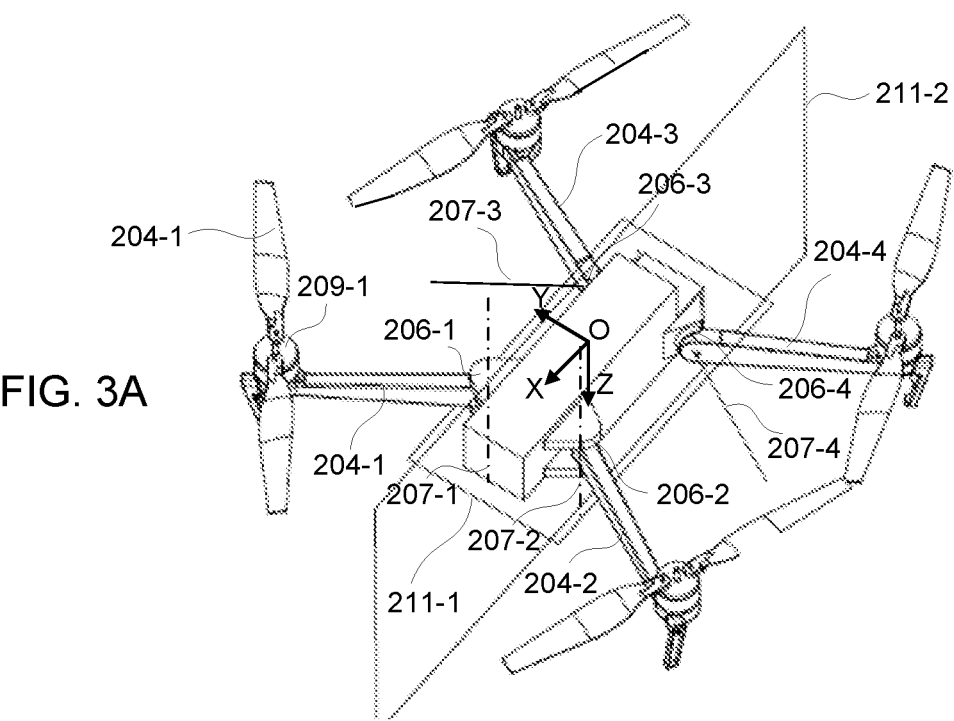
FIGS. 3A-3C illustrate different schematic views of a UAV when its arms are in a flight configuration, in accordance with an embodiment.
Figure 3B:
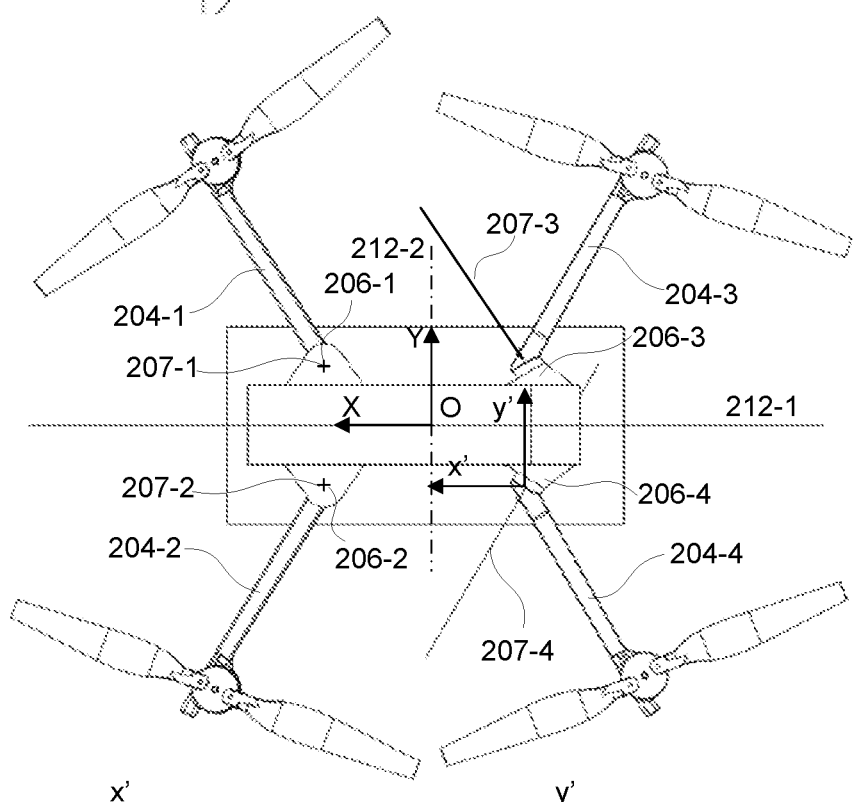
Figure 3C:
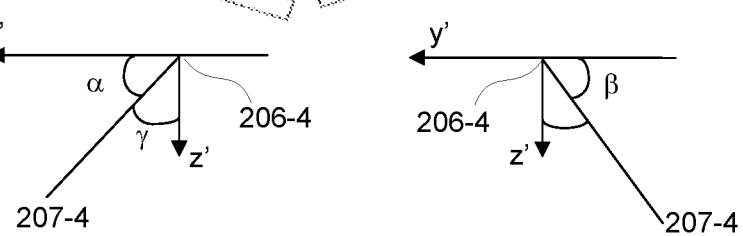

FIGS. 3A-3C illustrates different schematic views of a UAV when its arms are in a flight configuration, in accordance with an embodiment. The UAV of FIGS. 3A-3C may correspond to a physical embodiment of the UAV of FIGS. 2A-2D. FIG. 3A shows an isometric view of the UAV. A roll axis 212-1 (along the X-axis), a pitch axis 212-2 (along the Y-axis), and a yaw axis 212-3 (along the Z-axis) of the UAV may be defined relative to a point O corresponding to a center of mass of the central body or the UAV. A first plane 211-1 may be defined extending along the X-Y plane, and a second plane 211-2 may be defined extending along the X-Z plane. The first and second planes may intersect the central body orthogonally through point O.

The first arm may be configured to rotate about a first rotational axis 207-1, and the second arm may be configured to rotate about a second rotational axis 207-2. The first rotational axis may extend through the first joint 206-1, and the second rotational axis may extend through the second joint 206-2. The first and second rotational axes may be parallel to the yaw axis. The first and second rotational axes may be laterally opposite to each other relative to the second plane. The first and second rotational axes may be parallel to the second plane and orthogonal to the first plane.

The third arm may be configured to rotate about a third rotational axis 207-3, and the fourth arm may be configured to rotate about a fourth rotational axis 207-4. The third rotational axis may extend through the third joint 206-3 at an acute angle or obtuse angle to at least one of the roll, pitch and yaw axis of the UAV. The fourth rotational axis may extend through the fourth joint 206-4 at an acute angle or obtuse angle to at least one of the roll, pitch and yaw axis of the UAV. The third and fourth rotational axes may be laterally opposite to each other relative to the second plane.

In some cases, the third and fourth rotational axes may extend through the third joint 206-3 and fourth joint 206-4 in a direction substantially parallel to the roll axis, and substantially orthogonal to the yaw axis and pitch axis of the central body. In those cases, the third and fourth rotational axes may be parallel to the first plane and may intersect the second plane at an angle. In some cases, the third and fourth rotational axes may be orthogonal to the first and second rotational axes.

FIG. 3B shows a top view of the UAV of FIG. 3A. As shown in FIG. 3B, the third and fourth rotational axes may substantially "mirror" each other about the roll axis 212-1 and the second plane.

FIG. 3C shows that the fourth rotational axis can extend from the fourth joint in different directions. Similarly, the third rotational axis can also extend from the third joint in different directions (not shown). Referring to FIGS. 3B and 3C, a local coordinate system x', y', and z' may be defined at the fourth joint. The x' axis may be parallel to the X axis (roll axis), the y' axis may be parallel to the Y axis (pitch axis), and the z' axis may be parallel to the Z axis (yaw axis) of the UAV. The fourth rotational axis may be disposed at an angle α relative to the x' axis, an angle β relative to the y' axis, and an angle γ relative to the z' axis. One or more of the angles α, β, and γ may be an acute angle, an obtuse angle, or a right angle. It should be appreciated that the example in FIG. 3C may be applied to the third joint, as well as the first and/or second joints or any other joints (or movable portions of the UAV). By adjusting the values angles α, β, and γ, a rotational axis can be formed extending from a joint in a 3-dimensional space, such that rotation of the arm about the rotational axis follows a 3-dimensional curved motion path.

Figure 4B:
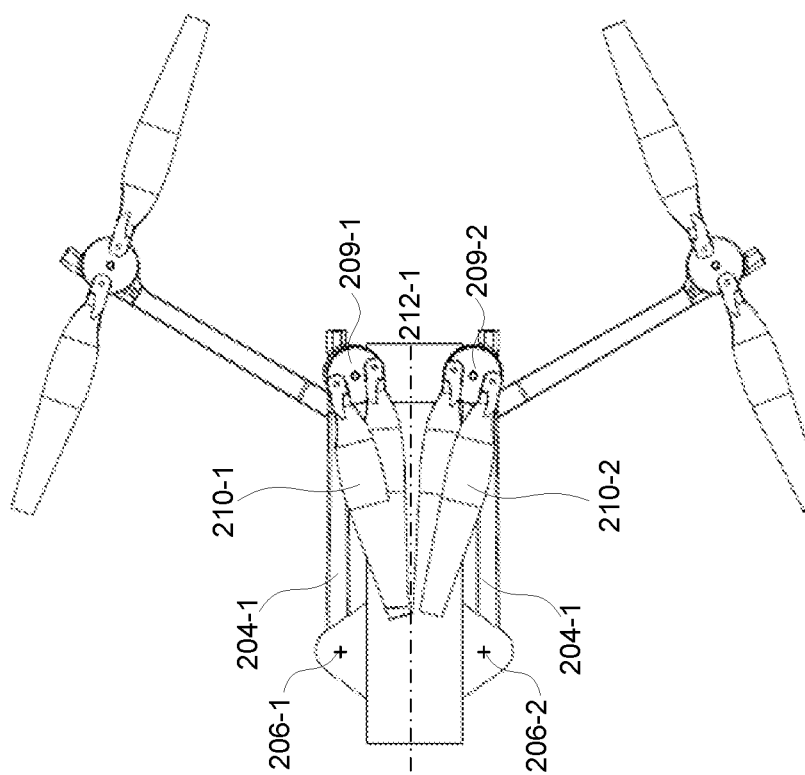
FIGS. 4A and 4B illustrate different schematic views of the UAV of FIG. 3 as the first and second arms transform to a compact configuration by rotating about axes parallel to a yaw axis of the UAV, in accordance with an embodiment.
Figure 4A:
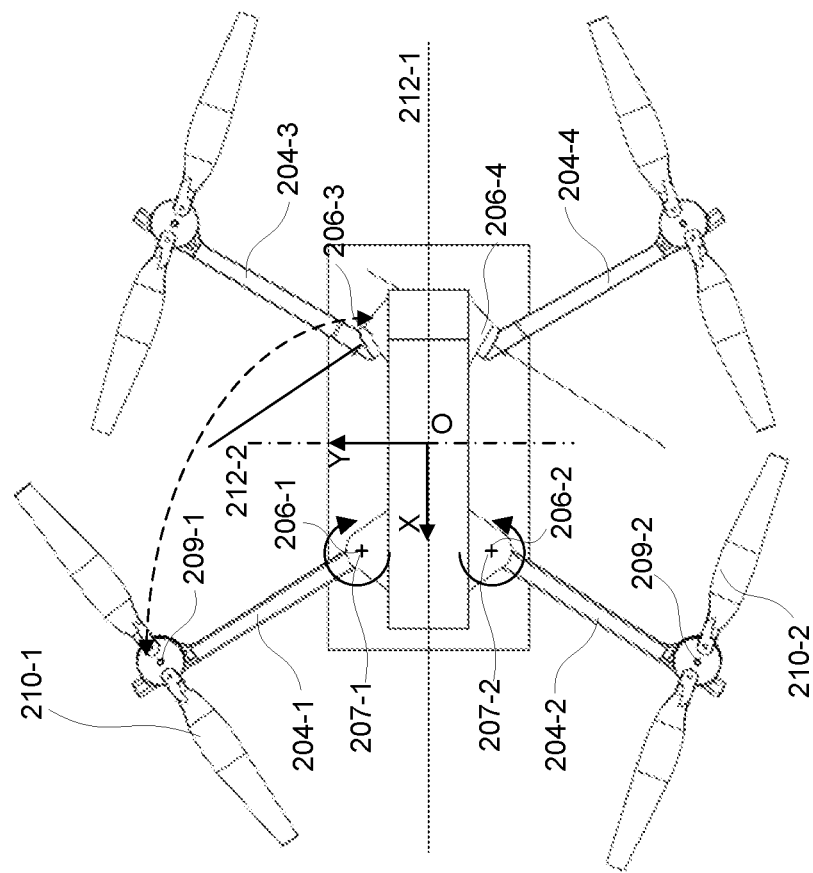

FIGS. 4A and 4B illustrate different schematic views of the UAV of FIGS. 3A-3C as the first and second arms transform to a compact configuration by rotating about axes parallel to a yaw axis of the UAV, in accordance with an embodiment. FIG. 4A shows all of the arms in the flight configuration, and FIG. 4B shows the first and second arms being transformed to the compact configuration. Referring to FIGS. 4A and 4B, when the first arm rotates in a clockwise direction about the first joint 206-1 along the rotational axis 207-1 parallel to the yaw axis, the first arm may be located on the right side of the central body, and the first rotor blades may be located above the top side of the central body that is closer to the right side, when the first arm is in the compact configuration. When the second arm rotates in a counter-clockwise direction about the second joint 206-2 along the rotational axis 207-2 parallel to the yaw axis, the second arm may be located on a left side of the central body, and the second rotor blades may be located above the top side of the central body that is closer to the left side, when the second arm is in the compact configuration. By locating the folded first and second rotor blades above the top side of the central body, a width of the central body can be reduced, thereby improving the form factor of the UAV.

FIGS. 5A-5C illustrate different schematic views of the UAV of FIGS. 3A-3C as the third and fourth arms transform to a compact configuration by rotating about axes that are disposed at an angle to a roll, pitch, and/or yaw axis of the UAV, in accordance with an embodiment. FIG. 5A shows all of the arms in the flight configuration, and FIG. 5B shows the third and fourth arms being transformed to the compact configuration. Referring to FIGS. 5A and 5B, when the fourth arm rotates in a clockwise direction about the fourth joint 206-4 along the rotational axis 207-4, the fourth arm may be located on the left side of the central body, and the fourth rotor blades may be located below bottom side of the central body that is closer to the left side, when the fourth arm is in the compact configuration. When the third arm rotates in a counterclockwise direction about the third joint 206-3 along the rotational axis 207-3, the third arm may be located on a right side of the central body, and the third rotor blades may be located below the bottom side of the central body that is closer to the right side, when the third arm is in the compact configuration. As previously described, each of the third and fourth rotational axes may be disposed at an acute angle or obtuse angle to at least one of the roll, pitch and yaw axis of the UAV. By locating the folded third and fourth rotor blades below the bottom side of the central body, a width of the central body can be reduced, thereby improving the form factor of the UAV.

FIG. 5C shows an exemplary 3-dimensional path that the distal end of the fourth arm makes as the arm transforms between the flight configuration and the compact configuration. As shown in FIG. 5C, the motion of the arm may be in both the horizontal direction and the vertical direction.

Figure 6A:
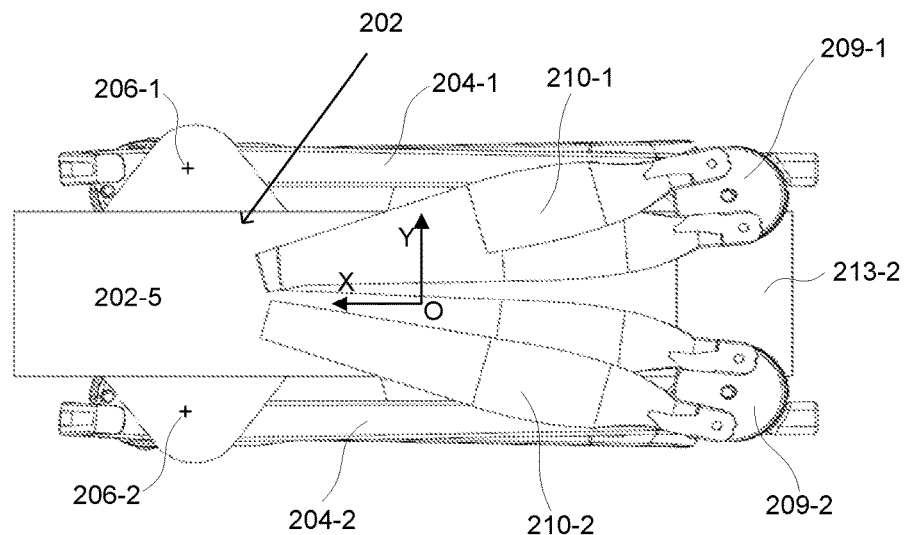
FIGS. 6A-6C illustrate different schematic views of the UAV of FIGS. 4A, 4B, and 5A-5C whereby rotor blades on the arms are disposed facing different directions when the arms are in the compact configuration, in accordance with an embodiment.
Figure 6B:
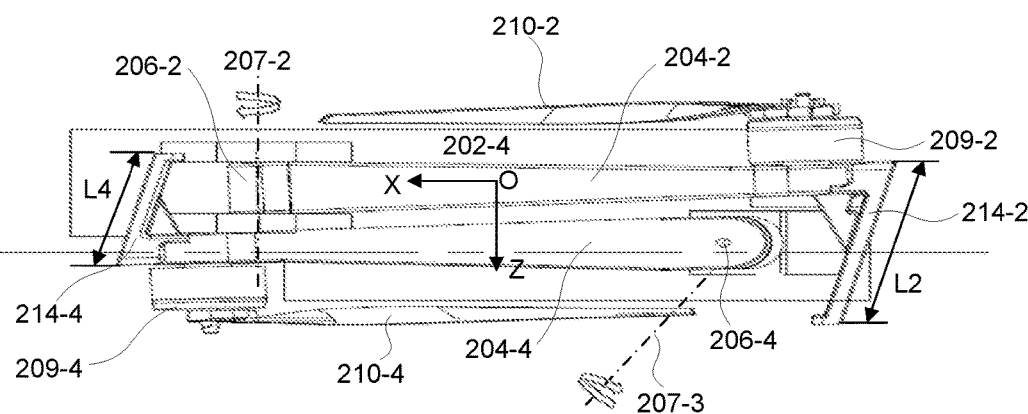
Figure 6C:
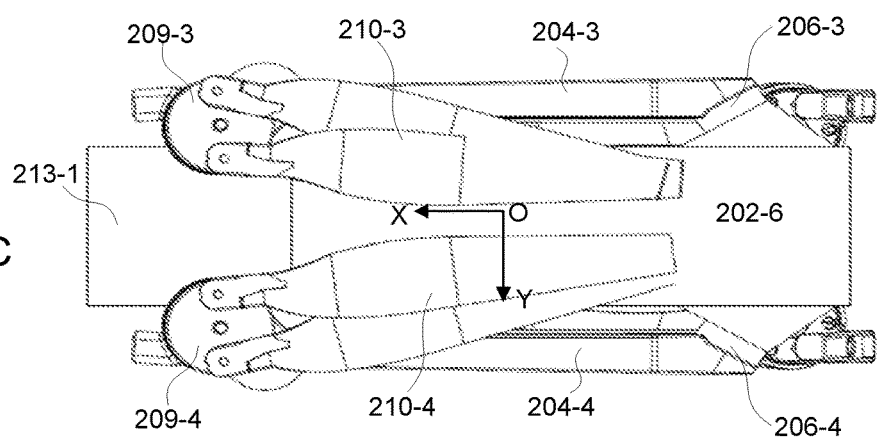

FIGS. 6A-6C illustrate different schematic views of the UAV of FIGS. 4A, 4B, and 5A-5C whereby rotor blades on the arms are disposed facing different directions when the arms are in the compact configuration, in accordance with an embodiment. FIG. 6A shows a schematic of the UAV as viewed from its top side; FIG. 6B shows a schematic of the UAV as viewed from its left side; and FIG. 6C shows a schematic of the UAV as viewed from its bottom side.

When the first and second arms are in the compact configuration and the flight configuration, the first motor 209-1 and rotor blades 210-1 (carried by the first arm 204-1) and the second motor 209-2 and rotor blades 210-2 (carried by the second arm 204-1) may face a direction extending upwardly from the top side of the central body parallel to the negative Z-axis. In other words, the first and second motors and rotor blades may face a same direction in both the flight configuration and the compact configuration.

When the third and fourth arms are in the flight configuration, the third motor 209-3 and rotor blades 210-3 (carried by the third arm 204-3) and the fourth motor 209-4 and rotor blades 210-4 (carried by the fourth arm 204-4) may face a direction extending upwardly from the top side of the central body parallel to the negative Z-axis. However, when the third and fourth arms are in the compact configuration, the third and fourth motors and rotor blades may face a direction extending downwardly from the bottom side of the central body parallel to the positive Z-axis. In other words, the third and fourth motors and rotor blades may face different directions in the flight configuration and the compact configuration. In the example of FIGS. 6A-6C, the different directions may be opposite to each other. In some embodiments, the different directions may be orthogonal or opposite to each other. The different directions can be a result of rotation of the third and fourth arms about rotational axes that are disposed at an acute or obtuse angle to at least one of the roll, pitch and yaw axis of the UAV.

As shown in FIG. 6B, the second and fourth arms may be disposed vertically along the left side of the central body in the compact configuration. In some cases, the second and fourth arms may substantially lie along a same vertical plane along the left side when in the compact configuration. Likewise, the first and third arms may be disposed vertically along the right side of the central body in the compact configuration. In some cases, the first and third arms may substantially lie along a same vertical plane along the right side when in the compact configuration.

In some embodiments, the head and/or tail of the central body may comprise a depression configured to receive a portion of the propulsion units when the UAV is in the compact configuration. The portion of the propulsion units may include one or more motors. For example, referring to FIGS. 5A-5C and 6A-6C, the head 202-1 of the central body may comprise a first depression 213-1 configured to receive the motors 209-3 and 209-4 when the third and fourth arms are in the compact configuration. Likewise, the tail 202-2 of the central body may comprise a second depression 213-2 configured to receive the motors 209-1 and 209-2 when the first and second arms are in the compact configuration. In some embodiments, at least one of the first and second depressions may be configured to receive a payload. The payload may be, for example an image device.

In some embodiments, the UAV may comprise a landing stand attached to a distal end of at least two of the plurality of arms. The landing stand may be configured to protect the central body from impact during landing and bear weight of the UAV when the UAV lands. For example, as shown in FIGS. 5A-5C and 6A-6C, a first landing stand 214-1 may be attached to a distal end of the first arm 204-1, a second landing stand 214-2 may be attached to a distal end of the second arm 204-2, a third landing stand 214-3 may be attached to a distal end of the third arm 204-3, and a fourth landing stand 214-4 may be attached to a distal end of the fourth arm 204-4.

As shown in FIG. 6B, the second landing stand 214-2 may be attached to the distal end of the second arm near the second motor 209-2, and the fourth landing stand 214-4 may be attached to the distal end of the fourth arm near the fourth motor 209-4, on the left side of the central body when the arms in the compact configuration. Likewise, the first landing stand 214-1 may be attached to the distal end of the first arm near the first motor 209-1, and the third landing stand 214-3 may be attached to the distal end of the third arm near the third motor 209-3, on the right side of the central body when the arms in the compact configuration. The first and second landing stands may extend downwardly from the distal ends of the first and second arms, and the third and fourth landing stands may extend upwardly from the distal ends of the third and fourth arms when the arms are in the compact configuration. It should be noted that when the third and fourth arms are in the flight configuration, the third and fourth landing stands may extend downwardly from the distal ends of the third and fourth arms. When all of the arms are in the flight configuration, the first, second, third, and fourth landing stands may point towards the ground, so as to provide support for the UAV.

Additionally, since the first/second arms and the third/fourth arms are disposed at different heights in the compact configuration in FIGS. 6A-6C, the first/second landing stands and the third/fourth landing stands may have different lengths to accommodate for the difference in heights. For example, a length of the second landing stand may be given by L2, and a length of the fourth landing stand may be given by L4. The lengths of the first and second landing stands may be same or different. The lengths of the third and fourth landing stands may be same or different. In some cases, L2 may be about 20 mm, 25 mm, 30 mm, 35 mm, 40 mm, 45 mm, 50 mm, 55 mm, 60 mm, 65 mm, or 70 mm. Alternatively, L2 may be less than about 20 mm or greater than about 70 mm. In some cases, L4 may be about 10 mm, 15 mm, 20 mm, 25 mm, 30 mm, 35 mm, or 40 mm. Alternatively, L4 may be less than about 10 mm or greater than about 40 mm. In some embodiments, L4 may be less than L2. For example, L2 may be about 45 mm and L4 may be about 26 mm. The values for L2 and L4 may depend on a spacing between the first/second arms and the third/fourth arms in the compact configuration, and may be configured such that the landing stands contact the ground in a substantially horizontal manner when the UAV lands. Any values for the lengths of the landing stands may be contemplated.

In the embodiments of FIGS. 3A through 6C, the first and second arms may rotate in a plane, and the third and fourth arms may rotate along a curved surface. When transforming from the compact configuration to the flight configuration, the first and second arms may be extended prior to extending the third and fourth arms, so as to prevent the landing stands on the first and second arms from interfering with the third and fourth arms as they extend out. Likewise, when transforming from the flight configuration to the compact configuration, the third and fourth arms may be retracted prior to retracting the first and second arms, so as to prevent so as to prevent the landing stands on the first and second arms from interfering with the third and fourth arms as they retract. In some embodiments, the landing stands may be foldable about different axes, so as to avoid physical interference with other parts during transformation.

In some embodiments, landing stands may be attached to only some of the arms of the UAV, and need not be attached to all of the arms. For example, landing stands may be attached only to the first and second arms. A protrusion may be located on the bottom side of the central body. The protrusion may be extendable, and can extend out from the bottom side of the central body to serve as a landing stand. When the protrusion and the landing stands on the first and second arms are extended out, three points of contact can be provided to support the UAV. Specifically, the UAV can be supported on a surface by the first landing stand on the first arm, the second landing stand on the second arm, and the protrusion on the bottom side of the UAV.

In the embodiments of FIGS. 2A through 6C, the joints may be integrated into the central body to form a first portion of the central body. The first portion of the central body may be configured to move with respect to a second portion of the central body when transforming from the flight configuration to the compact configuration. The second portion of the central body may correspond to a bulk or monolithic portion of the central body. The first portion may be configured to support at least one of the plurality of arms. The movement of the first portion of the central body may be configured to cause movement of the at least one of the plurality of arms extending therefrom. In some embodiments, the first portion may be configured to rotate about a first rotational axis that is substantially parallel to yaw axis and substantially orthogonal to roll axis and pitch axis of the UAV. In other embodiments, the first portion may be configured to rotate about a second rotational axis that is disposed at an acute or obtuse angle to at least one of the roll, pitch and yaw axis of the UAV. In some further embodiments, the first portion may be configured to rotate about a third rotational axis that is substantially parallel to the roll axis of the UAV.

In some embodiments, a method for transformation of an unmanned aerial vehicle (UAV) may be provided. The method may comprise providing a UAV of any of the embodiments in FIGS. 1A through 6C, and operating the UAV such that the UAV adopts the flight configuration and the compact configuration.

In some embodiments, a method of assembling an unmanned aerial vehicle (UAV) may comprise providing a central body of the UAV, and attaching to the central body a plurality of arms that are extendable from the central body. Each arm of the plurality of arms may be configured to support one or more propulsion units, thereby assembling the UAV. Each of the plurality of arms may be configured to transform between (1) a flight configuration wherein the arm is extending away from the central body, and (2) a compact configuration wherein the arm is folded against the central body. At least one arm of the plurality of arms may be arranged such that its propulsion unit carries one or more rotor blades facing a first direction when the arm is in the flight configuration, and the one or more rotor blades facing a second direction when the arm is in the compact configuration, wherein the second direction is different from the first direction.

In some embodiments, a kit may comprise a plurality of arms that are configured to be attached to a central body of an unmanned aerial vehicle (UAV). Each arm of the plurality of arms may be configured to support one or more propulsion units. The kit may further comprise instructions for assembling the UAV, such that when the UAV is assembled according to the instructions, the assembled UAV is characterized in that: each of the plurality of arms when attached to the central body is configured to transform between (1) a flight configuration wherein the arm is extending away from the central body, and (2) a compact configuration wherein the arm is folded against the central body, and wherein at least one arm of the plurality of arms is arranged such that its propulsion unit carries one or more rotor blades facing a first direction when the arm is in the flight configuration, and the one or more rotor blades supported facing a second direction when the arm is in the compact configuration, wherein the second direction is different from the first direction. In some instances, the kit may further comprise the central body of the UAV. At least one arm of the plurality of arms may comprise a translatable or rotatable joint so that a part of the at least one arm of the plurality of arms may be configured to translate or rotate relative to another part of the at least one arm of the plurality of arms.

FIGS. 7A and 7B illustrate different schematic views of a UAV as a first arm and a second arm of the UAV transform from a flight configuration to a compact configuration via a rotational motion, in accordance with an embodiment.

Referring to FIGS. 7A and 7B, a UAV 300 may comprise a central body 302 and a plurality of arms 304 extendable from the central body. When the arms in the flight configuration shown in part A, a first arm 304-1 and a second arm 304-2 may extend outwardly from the head of the central body, and a third arm 304-3 and a fourth arm 304-4 may extend outwardly from the tail of the central body. The first arm may be configured to rotate about a first rotational axis 307-1, and the second arm may be configured to rotate about a second rotational axis 307-2. The first rotational axis may extend through a first joint 306-1, and the second rotational axis may extend through a second joint 306-2. The first and second joints may be located at the head and/or sides of the central body. The first and second rotational axes may be parallel to the yaw axis of the UAV. The first and second arms may be configured to rotate about the first and second joints via a purely rotational motion.

When the arms are in the compact configuration shown in FIG. 7B, the first arm and the second arm may be folded respectively to the right and left sides of the central body. The first motor 309-1 and rotor blades 310-1 and second motor 309-2 and rotor blades 310-2 may be disposed above a top side of the central body when the first and second arms are in the compact configuration. As previously described in connection with FIGS. 6A-6C, the first and second motors and rotor blades may face a first direction that extends upward from the top side when the first and second arms are in the compact configuration. As shown in FIGS. 7A and 7B, the tail of the central body may comprise a depression 313 configured to receive first and second motors 309-1 and 309-2 when the first and second arms are in the compact configuration.

FIGS. 8A-8D illustrate different schematic views of the UAV of FIGS. 7A and 7B as the third and fourth arms transform from a flight configuration to a compact configuration via a rotational and translational motion, in accordance with an embodiment. Part FIG. 8A shows all of the arms of the UAV in the flight configuration; FIG. 8B shows the third and fourth arms in a partially retracted configuration; and FIG. 8C shows the third and fourth arms in the compact configuration.

In FIGS. 8A-8D, a proximal end of at least one of a plurality of arms may be configured to move from a first location of the central body relative to a side of the central body when transforming from the flight configuration to the compact configuration, so that the distal end of the at least one of the plurality of arms is received at or near the first location in the compact configuration. The proximal end of the at least one of the plurality of arms may be configured to move toward a proximal end of at least one other of the plurality of arms when transforming from the flight configuration to the compact configuration, as described below.

In the embodiment of FIGS. 8A-8D, the UAV may comprise one or more linkages rotatably coupled to the third and fourth arms and the central body. The UAV may also comprise one or more rails that allow the third and fourth arms to translate along a side of the central body. The rails may include one or more grooves. As shown in FIG. 8A, a first rail 303-1 may be provided along the right side of the central body, and a second rail 303-2 may be provided along the left side of the central body. A proximal end of a first linkage 305-1 may be rotatably coupled to a joint 316-1 located at an end portion of the first rail near or at the tail of the central body. The joint 316-1 may be affixed to the end portion of the first rail. A distal end of the first linkage may be rotatably coupled to a joint 317-1 located along the third arm. The joint 317-1 may be configured to move with the third arm 304-3 as the third arm translates along the first rail. The joint 317-1 may be located between a proximal end 304-3(*p*) and a distal end 304-3(*d*) of the third arm. Referring to FIG. 8D, a distance between the joint 317-1 and the proximal end 304-3(*p*) may be denoted by l1, and a distance between the joint 317-1 and the distal end 304-3(*d*) may be denoted by l2. In some embodiments, l1 may be less than l2. Optionally, l1 may be greater than l2. Alternatively, l1 may be substantially equal to l2. Any ratio of l1 to l2 may be contemplated. The ratio of l1 to l2 may be calculated such that the third arm is capable of translating smoothly along the first rail when the first linkage rotates about the joints 316-1 and 317-1. In some cases, l1 may be about 30 mm, 35 mm, 40 mm, 45 mm, 50 mm, 55 mm, 60 mm, 65 mm, 70 mm, 75 mm, or 80 mm. Alternatively, l1 may be less than about 30 mm or greater than about 80 mm. In some cases, l2 may be about 50 mm, 55 mm, 60 mm, 65 mm, 70 mm, 75 mm, 80 mm, 85 mm, 90 mm, 95 mm, or 100 mm. Alternatively, l2 may be less than about 50 mm or greater than about 100 mm. In some embodiments, l1 may be about 54 mm and l2 may be about 79 mm.

A proximal end of a second linkage 305-2 may be rotatably coupled to a joint 316-2 located at an end portion of the second rail near or at the tail of the central body. The joint 316-2 may be affixed to the end portion of the first rail. A distal end of the second linkage may be rotatably coupled to a joint 317-2 located along the fourth arm. The joint 317-2 may be configured to move with the third arm as the third arm translates along the first rail. The joint 317-2 may be located between a proximal end 304-4(*p*) and a distal end 304-4(*d*) of the fourth arm. A distance between the joint 317-2 and the proximal end 304-4(*p*) may be denoted by l3, and a distance between the joint 317-2 and the distal end 304-4(d) may be denoted by l4. In some embodiments, l3 may be less than l4. Optionally, l3 may be greater than l4. Alternatively, l3 may be substantially equal to l4. Any ratio of l3 to l4 may be contemplated. The ratio of l3 to l4 may be calculated such that the fourth arm is capable of translating smoothly along the second rail when the second linkage rotates about the joints 316-2 and 317-2. In some embodiments, l1 may be substantially equal to l3, and l2 may be substantially equal to l4. In some alternative embodiments, l1 may be greater than or less than l3, and l2 may be greater than or less than l4. In some cases, l3 may be about 30 mm, 35 mm, 40 mm, 45 mm, 50 mm, 55 mm, 60 mm, 65 mm, 70 mm, 75 mm, or 80 mm. Alternatively, l3 may be less than about 30 mm or greater than about 80 mm. In some cases, l4 may be about 50 mm, 55 mm, 60 mm, 65 mm, 70 mm, 75 mm, 80 mm, 85 mm, 90 mm, 95 mm, or 100 mm. Alternatively, l4 may be less than about 50 mm or greater than about 100 mm. In some embodiments, l3 may be about 54 mm and l4 may be about 79 mm.

The proximal end of the third arm may be configured to translate/slide along the first rail on the right side of the central body when the first linkage rotates about the joints 316-1 and 317-1. The proximal end of the third arm may be coupled to the first rail via a first translatable joint configured to permit or effect translation of a portion of the third arm along the right side of the central body. Similarly, the proximal end of the fourth arm may be configured to translate/slide along the second rail on the left side of the central body when the second linkage rotates about the joints 316-2 and 317-2. The proximal end of the fourth arm may be coupled to the second rail via a second translatable joint configured to permit or effect translation of a portion of the fourth arm along the left side of the central body. Accordingly, the third and fourth arms may be configured to translate along the right and left sides of the central body during transformation from the flight configuration to the compact configuration.

As shown in FIG. 8B, the translation/sliding motion of the proximal ends of the third and fourth arms may occur in the direction of the positive X-axis. As the proximal ends of the third and fourth arms move from the tail towards the head of the central body, the distal ends of the third and fourth arms may start moving towards the end portions of the first and second rails where the proximal ends of the third and fourth arms were previously located (when the third and fourth arms are in the flight configuration). As shown in FIG. 8C, the distal ends of the third and fourth arms may be located at or nearby the respective end portions of the first and second rails that are near the tail of the central body, when the third and fourth arms are in the compact configuration.

Accordingly, in some embodiments, a proximal end of at least one of a plurality of arms may be (1) located at a first location when the arm is extended, and (2) configured to translate from the first location of the central body to a second location of the central body while transforming from the flight configuration to the compact configuration so that after the transformation, the distal end of the arm is located at or nearby the first location when the arm is in the compact configuration. The first location and the second location may be along the side of the central body, and separated by a length of the arm.

It should be appreciated that the form factor of the UAV can be improved by using the combination of translation and rotational motion of arms to transform between the flight configuration and the compact configuration. For example, the combination of translation and rotation motion of the arms can allow the arms to extend and fold under tight space constraints. Additionally, physical interference between the arms can be reduced when the arms are translating between the flight configuration and the compact configuration, compared to pure rotation of the arms.

As shown in FIGS. 8A-8D, the third arm may be arranged such that the third motor 309-3 and rotor blades 310-3 supported by the third arm face a first direction when the third arm is in the flight configuration, and the third motor 309-3 and rotor blades 310-3 face a second direction when the third arm is in the compact configuration. The second direction may be different from the first direction. In some embodiments, the second direction may be opposite to the first direction or orthogonal to the first direction. For example, as shown in FIG. 8A, the first direction may extend above the top side of the central body in a direction parallel to the negative Z-axis. As shown in FIG. 8C, the second direction may extend from the right side of the central body in a direction parallel to the positive Y-axis.

Similarly, the fourth arm may be arranged such that the fourth motor 309-4 and rotor blades 310-4 supported by the fourth arm face the first direction when the fourth arm is in the flight configuration, and the fourth motor 309-4 and rotor blades 310-4 face a third direction when the fourth arm is in the compact configuration. The third direction may be different from the first and/or second directions. For example, as shown in FIG. 8C, the third direction may extend from the left side of the central body in a direction parallel to the negative Y-axis. Accordingly, the second and third directions may be opposite to each other, and orthogonal to the first direction. In some embodiments, after a length of the third arm has translated along the first rail and is folded onto the first rail, the third arm may be rotated about a rotational axis parallel to the roll axis of the central body in a counterclockwise direction, such that the third motor and rotor blades rotate 90 degrees to face the second direction instead of the first direction. Similarly, in some embodiments, after a length of the fourth arm has translated along the second rail and is folded onto the second rail, the fourth arm may be rotated about a rotational axis parallel to the roll axis of the central body in a clockwise direction, such that the fourth motor and rotor blades rotate 90 degrees to face the third direction instead of the first direction.

In the embodiment of FIGS. 7A, 7B, and 8A-8D, the first and second motors and rotor blades may be located above a top side of the central body when the first and second arms are in the compact configuration. The third motor and rotor blades may be located against a right side of the central body when the third arm is in the compact configuration. The fourth motor and rotor blades may be located against a left side of the central body when the fourth arm is in the compact configuration. Accordingly, in this embodiment, the motors and rotor blades supported by the arms may be located on at least three sides of the central body when the arms are in the compact configuration.

As shown in FIGS. 7A, 7B, and 8A-8D, the tail of the central baby may comprise a depression 313 configured to receive a portion of the propulsion units when the first and second arms are in the compact configuration. For example, the depression may be configured to receive the first motor 309-1 and second motor 309-2 when the first and second arms are in the compact configuration.

In some embodiments, the joints 306-1, 306-2, 316-1, 317-1, 316-2, and 317-2 may comprise one or more elastic elements. Each elastic element may be configured to cause at least one of the plurality of arms (e.g., third and/or fourth arms) to automatically retract when the at least one of the plurality of arms is reversibly folded to a predetermined state. Each elastic element may also be configured to cause at least one of the plurality of arms (e.g., third and/or fourth arms) to automatically extend when the at least one of the plurality of arms is reversibly extended to a predetermined state. The predetermined state may be based on an angle between the first/second linkages and the third/fourth arms. Alternatively, the predetermined state may be based on an angle between the third/fourth arms and the first/second rails. Optionally, the predetermined state may be based on an angle between the first/second linkages and the first/second rails.

In some embodiments, a method for transformation of an unmanned aerial vehicle (UAV) may comprise providing the UAV in FIGS. 7A, 7B, and 8A-8D, and operating the UAV such that the UAV adopts the flight configuration and the compact configuration as previously described.

In some embodiments, a method of assembling an unmanned aerial vehicle (UAV) may comprise providing a central body of the UAV, and attaching to the central body a plurality of arms extendable from the central body. Each arm of the plurality of arms may be configured to support one or more propulsion units. At least one of the plurality of arms having a proximal end and a distal end relative to the central body may be configured to transform between (1) a flight configuration wherein the arm is extending away from the central body, and (2) a compact configuration wherein the arm is folded against the central body. A proximal end of the at least one of the plurality of arms may be (1) located at a first location when the arm is extended, and (2) configured to translate from the first location of the central body to a second location of the central body while transforming from the flight configuration to the compact configuration so that after the transformation, the distal end of the arm is located at or nearby the first location when the arm is in the compact configuration.

In some embodiments, a kit may comprise a plurality of arms that are configured to be attached to a central body of an unmanned aerial vehicle (UAV). Each arm of the plurality of arms may be configured to support one or more propulsion units. The kit may further comprise instructions for assembling the UAV, such that when the UAV is assembled according to the instructions, the assembled UAV is characterized in that: at least one of the plurality of arms having a proximal end and a distal end relative to the central body is configured to transform between (1) a flight configuration wherein the arm is extending away from the central body, and (2) a compact configuration wherein the arm is folded against the central body, and wherein a proximal end of the at least one of the plurality of arms is (1) located at a first location when the arm is extended, and (2) configured to translate from the first location of the central body to a second location of the central body while transforming from the flight configuration to the compact configuration so that after the transformation, the distal end of the arm is located at or nearby the first location when the arm is in the compact configuration. In some instances, the kit may further comprise the central body of the UAV. In some cases, at least one arm of said plurality of arms may comprise a translatable or rotatable joint so that a part of the at least one arm of said plurality of arms is configurable to translate or rotate relative to another part of the at least one arm of said plurality of arms.

FIGS. 9A-9D illustrate different schematic views of the UAV of FIGS. 8A-8D whereby at least one arm is configured to rotate about two non-parallel axes, in accordance with an embodiment. FIG. 9A shows a schematic view of the UAV from its front side (head) when the arms are in the flight configuration. FIG. 9B shows a schematic view of the UAV from its left side when the arms are in a compact configuration after the third and fourth propulsion units have been rotated by 180 degrees in a direction parallel to the roll axis. FIG. 9C illustrates the rotation of an arm supporting a propulsion unit about different rotational axes that are non-parallel to each other. FIG. 9D shows a schematic view of the UAV from its top side when the arms are in a compact configuration after the third and fourth propulsion units have been rotated by 90 degrees in a direction parallel to the roll axis.

In FIGS. 9A-9D, the third and fourth arms may be configured to rotate about two different non-parallel axes. For example, the fourth arm may be configured to rotate about the fourth rotational axis 307-4 that permits the fourth arm to transform between the flight configuration (shown in FIG. 9A) and the compact configuration (shown in FIG. 9B). The third arm may be configured to rotate about the third rotational axis 307-3 that permits the third arm to transform between the flight configuration and the compact configuration. The third and fourth arms may be further configured to rotate about rotational axes that are orthogonal to the third and fourth rotational axes. For example, the fourth arm may be configured to further rotate about a rotational axis 307-4(a) that is orthogonal to the fourth rotational axis 307-4. In some other embodiments, the rotational axis 307-4(a) need not be orthogonal to the fourth rotational axis 307-4. For example, the rotational axis 307-4(a) may be disposed at an acute angle or oblique angle to the fourth rotational axis 307-4.

FIG. 9C shows the rotation of an arm (e.g., third arm and fourth arm) during transformation between the flight configuration and the compact configuration. The joint may permit rotation of the arm about different rotational axes. For example, the joint may permit rotation of the arm about one axis ("rotating" motion) and further rotation of the arm about another axis ("twisting" motion). The "rotating" motion and the "twisting" motion of the arm may occur about non-parallel rotational axes. For example, the rotational axes may be orthogonal or oblique to each other.

FIG. 9B shows a schematic view of the UAV from its left side in a first compact configuration. In FIG. 9B, after the third and fourth arms (supporting the third and fourth propulsion units) have been rotated by about 180 degrees about the rotational axes 307-3(a) and 307-4(a), the third and fourth rotor blades may be located below the bottom side of the central body. In this first compact configuration, the third and fourth rotor blades may face downwards in a direction extending from the bottom side of the central body.

FIG. 9D shows a schematic view of the UAV from its top side in a second compact configuration. In FIG. 9D, after the third and fourth arms (supporting the third and fourth propulsion units) have been rotated by about 90 degrees about the rotational axes 307-3(a) and 307-4(a), the third rotor blades 310-3 may be located on the right side of the central body, and the fourth rotor blades 310-4 may be located on the left side of the central body. In this second compact configuration, the third rotor blades may face sideways in a direction extending from the right side of the central body. The fourth rotor blades may also face sideways in a direction extending from the left side of the central body It should be appreciated that the embodiment in FIGS. 9A-9D may be modified in various ways. For example, rotor blades supported by one arm may be located beneath the central body, and rotor blades supported by another arm may be located beneath or above the central body in a compact configuration. Alternatively, rotor blades supported by one arm may be located against a side of the central body, and rotor blades supported by another arm may be located beneath the central body, above the central body, or against a side of the central body in a compact configuration. Any arrangement of the rotor blades relative to the sides of the central body when the arms are in a compact configuration may be contemplated.

Figure 10A:
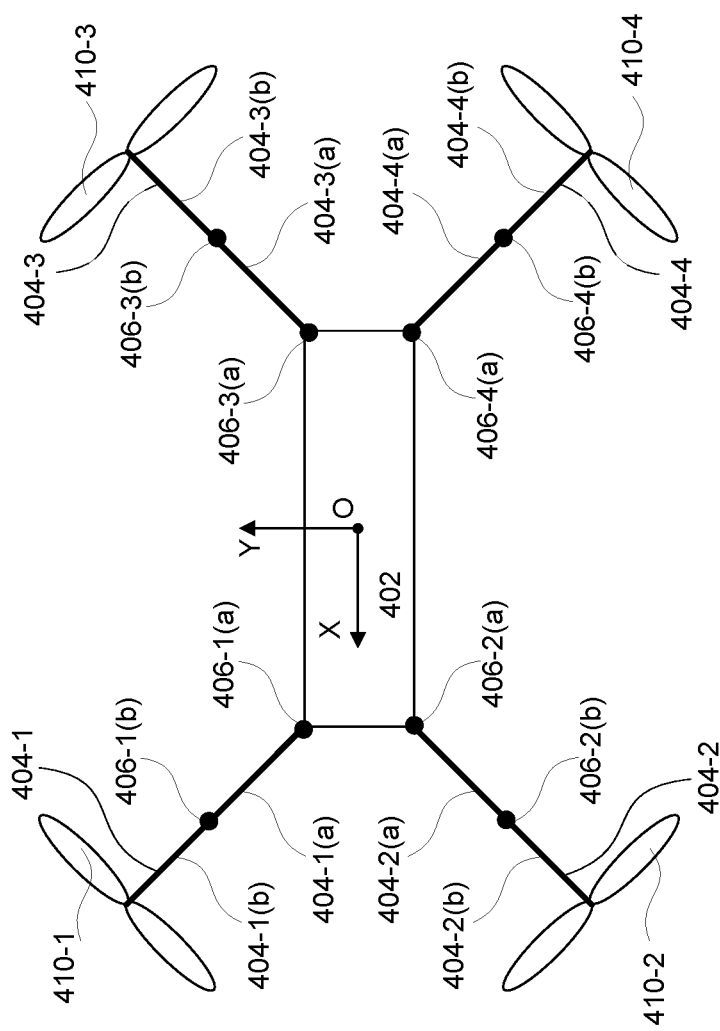
FIGS. 10A-10C illustrate different schematic views of a UAV having a plurality of arms each comprising a plurality of sections that can move relative to one other another as the arms transform from a flight configuration to a compact configuration, in accordance with an embodiment.
Figure 10B:
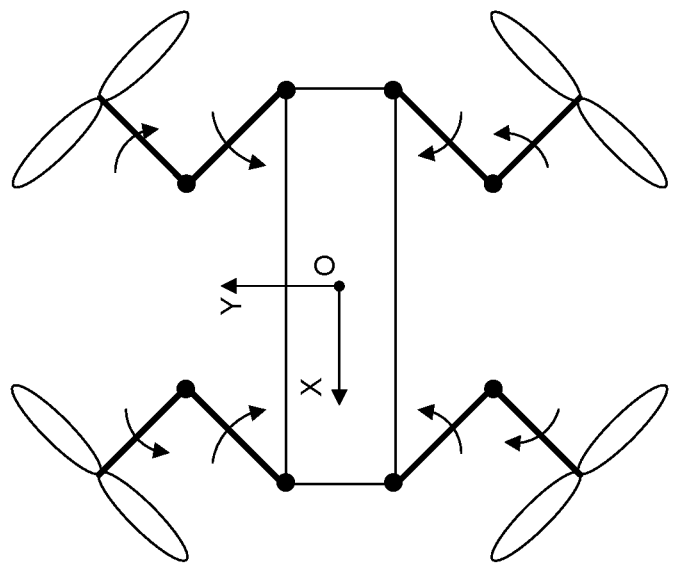
Figure 10C:
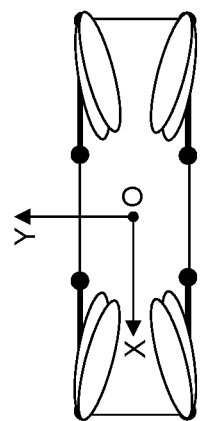

FIGS. 10A-10C illustrate different schematic views of a UAV having a plurality of arms each comprising a plurality of sections that can move relative to one another as the arms transform from a flight configuration to a compact configuration, in accordance with an embodiment. FIG. 10A shows the arms of the UAV in the flight configuration; FIG. 10B shows the arms in a partially retracted configuration; and FIG. 10C shows the arms in the compact configuration.

Referring to FIG. 10A, the UAV may comprise a central body 402 and a plurality of arms extendable from the central body. The plurality of arms may comprise a first arm 404-1 and a second arm 404-2 extendable from the head of the central body, and a third arm 404-3 and a fourth arm 404-4 extendable from the tail of the central body. Each arm may comprise a plurality of sections that can move relative to one other another as the arms transform from the flight configuration to the compact configuration. The plurality of sections may be rotatably coupled to each other. For example, the first arm may comprise a proximal section 404-1(a) and a distal section 404-1(b). One end of the proximal section 404-1(a) may be rotatably coupled to the head of the central body via a first joint 406-1(a) at or near the right side of the central body. The proximal section 404-1(a) and the distal section 404-1(b) may be rotatably coupled to each other via an auxiliary joint 406-1(b). The first joint 406-1(a) may permit the proximal section 404-1(a) to rotate about a rotational axis parallel to the yaw axis of the central body. The second joint 406-1(b) may permit relative rotation of the proximal section 404-1(a) and the distal section 404-1(b) about another rotational axis parallel to the yaw axis of the central body. The first joint 406-1(a) may be affixed to the head of the central body, while the auxiliary joint 406-1(b) may be configured to move with the first arm 404-1.

During transformation of the arms from the flight configuration to the compact configuration, the sections in the arms may rotate relative to each other such that the sections may be disposed at various angles to each other. As shown in FIG. 10B, rotation of the proximal section 404-1(a) about the first joint 406-1(a) in a clockwise direction may cause the proximal section 404-1(a) to move closer to the right side of the central body. At the same time, rotation of the distal section 404-1(b) about the auxiliary joint 406-1(b) in a counterclockwise direction may cause the distal section 404-1(b) to fold towards the proximal section 404-1(a). The sections in the other arms (second, third, and fourth arms) may be rotated in a similar way to transform those arms from the flight configuration to the compact configuration. When the arms are in the compact configuration, the sections within each arm can be folded close together, which minimizes the volume occupied the UAV.

As shown in FIG. 10C, the proximal end of an arm may be located at a first location when the arm is extended, and the distal end of the arm may be located at or nearby the first location when the arm is in the compact configuration. For example, the proximal end of the first arm may be located at the first joint 406-1(a) when the first arm is extended in the flight configuration, and the distal end (that supports first rotor blades 410-1) of the first arm may be located at or nearby the first joint 406-1(a) when the first arm is in the compact configuration.

FIGS. 11A-11D illustrate different schematic views of a UAV as a first pair of arms transforms from a compact configuration to a flight configuration when a portion of a central body of the UAV moves relative to another portion of the central body, in accordance with an embodiment.

FIG. 11A shows a schematic view of the arms in a compact configuration as viewed from the left side of a central body of the UAV. The UAV may comprise a central body 502 and a plurality of arms extendable from the central body. The plurality of arms may comprise a first arm 504-1 and a second arm 504-2 extendable from the head of the central body, and a third arm 504-3 and a fourth arm 504-4 extendable from the tail of the central body. The arms may be configured to rotate about rotational axes that are parallel to a yaw axis of the central body. For example, referring to FIG. 11A, the second arm 504-2 may be configured to rotate about a second rotational axis 507-2, the fourth arm 504-4 may be configured to rotate about a fourth rotational axis 507-4, and the second and fourth rotational axes may be parallel to the yaw axis.

FIG. 11B shows a schematic view when some of the arms are in a compact configuration as viewed from the top side of the central body of the UAV. The first and second arms may be extended in the flight configuration, and the third and fourth arms may be folded in the compact configuration. The central body may comprise two or more sections that can move relative to one another. For example, as shown in FIG. 11B, the central body 502 may comprise a bulk section 503-1 and a tail 503-2. The tail may be rotatably coupled to the bulk section via a shaft 518. The shaft may permit rotation of the tail relative to the bulk section about a roll axis 512-1 of the central body. Although FIG. 11 shows the tail being rotatably coupled to the bulk section, the disclosure is not limited thereto. In some embodiments, the head may be rotatably coupled to the bulk section. Optionally, both the head and tail may be rotatably coupled to the bulk section. The head and the tail may be configured to rotate relative to the bulk section about a same axis or different axes. In some embodiments, the head may be configured to rotate relative to the bulk section about a first axis, and the tail may be configured to rotate relative to the bulk section about a second axis. The first and second axes may be parallel, orthogonal, or oblique to each other.

Rotation of the head and/or tail relative to the bulk section can be used to provide a force for transforming an arm from the compact configuration to the flight configuration. The head and/or tail may be manually rotated by a user. Alternatively, the head and/or tail may be semi-automatically or automatically rotated by an actuator (e.g., a motor) connected to the shaft 518, with one or more external input signals (e.g., provided by a user, one or more sensors, etc.). Referring to FIGS. 11C and 11D, the third arm 504-3 may be rotatably coupled to the tail via a third joint 506-3. The third arm may be initially in the compact configuration and folded against the right side of the central body. When the tail rotates relative to the bulk section about the roll axis, a reaction force F may be exerted on the third arm by the bulk section when the third arm acts upon and pushes against the right side of the central body. The extension of the third arm (from the compact configuration to the flight configuration) may be effectuated by the reaction force being exerted on the third arm. For example, as shown in FIG. 11D, the reaction force may generate a moment that causes the third arm to rotate about the third joint in a clockwise direction (parallel to the yaw axis) and extend outwardly to the flight configuration. Accordingly, by using the embodiment of FIGS. 11A-11D, an end portion (e.g., head or tail) can be rotated relative to a bulk section of the central body to drive folded arms to rotate, and transform from the compact configuration to the flight configuration.

In some embodiments, rotation of the head and/or tail can be used to trigger operation of one or more components on board the UAV or an external device in communication with the UAV. For example, rotating the head and/or tail in a first direction beyond a threshold position may power on one or more components or the external device. Conversely, rotating the head and/or tail in a second direction beyond the threshold position may power off one or more components or the external device.

Figure 12A:
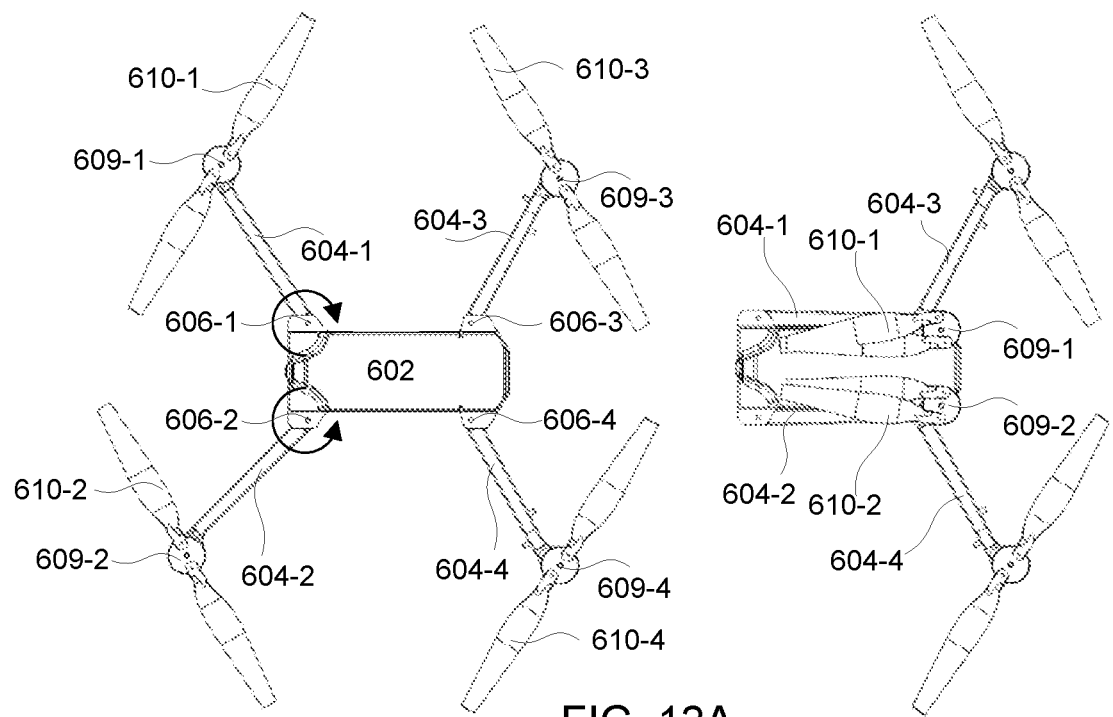
FIGS. 12A and 12B illustrate different schematic views of a UAV as the arms transform from a flight configuration to a compact configuration via a rotational motion, in accordance with an embodiment.
Figure 12B:
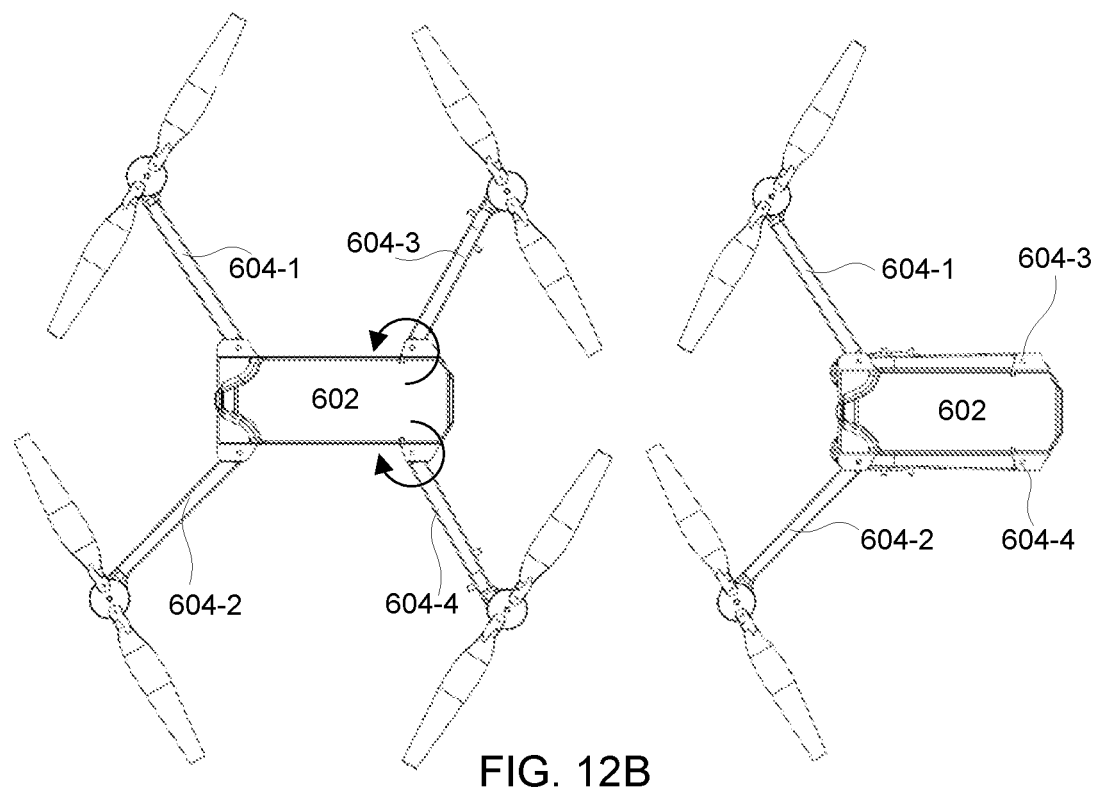

FIGS. 12A and 12B illustrate different schematic views of a UAV as the arms transform from a flight configuration to a compact configuration via a rotational motion, in accordance with an embodiment. The UAV may comprise a central body 602 and a plurality of arms extendable from the central body. The plurality of arms may comprise a first arm 604-1 and a second arm 604-2 extendable from the head of the central body, and a third arm 604-3 and a fourth arm 604-4 extendable from the tail of the central body. The arms may be configured to rotate about rotational axes that are parallel to a yaw axis of the central body during transformation between a flight configuration and a compact configuration. For example, referring to FIG. 12A, the first arm may be configured to rotate clockwise about a first rotational axis 606-1 when transforming from the flight configuration to the compact configuration. Similarly, the second arm may be configured to rotate counterclockwise about a second rotational axis 606-2 when transforming from the flight configuration to the compact configuration. The first and second rotational axes may be parallel to a yaw axis of the central body. When the first and second arms are in the compact configuration, the first and second arms may folded against the right and left sides of the central body, with first and second propulsion units located above the top side of the central body. The first propulsion unit may include a motor 609-1 and rotor blades 610-1. The second propulsion unit may include a motor 609-2 and rotor blades 610-2. The first and second rotor blades may be disposed facing a first direction in both the flight configuration and the compact configuration. The first direction may be parallel to the yaw axis of the central body.

Referring to FIG. 12B, the third arm may be configured to rotate counterclockwise about a third rotational axis 606-3 when transforming from the flight configuration to the compact configuration. Similarly, the fourth arm may be configured to rotate clockwise about a fourth rotational axis 606-4 when transforming from the flight configuration to the compact configuration. The third and fourth rotational axes may be parallel to a yaw axis of the central body. When the third and fourth arms are in the compact configuration, the third and fourth arms may be folded against the right and left sides of the central body. The third propulsion unit may include a motor 609-3 and rotor blades 610-3. The fourth propulsion unit may include a motor 609-4 and rotor blades 610-4. When in the compact configuration, the third and fourth propulsion units may be located below the bottom side of the central body. Alternatively, the third and fourth propulsion units may be located at the right and left sides of the central body. In some embodiments, the third and fourth arms (and/or the propulsion units supported thereon) may be rotated about two or more axes during the transformation, such that the arms and propulsion units can be located on any side of the central body, as described below with reference to FIGS. 13A-13D.

Figure 13A:
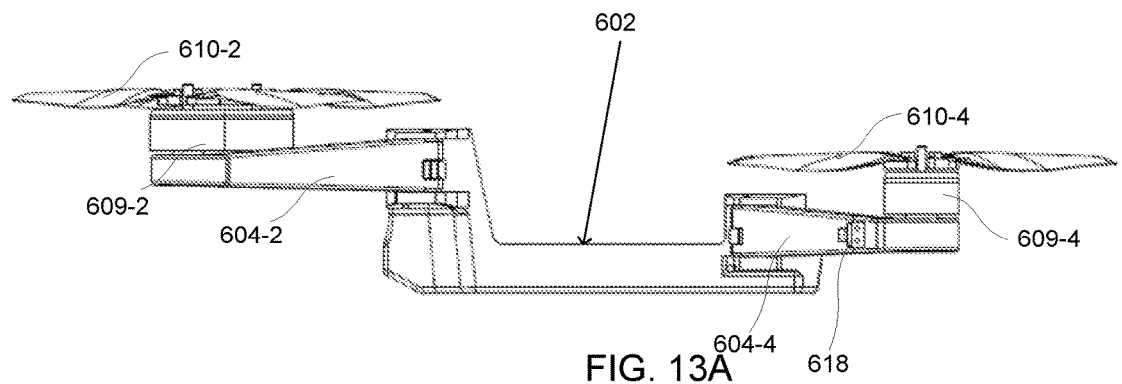
FIGS. 13A-13D illustrate different schematic views of the UAV of FIGS. 12A and 12B in which a portion of an arm that supports a propulsion unit is rotatable, in accordance with an embodiment.
Figure 13B:
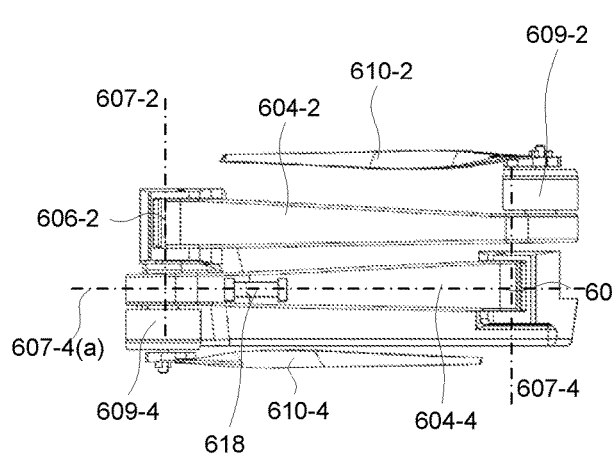
Figure 13D:
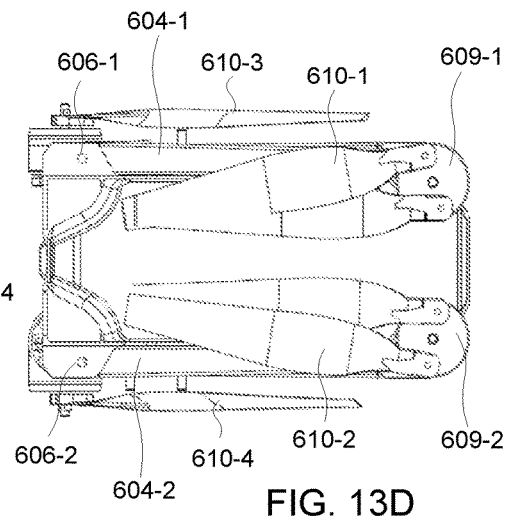
Figure 13C:
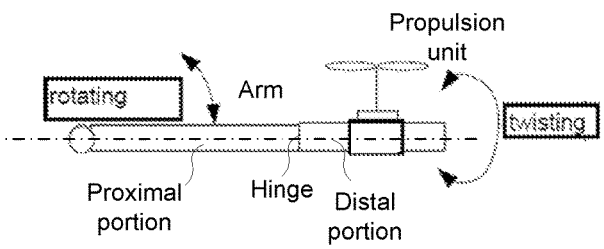

FIGS. 13A-13D illustrate different schematic views of the UAV of FIGS. 12A and 12B in which a portion of an arm that supports a propulsion unit is rotatable, in accordance with an embodiment. FIG. 13A shows a schematic view of the UAV from its left side when the arms are in a flight configuration. FIG. 13B shows a schematic view of the UAV from its left side when the arms are in a compact configuration. FIG. 13C illustrates the rotation of an arm and its propulsion unit about different rotational axes that are non-parallel to each other. FIG. 13D shows a schematic view of the UAV from its top side when the arms are in a compact configuration after the third and fourth propulsion units have been rotated by 90 degrees in a direction parallel to the roll axis.

In FIGS. 13A-13D, each of the third and fourth arms may comprise a distal portion that supports a propulsion unit and a proximal portion that is coupled to the central body. The distal portion and proximal portion may be rotatably coupled to each other by a hinge that allows the distal portion to rotate relative to the proximal portion. For example, referring to FIG. 13B, the distal and proximal portions of the fourth arm 604-4 may be rotatably coupled to each other by a hinge 618. The proximal portion of the fourth arm may be rotatably coupled to the central body by the joint 606-4 that permits the fourth arm to rotate about the fourth rotational axis 607-4. The hinge 618 may permit the distal portion of the fourth arm supporting the fourth propulsion unit (comprising the fourth motor 609-4 and rotor blades 610-4) to rotate about a rotational axis 607-4(a). The rotational axes 607-4 and 607-4(a) may be in different directions and may be non-parallel. For example, in FIG. 13B, the rotational axes 607-4 and 607-4(a) may be orthogonal to each other. In some other embodiments, the rotational axes 607-4 and 607-4(a) may be oblique to each other. FIG. 13C shows the rotation of portions of an arm about different axes during transformation between the flight configuration and the compact configuration. The arm may be collectively rotatable about an axis (e.g., rotational axis 607-4). A distal portion of the arm that supports a propulsion unit may be hinged to the proximal portion, and rotatable about another axis (e.g., rotational axis 607-4(a)). Relative rotation between the distal and proximal portions can be enabled by the hinge. The "rotating" motion of the arm and the "twisting" motion of the distal portion may occur about non-parallel rotational axes. As previously noted, the non-parallel rotational axes may be orthogonal or oblique to each other.

FIG. 13B shows a schematic view of the UAV from its left side in a first compact configuration. In FIG. 13B, after the distal portions on the third and fourth arms (supporting the third and fourth propulsion units) have been rotated relative to the proximal portions on the third and fourth arms by about 180 degrees, the third and fourth rotor blades may be located below the bottom side of the central body. In this first compact configuration, the third and fourth rotor blades may face downwards in a direction extending from the bottom side of the central body.

FIG. 13D shows a schematic view of the UAV from its top side in a second compact configuration. In FIG. 13D, after the distal portions on the third and fourth arms (supporting the third and fourth propulsion units) have been rotated relative to the proximal portions on the third and fourth arms by about 90 degrees, the third rotor blades may be located on the right side of the central body, and the fourth rotor blades may be located on the left side of the central body. In this second compact configuration, the third rotor blades may face sideways in a direction extending from the right side of the central body. The fourth rotor blades may also face sideways in a direction extending from the left side of the central body It should be appreciated that the embodiment in FIGS. 13A-13D may be modified in various ways. For example, rotor blades supported by one arm may be located beneath the central body, and rotor blades supported by another arm may be located beneath or above the central body in a compact configuration. Alternatively, rotor blades supported by one arm may be located against a side of the central body, and rotor blades supported by another arm may be located beneath the central body, above the central body, or against a side of the central body in a compact configuration. Any arrangement of the rotor blades relative to the sides of the central body when the arms are in a compact configuration may be contemplated.

Figure 14A:
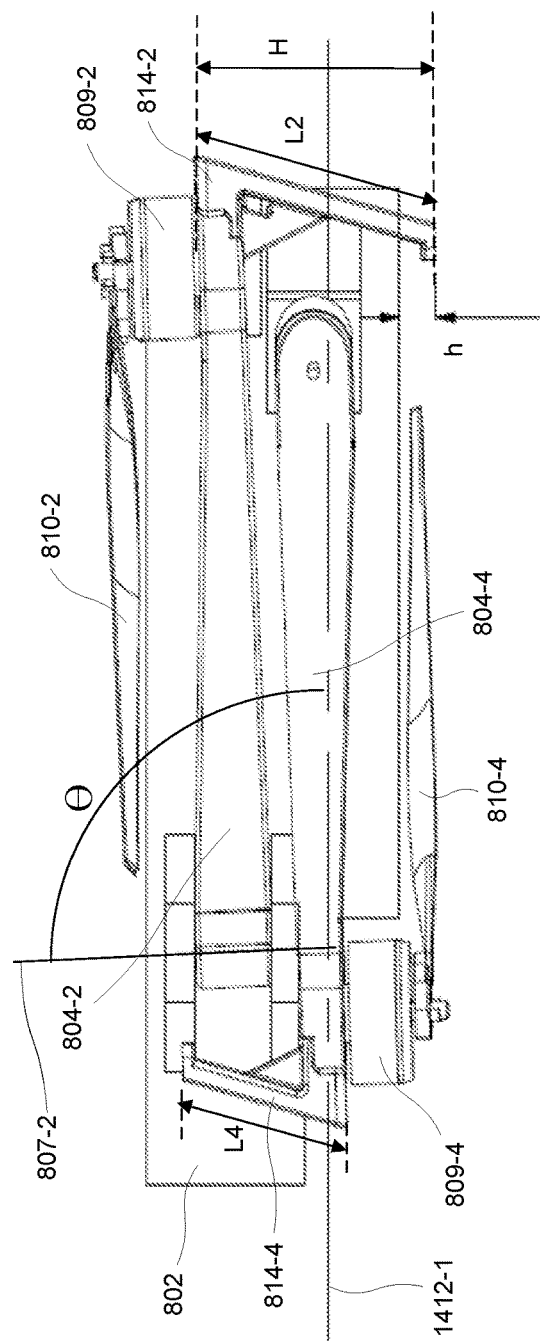
FIGS. 14A and 14B illustrate different schematic views of a UAV comprising elevated landing stands and arms that are rotatable about a tilted axis, in accordance with an embodiment.
Figure 14B:
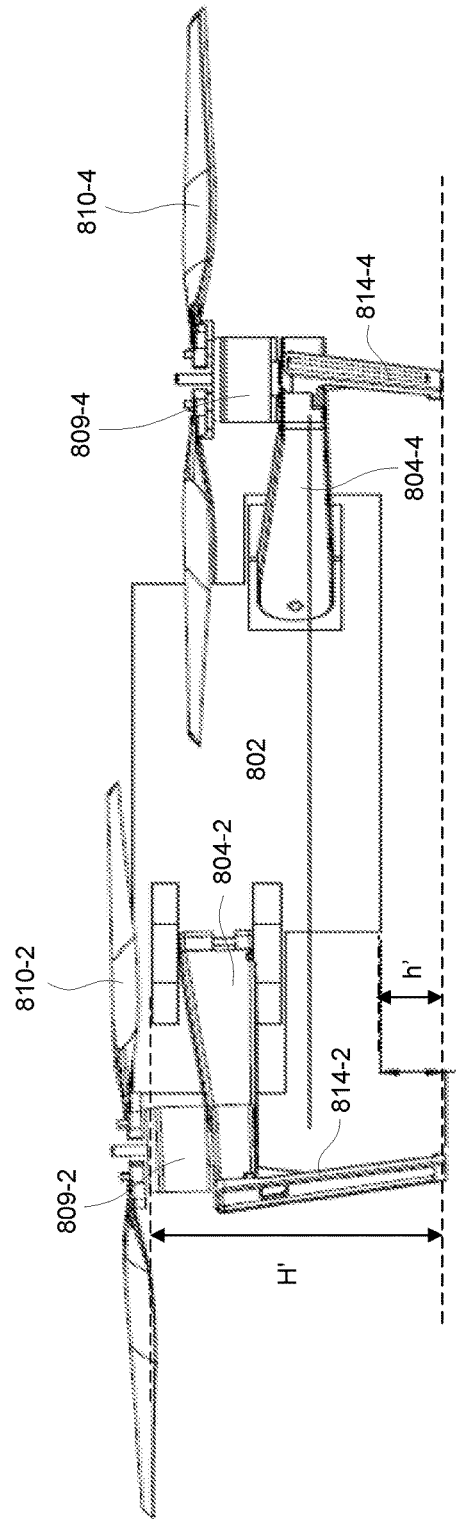

FIGS. 14A and 14B illustrate different schematic views of a UAV comprising elevated landing stands and arms that are rotatable about a tilted axis, in accordance with an embodiment. The UAV may comprise a central body 802 and a plurality of arms 804 extendable from the central body. A landing stand may be attached to a distal end of each arm. For example, a second landing stand 814-2 may be attached to a distal end of a second arm 804-2, and a fourth landing stand 814-4 may be attached to a distal end of the fourth arm 804-4. In some cases, the landing stands may be integrally formed with the arms. The landing stands may have different lengths. For example, as shown in FIG. 14A, the second landing stand may have a length L2 and the fourth landing stand may have a length L4, whereby L2 is greater than L4. In some cases, the landing stands may be movably coupled to the distal ends of the arms. The lengths of the first and second landing stands may be same or different. The lengths of the third and fourth landing stands may be same or different. In some cases, L2 may be about 20 mm, 25 mm, 30 mm, 35 mm, 40 mm, 45 mm, 50 mm, 55 mm, 60 mm, 65 mm, or 70 mm. Alternatively, L2 may be less than about 20 mm or greater than about 70 mm. In some cases, L4 may be about 10 mm, 15 mm, 20 mm, 25 mm, 30 mm, 35 mm, or 40 mm. Alternatively, L4 may be less than about 10 mm or greater than about 40 mm. In some embodiments, L4 may be less than L2. For example, L2 may be about 45 mm and L4 may be about 26 mm. The values for L2 and L4 may depend on a spacing between the first/second arms and the third/fourth arms in the compact configuration, and may be configured such that the landing stands contact the ground in a substantially horizontal manner when the UAV lands. Any values for the lengths of the landing stands may be contemplated.

In FIGS. 14A and 14B, each of the plurality of arms may be arranged such that the one or more rotor blades supported by the arm face a first direction when the arm is in the flight configuration, and the one or more rotor blades supported by the arm face a second direction when the arm is in the compact configuration, wherein the second direction is different from the first direction. The second direction may be opposite to the first direction or orthogonal to the first direction. For example, as shown in FIG. 14A, second rotor blades 810-2 supported by the second arm 804-2 may face a first direction extending from the top side of the central body, and fourth rotor blades 810-4 supported by the fourth arm 804-4 may face a second direction extending from the bottom side of the central body, whereby the first and second directions are opposite to each other. The second rotor blades 810-2 may be located above the top side of the central body, and the fourth rotor blades 810-4 may be located below the bottom side of the central body when the second and fourth arms in the compact configuration shown in FIG. 14A.

The embodiment in FIGS. 14A and 14B may be similar to the one shown in FIGS. 6A-6C except for the following differences. In FIGS. 14A and 14B, the first and second rotational axes 807-1 and 807-2 about which the first and second arms 804-1 and 804-2 rotate may be tilted at an angle such that the first and second rotational axes are not orthogonal to the roll axis 1412-1. For example, as shown in FIG. 14A, the second rotational axis 807-2 may be tilted at an angle $\theta$ to the roll axis 1412-1, and the angle $\theta$ may be an obtuse angle (>90 degrees). In some alternative embodiments, the angle $\theta$ may be an acute angle (<90 degrees). Accordingly, the first and second arms may be configured to rotate in a tilted manner, such that a height of the first and second arms is different between the flight configuration and the compact configuration. The height of the first and second arms may be defined relative to the central body. For example, as shown in FIG. 14A, a height H may be defined from the top side of the central body to an end of the second landing stand when the second arm is in the compact configuration. Similarly, a height h may be defined from the bottom side of the central body to the end of the second landing stand when the second arm is in the compact configuration. In some cases, the height h may correspond to a height clearance of the central body from a ground surface when the UAV is resting on the ground surface in the compact configuration. Accordingly, each of the first and second arms may be configured to rotate about a tilted rotational axis that causes a distal end of each of the first and second arms to move both horizontally and vertically relative to the central body when transforming between the flight configuration and compact configuration.

The landing stands may also be configured to move both horizontally and vertically relative to the central body when transforming between the flight configuration and compact configuration. When the angle $\theta$ is an obtuse angle, the first and second arms may be positioned at a higher level in the compact configuration compared to that in the flight configuration, such that the landing stands are elevated in a vertical direction in the compact configuration as compared to the flight configuration. For example, as shown in FIG. 14B, a height H' may be defined from the top side of the central body to an end of the second landing stand when the second arm is in the flight configuration, whereby H' is greater than H. Similarly, a height h' may be defined from the bottom side of the central body to the end of the second landing stand when the second arm is in the flight configuration, whereby h' is greater than h. In some cases, the height h' may correspond to a height clearance of the central body from a ground surface when the UAV is resting on the ground surface in the flight configuration.

Conversely, in some alternative embodiments, when the angle $\theta$ is an acute angle, the first and second arms may be positioned at a lower level in the compact configuration compared to that in the flight configuration. In those alternative embodiments, the height H' and h' in the flight configuration may be less than the height H and h in the compact configuration (not shown).

Accordingly, by adjusting the tilt angle $\theta$ of the rotational axes, the landing stands may be configured to extend below the bottom side of the central body at different heights in the flight configuration and the compact configuration. For example, increasing the tilt angle $\theta$ can increase the height h' when the first and second arms are extended out to the flight configuration. The increased tilt angle θ can increase the height clearance of the UAV, and may be useful to prevent the bottom side of the central body from contacting objects on the ground surface when the UAV is resting on the ground surface. Conversely, decreasing the tilt angle θ can reduce the height h' when the first and second arms are extended out to the flight configuration. The reduced tilt angle θ can decrease the height clearance of the UAV, and may be useful to provide greater stability to the UAV when the UAV is resting on a ground surface. Additionally, the form factor of the UAV can be reduced (i.e., made more compact) by modifying the tilt angle θ. For example, the landing stands can retract close to the central body when the arms are in the compact configuration, and extend out in an elevated manner when the arms are in the flight configuration.

The arms of a UAV in embodiments of the present disclosure can be configured to extend/retract between the flight configuration and the compact configuration in a semi-automatic manner. For example, when a user manually rotates the arms in the compact configuration, rotation of the arms beyond a threshold position can cause the arms to automatically extend to the flight configuration without further manual handling by the user. The automatic extension may be achieved using elastic elements in the rotating joints that provide a spring force, as described later with reference to FIGS. 17A, 17B, and 18.

The arms of a UAV in embodiments of the present disclosure can also be configured to extend/retract between the flight configuration and the compact configuration in fully automatic manner. This may be achieved using a reaction force exerted against the arm by the central body when the arm is in the compact configuration. The reaction force may be generated when the rotor blades on the arm rotates and pushes against a side of the central body. The reaction force can further act upon the arm to effectuate rotation of the arm, that causes the arm to extend out to the flight configuration. The arm may be coupled to a cam pivot joint that causes the arm to automatically extend out once the arm extends beyond a threshold position, as described below with reference to FIGS. 15A, 15B, and 16A-16C.

Figure 15B:
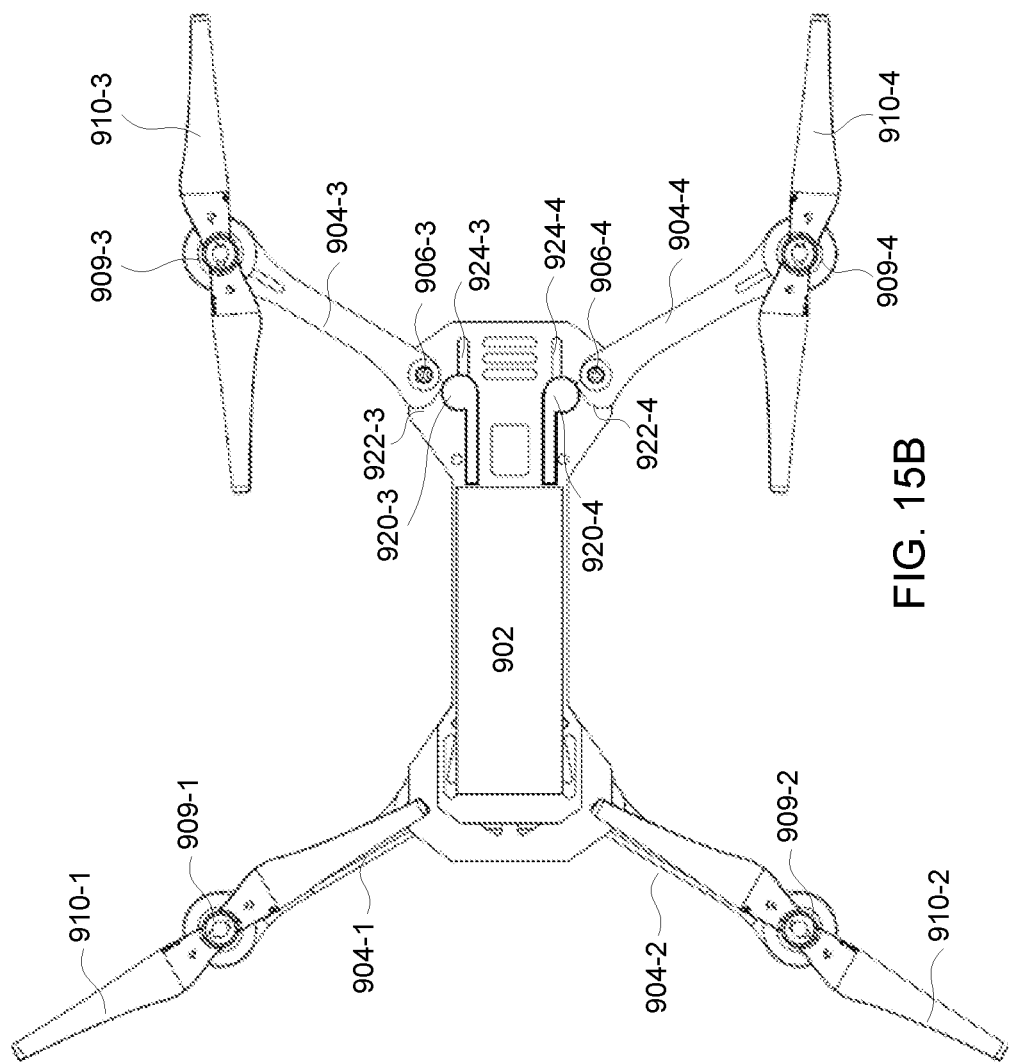
FIGS. 15A, 15B, and 16A-16C illustrate different schematic views of a UAV comprising arms that rotate about a cam pivot joint, in accordance with an embodiment.
Figure 15A:
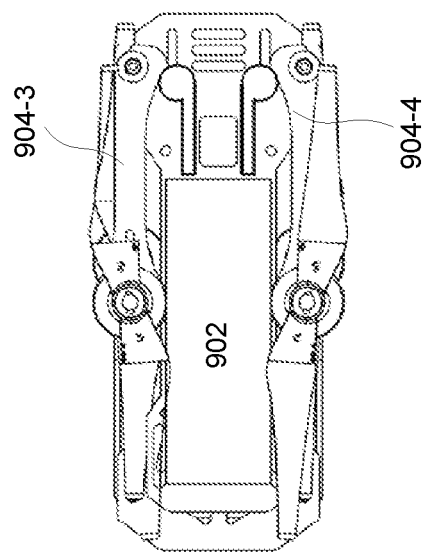

FIGS. 15A, 15B, and 16A-16C illustrate different schematic views of a UAV comprising arms that rotate about a cam pivot joint, in accordance with an embodiment. FIG. 15A shows the UAV when the arms are in the compact configuration, and FIG. 15B shows the UAV when the arms are in the flight configuration. FIG. 23A shows an isometric view of the UAV in FIG. 15B when the arms are in the flight configuration. FIG. 23B shows a schematic view of the UAV in FIG. 23A when viewed from the left side of the UAV. FIG. 23C shows a schematic view of the UAV FIG. 23A when viewed from the front side (head) of the UAV.

The UAV may comprise a central body 902 and a plurality of arms extendable from the central body. The plurality of arms include a first arm 904-1, a second arm 904-2, a third arm 904-3, and a fourth arm 904-4. The first arm 904-1 and the second arm 904-1 may be configured to rotate about rotational axes parallel to the yaw axis during transformation between the flight configuration and the compact configuration, similar to other embodiments described elsewhere herein.

The extension of the third arm 904-3 and the fourth arm 904-4 may be semi-automatic and enabled in part using cam pivot joints. As shown in FIG. 15B, the UAV may further comprise cam pivot joints each comprising a rotatable joint and a cam. For example, cams 920-3 and 920-4 may be disposed on a top side of the central body near the tail of the central body. The third arm may be coupled to the central body by a third joint 906-3, and the fourth arm may be coupled to the central body by a fourth joint 906-4. The third and fourth joints may permit rotation of the third and fourth arms relative to the central body through the cams 920-3 and 920-4. The third and fourth joints may comprise one or more elastic elements. The elastic elements may be configured to cause the third and fourth arms to automatically extend when the third and fourth arms are reversibly extended to a predetermined state (e.g., greater than a predefined angle relative to the central body). The elastic elements may also be configured to cause the third and fourth arms to automatically retract when the third and fourth arms are reversibly folded to a predetermined state (e.g., less than a predefined angle relative to the central body). The predefined angle may be less than 5 degrees, about 5 degrees, 10 degrees, 20 degrees, 30 degrees, or greater than 30 degrees.

A proximal end 922-3 of the third arm may be in contact with the cam 920-3, and a proximal end 922-4 of the fourth arm may be in contact with the cam 920-4. The proximal ends of the third and fourth arms can be configured to slide along a portion of the cams. For example, when the third arm is folded from the flight configuration to the compact configuration, the proximal end 922-3 of the third arm may slide along the cam 920-3 such that the proximal end of the third arm contacts a spring sheet 924-3. Similarly, when the fourth arm is folded from the flight configuration to the compact configuration, the proximal end 922-4 of the fourth arm may slide along the cam 920-4 such that the proximal end of the fourth arm contacts a spring sheet 924-4. The spring sheets may be configured to provide a spring force against the proximal ends of the third and fourth arms, such that the distal ends of the third and fourth arms (that support the propulsion units) are pressed against the sides of the central body to "lock" the arms when the arms are in the compact configuration.

In FIGS. 15A and 15B, extension of the third and fourth arms from the compact configuration to the flight configuration can be effectuated by a reaction force against each arm by the central body when the rotor blades supported thereon act upon and push against the sides of the central body. The extension may be triggered by a user input. In some embodiments, the user input may be provided via an external device in communication with the UAV. The user input may control the battery to provide power to the third and fourth propulsion units, such that the rotor blades thereon rotate and push against the right and left sides of the central body. As a result, reaction forces are generated against the third and fourth arms by the central body, that cause the third and fourth arms to extend out. When extension of the third and fourth arms reaches a threshold position, the distal ends of the third and fourth arms may automatically slide along the cams due to a spring force provided by the third and fourth joints. For example, when an angle of the third and fourth arms relative to the sides of the central body is greater than a predetermined angle, the third and fourth arms may automatically extend out to the flight configuration under the spring force and motion of the distal ends along the cams. Accordingly, the third and fourth arms can automatically unfold using the embodiment of FIGS. 15A and 15B without requiring a user to manually extend out the arms.

Figure 16C:
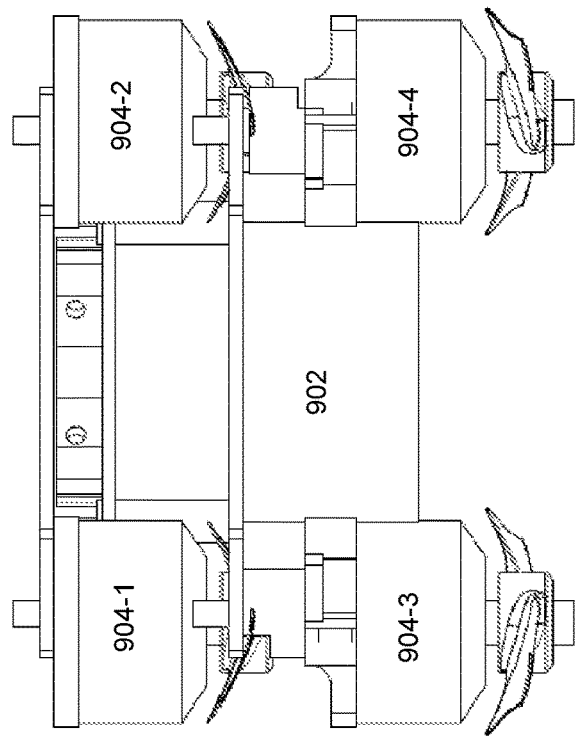
Figure 16A:
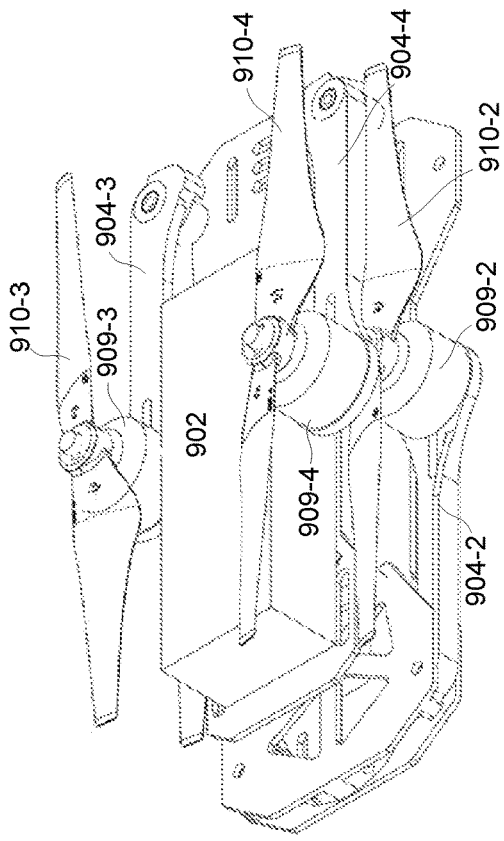
Figure 16B:
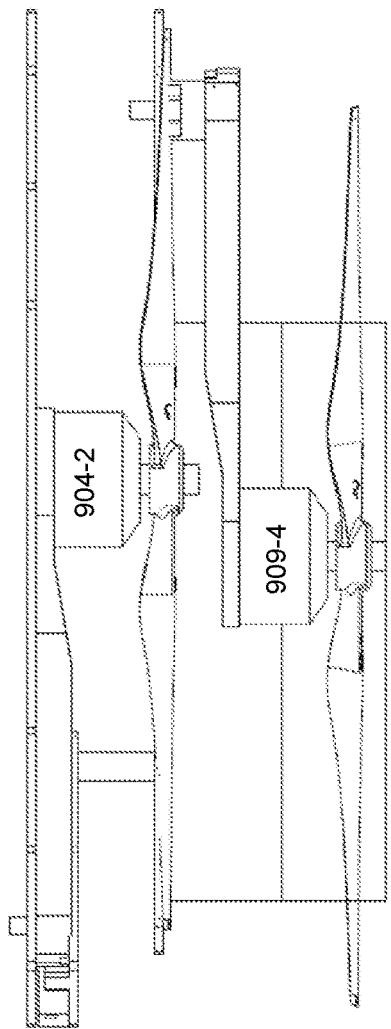

FIG. 16A shows an isometric view of the UAV in FIG. 15A when the arms are in the compact configuration. FIG. 16B shows a schematic view of the UAV in FIG. 16A when viewed from the left side of the UAV. FIG. 16C shows a schematic view of the UAV in FIG. 16A when viewed from the front side (head) of the UAV. As shown in FIGS. 16A-16C, the arms and propulsion units may be aligned substantially above one another on each side (left side and right side) of the UAV when the arms are in the compact configuration. For example, the first and third arms may be folded on the right side of the central body with the first and third propulsion units substantially above/below each other, when the first and third arms are in the compact configuration. Similarly, the second and fourth arms may be folded on the left side of the central body with the second and fourth propulsion units substantially above/below each other, when the second and fourth arms are in the compact configuration. All of the propulsion units (rotor blades and motors) may face in substantially a same direction when in the compact configuration.

As previously described, the arms of the UAV may be coupled to the central via joints. In some cases, each arm may comprise movable sections coupled together using joints or hinges. The joints and/or hinges may comprise one or more elastic elements. Each elastic element may be configured to cause at least one of the plurality of arms to automatically retract when the at least one of the plurality of arms is reversibly folded to a predetermined state. Additionally, each elastic element may be configured to cause at least one of the plurality of arms to automatically extend when the at least one of the plurality of arms is reversibly extended to a predetermined state. The elastic elements may also be used to lock the arms in place when the arms are in the flight configuration and/or the compact configuration. The elastic elements may be further configured to absorb vibrational forces exerted onto the arms when the arms are in the flight configuration and/or the compact configuration. Vibrational forces may be generated from the external environment (e.g., wind) or by actuation of the propulsion units (e.g., rotation of the rotor blades). Examples of components (e.g., elastic elements) in the joints and/or hinges are next described with reference to FIGS. 17A, 17B, and 18.

FIGS. 17A and 17B illustrate different schematic views of an arm and a joint comprising one or more elastic joint elements, in accordance with an embodiment. FIG. 17A shows an exploded view of an arm 1704 and the components within a joint. FIG. 17B shows a cross-sectional view of the assembled arm and joint.

As previously mentioned, the arm can be coupled to the central body by the joint. The joint may permit rotation and/or translation of the arm relative to the central body. As shown in FIG. 17A, the joint may include a sheath 1721, an elastic element 1722, upper clutch teeth 1723, lower clutch teeth 1724, and a shaft 1725. The sheath may be attached to an inner cavity at a proximal end of the arm.

The elastic element may be provided within an inner portion of the sheath. The elastic element may be a metal spring or a plastic spring. Optionally, the elastic element may be an elastomer. The elastic element may be made of a material having an elastic modulus of about 1 pound per square inch (PSi) to about 2000 PSi. In some cases, the elastic element may be made of a material having an elastic modulus of about 0.001 Pascal (Pa) to about 1 GPa. In some cases, the elastic element may be made of a material having an elastic modulus of about 1 GPa) to about 10 GPa. In some cases, the elastic element may be made of a material having an elastic modulus of about 10 GPa) to about 50 GPa. In some cases, the elastic element may be made of a material having an elastic modulus of about 50 GPa) to about 100 GPa. In some cases, the elastic element may be made of a material having an elastic modulus no greater than about 1000 gigapascal (GPa).

The upper clutch teeth may be configured to be inserted into the sheath. The upper clutch teeth may be capable of synchronously rotating with the sheath. In some cases, the upper clutch teeth may also be configured to slide axially along the sheath.

The lower clutch teeth may be attached to the central body. The shaft may be inserted into the sheath and the spring, and permits the arm to rotate about a longitudinal axis along the shaft. The spring provides an elastic force that causes the upper clutch teeth and the lower clutch teeth to engage. When the arm is rotating, the upper clutch teeth may be driven by the sheath, and slide axially along the sheath due to its engagement with the lower clutch teeth, which compresses the elastic element. Compression of the elastic element increases its elastic energy, which increases the driving force for rotation of the arm. As a result, the arm can automatically extend out using the force generated from the elastic element.

Figure 18:
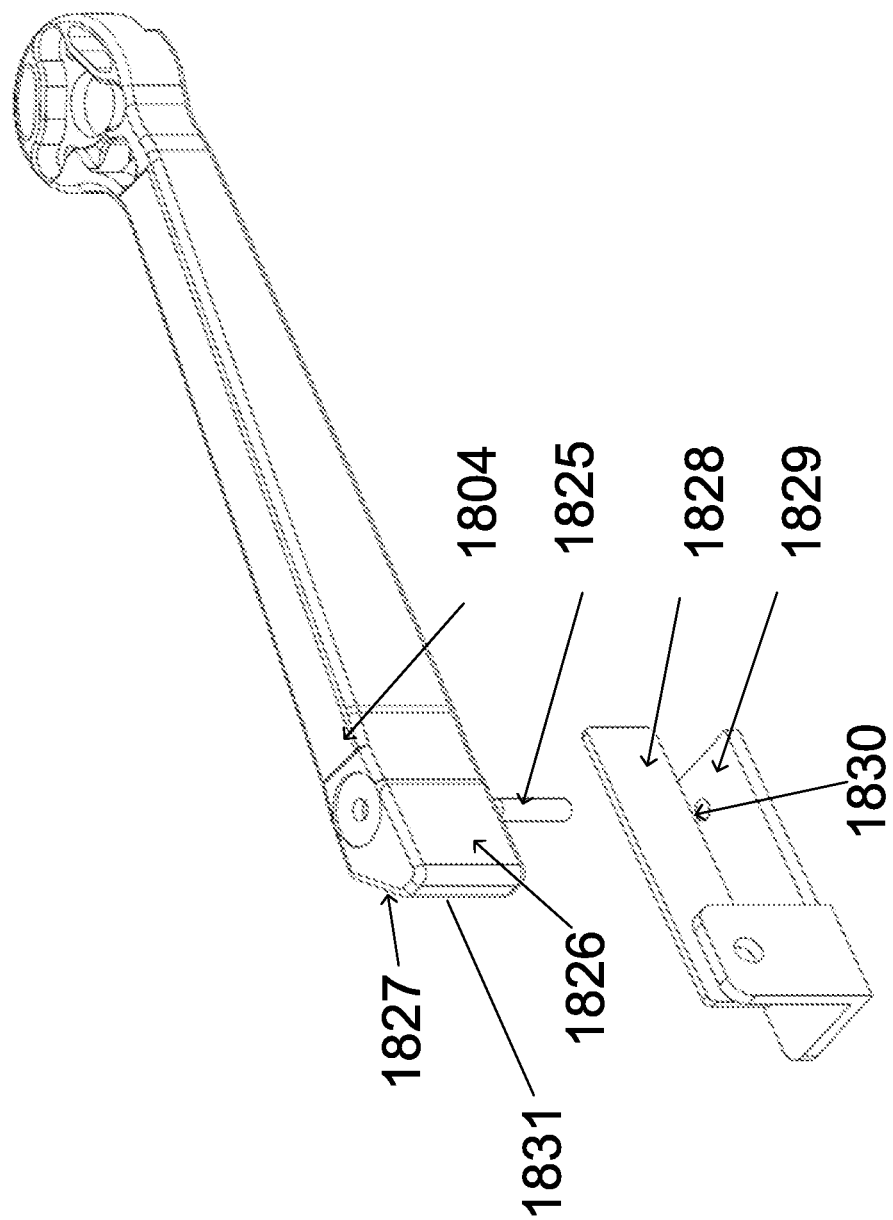
FIG. 18 illustrates a schematic view of an arm and a joint comprising one or more elastic elements, in accordance with an embodiment.

FIG. 18 illustrates a schematic view of an arm and a joint comprising one or more elastic elements, in accordance with an embodiment. As shown in FIG. 18, a shaft 1825 may be configured to be attached to a proximal end of the arm 1804. The proximal end may include a first portion 1826 and a second portion 1827. The first and second portions may be disposed at an angle relative to each other. The shaft may be configured to pass through a hole 1830 on a bracket 1829, thereby coupling the arm to the bracket. The bracket may be attached to a central body of a UAV. An elastic element 1828 may be affixed to the bracket. The elastic element may be, for example, a spring sheet capable of providing an elastic force to rotate the arm. The arm may be configured to rotate relative to the bracket, such that the first portion 1826 is in contact with a front surface of the elastic element when the arm is in a first position. The second portion 1827 may be in contact with a back surface of the elastic element when the arm is in a second position. The first and second positions may correspond to the extreme positions of the arm (e.g., when the arm is in the compact configuration and the flight configuration). The first and second positions may determine a degree of rotation of the arm. The degree of rotation may be based on the angle between the first and second portions of the distal end of the arm, as well as the position of the arm relative to the bracket (and elastic element). When the arm reaches the first and second positions, the elastic element may be elastically deformed. The deformation provides an elastic force to "lock" the arm at the first and second positions. In one example, during the folding of the arm to the compact configuration, the arm will rotate about a first direction, such that contact between the proximal end of the arm and the elastic element transitions from the first portion (front surface of elastic element) to the second portion (back surface of elastic element). Conversely, during the extension of the arm to the flight configuration, the arm will rotate about a second direction, such that contact between the proximal end of the arm and the elastic element transitions from the second portion (back surface of elastic element) to the first portion (front surface of elastic element). The elastic element may be configured to provide an elastic force against the first portion, the second portion, and a transitional surface 1831 to rotate the arm. The amount of elastic force may depend on an amount to which the elastic element is elastically deformed. The deformation of the elastic element is based on the elastic modulus of the element, as well as the angle between the first and second portions and the shape/profile of the transitional surface 1831.

Figure 19:
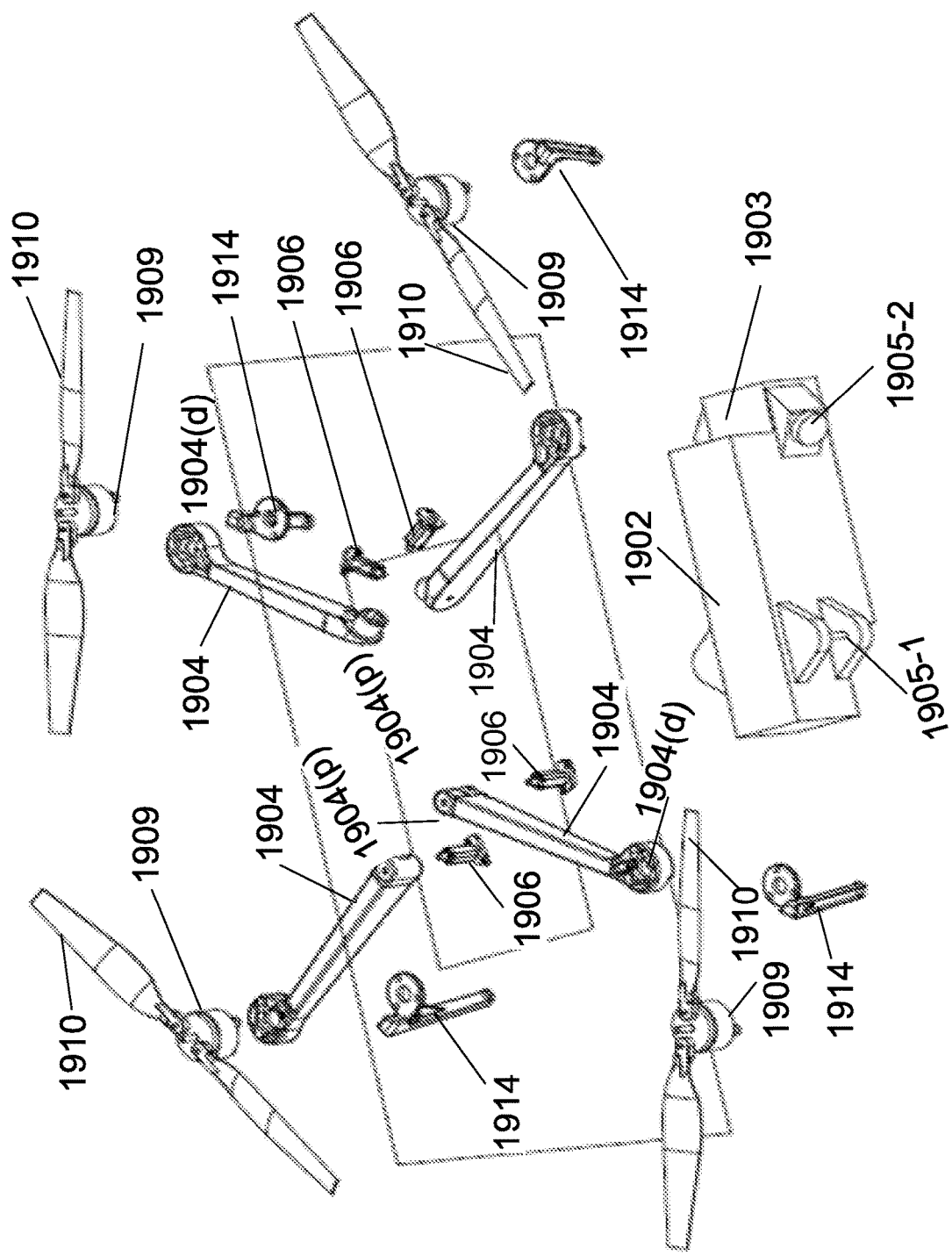
FIG. 19 illustrates an exploded schematic view of a UAV assembly kit, in accordance with an embodiment.

FIG. 19 illustrates an exploded schematic view of a UAV assembly kit, in accordance with an embodiment. The kit may include instructions to a user for assembling the UAV. The kit may comprise a plurality of different parts of a UAV. The parts may include any of the parts/components described elsewhere in the specification. The UAV may be configured to transform between a flight configuration and a compact configuration using any of the previously-described embodiments.

As shown in FIG. 19, a UAV assembly kit may include a central body 1902, a plurality of arms 1904, a plurality of propulsion units, a plurality of landing stands 1914, and a plurality of joints.

The central body may include a depression 1903 at a tail or head portion of the UAV. The depression may be configured to accommodate a portion of one or more propulsion units when the UAV is in the compact configuration. The central body may further include a first bracket 1905-1 and a second bracket 1905-2. The arms may be rotatably coupled to the central body at the first and second brackets using one or more joints. The arms may be configured to extend out in a flight configuration, and folded against one or more sides of the central body in a compact configuration. A proximal end 1904(*p*) of an arm may be coupled to the first or second bracket. In some embodiments, an arm coupled to the first bracket may be configured to rotate about a first rotational axis parallel to the yaw axis of the UAV. In some embodiments, an arm coupled to the second bracket may be configured to rotate about a second rotational axis that is different from the first rotational axis. The first and second rotational axes may be orthogonal or oblique to each other. In some cases, the second rotational axis may be at an acute angle or an obtuse angle relative to at least one of the roll, yaw, or pitch axes of the UAV.

Each propulsion unit may comprise a motor 1909 and rotor blades 1910. The motor may be coupled to a distal end 1904(*d*) of an arm. A landing stand may also be attached to a distal end of an arm below a propulsion unit.

Figure 20:
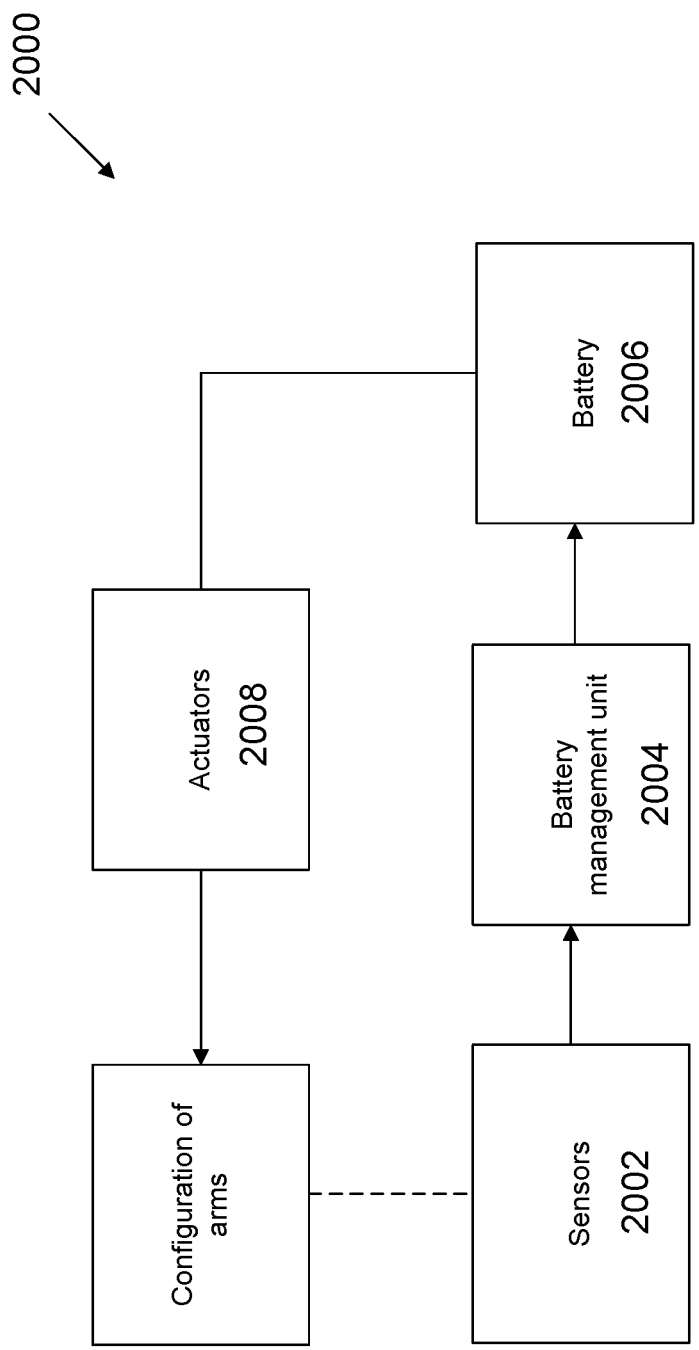
FIG. 20 is a block diagram of a system configured to control operation of a UAV based on its arm configuration, in accordance with an embodiment.

FIG. 20 is a block diagram of a system 2000 configured to control operation of a UAV based on its arm configuration, in accordance with an embodiment. The system may comprise one or more sensors 2002, a battery management unit 2004, one or more batteries 2006, and one or more actuators 2008 for effecting the transformation of the UAV between a compact configuration and a flight configuration.

One or more sensors may be configured to detect or obtain state information associated one or more arms. The state information may include velocity, orientation, attitude, gravitational forces, acceleration, position, and/or any other physical state experienced by the arms. For example, the state information may include an orientation of the arms relative to a central body of the UAV. The orientation may include an angle defined relative to at least one of the roll, yaw, or pitch axes of the UAV. In some embodiments, the one or more sensors may include an inertial measurement member comprising one or more gyroscopes, velocity sensors, accelerometers, magnetometers, and the like. In other embodiments, other types of state-detecting sensors may be used instead of or in addition to the inertial measurement member. The system may further include one or more processors configured to calculate posture information associated with the arms based on the state information obtained by the sensing system. For example, detected angular or linear velocity of the arms may be used to calculate a position of the arms with respect to the central body of the UAV, or to a pitch, roll and/or yaw axis of the UAV.

In some embodiments, the sensors may include electrical contact switches. An electrical contact switch may include a plurality of electrical contacts at different locations of the UAV. For example, a first electrical contact may be disposed on an arm, and a second electrical contact may be disposed at a joint coupling the arm to a central body of the UAV. The first and second electrical contacts may be electrically connected when the arms are at a predetermined position. Accordingly, an electrical signal may be generated when the arms are in the predetermined position. The predetermined position may correspond, for example, to an extended state of the arms in the flight configuration. Alternatively, the predetermined position may correspond to a predefined angle between one arm and the central body, or between two or more arms.

In some embodiments, the sensors may include mechanical switches. When the sensor is a mechanical switch, a shift lever of the mechanical switch may be mounted at a joint coupling an arm to a central body of the UAV. When the arms are at the predetermined position, a portion of the arm may push against the shift lever to trigger the switch.

The predetermined position may also correspond to a threshold position. The battery management unit 2004 may generate one or more control signals for controlling the battery based on the position of one or more arms. For example, when one or more arms extend beyond the threshold position, the battery management unit may switch on the battery. The battery management system may be further configured to control the amount of power to different components of the UAV. In some embodiments, when one or more arms extend beyond the threshold position, the battery management unit may provide power from the battery to a flight controller of the UAV.

The battery may be configured to provide power to one or more actuators to extend or fold the arms, based on one or more signals for controlling the configuration of the arms. The actuators may include, for example, one or more propulsion units located on one or more arms. Power may be provided to the propulsion units such that the rotor blades rotate and act upon the central body. When the rotor blades push against the central body, a reaction force is generated against the arm by the central body, which causes the arm to extend out to the flight configuration. The extension of one or more arms can be triggered by a user input provided via an external device in communication with the UAV. The acting upon and pushing of the one or more rotor blades against the central body can take place as the plurality of arms are being transformed from a compact configuration wherein the arms are folded against the central body, to a flight configuration wherein the arms are extended away from the central body.

In some embodiments, the actuators may include, for example, one or more actuators for moving a portion of the central body relative to another portion of the central body, so as to effectuate extension of one or more arms. The one or more actuators can be configured to rotate a tail of the central body relative to a bulk section of the central body, for example as shown in FIGS. 11C and 11D. As previously described, rotation of a portion of the central body relative to another portion of the central body can generate a reaction force by the central body against an arm, whereby the reaction force can effectuate the extension of the arm.

In some embodiments, the actuators may include, for example, one or more actuators configured to rotate an arm about one or more rotational axes (e.g., as shown in FIG.

9C). Alternatively, the one or more actuators can be configured to rotate a distal portion of an arm relative to a proximal portion of an arm about one or more rotational axes (e.g., as shown in FIG. 13C). The rotation of the arm can cause the arm to extend to a flight configuration or retract to a compact configuration, as described elsewhere herein. The rotation of the arm can also cause a propulsion unit (e.g., rotor blades and motor) located on the arm to face different directions relative to different sides of the central body. As previously described, the rotation of the arm(s) about different rotational axes can fold the arm(s) in a compact configuration to optimize space usage surrounding the central body.

Figure 21:
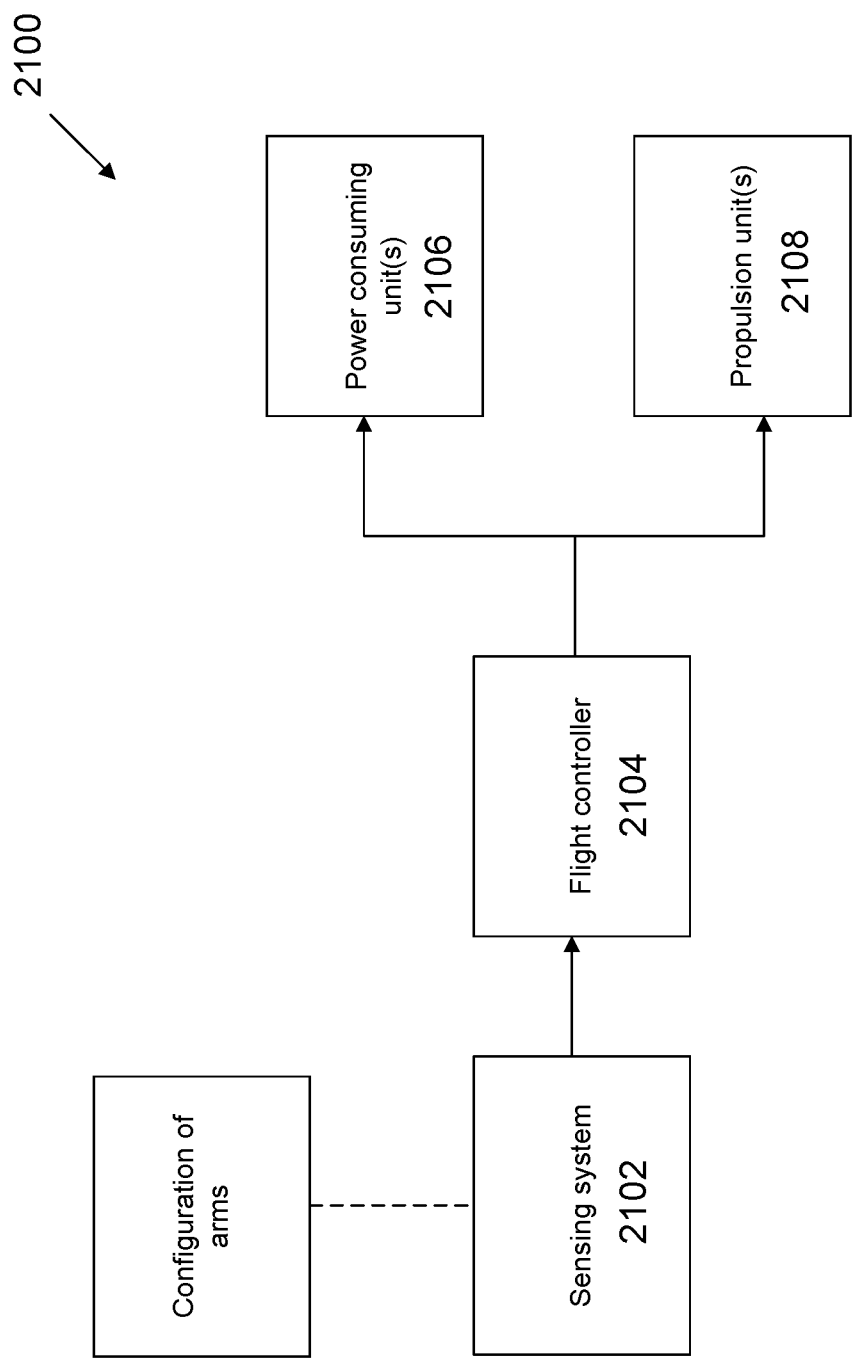
FIG. 21 is a block diagram of a system configured to control operation of a UAV based on its arm configuration, in accordance with another embodiment.

FIG. 21 is a block diagram of a system 2100 configured to control operation of a UAV based on its arm configuration, in accordance with another embodiment. System 2100 in FIG. 21 may be similar to system 2000 in FIG. 20 except for the following differences. In FIG. 21, the positional state of the arms may be provided to a flight controller 2104. The flight controller may be configured to control operation of one or more components on board the UAV or an external device in communication with the UAV, based on the position of the arms. For example, extension of at least one arm beyond a threshold position may trigger operation of the one or more components on board the UAV or the external device. The one or more components may include one or more power consuming unit(s) 2106, and one or more propulsion unit(s) 2108. A propulsion unit may include a propeller of the UAV. A propulsion unit may comprise a motor and rotor blades as described elsewhere herein.

A power consuming unit may be a non-propulsion unit of the UAV. In some embodiments, a power consuming unit may include a carrier for supporting a payload carried by the UAV. The carrier may include a motorized gimbal for controlling an orientation of the payload, such that the payload is moving in more than one degree of freedom relative to the central body of the UAV.

In some embodiments, when the arms reach or exceed a predetermined position, the flight controller may generate a signal to control the gimbal to extend out from a cavity within a central body of the UAV. Alternatively, the flight controller may also generate a signal to control the gimbal to retract into the cavity within the central body of the UAV.

In some embodiments, a power consuming unit may be a motorized retractable landing gear. The flight controller may be configured to control movement of the landing gear based on the position of the arms, such that landing gear is in an extended state or retracted state. For example, the flight controller may retract the landing gear when the UAV is not in use or being carried around by a user. The flight controller may extend the landing gear when the UAV is to land on a surface (or placed on the surface).

A power consuming unit may also be one or more components able to collect and/or store information. It may be desirable to provide continuous power to the power consuming unit for constant information processing, retrieval, or storage. The power consuming unit may be one or more of the following controllers (i.e., control units) communication unite, navigation unit, emitter (e.g., light or audio emitter), and/or sensors. Examples of sensors may include but are not limited to location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own source) and passive sensors (e.g., sensors that detect available energy).

The arms of the UAV in any of the embodiments described herein may be configured to efficiently and quickly transform between the flight configuration and the compact configuration. For instance, in some embodiments, the transformation of the arms between the flight configuration and the compact configuration may be on the order of about 1 s, 2 s, 3 s, 4 s, 5 s, or 6 s.

Figure 24C:
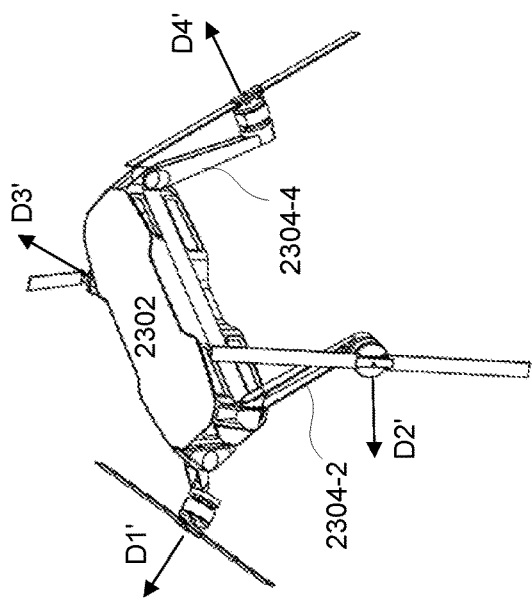
FIGS. 24A-24D illustrate different schematic views of a UAV as the arms transform from a flight configuration to a compact configuration via a rotational motion, in accordance with another embodiment.
Figure 24D:
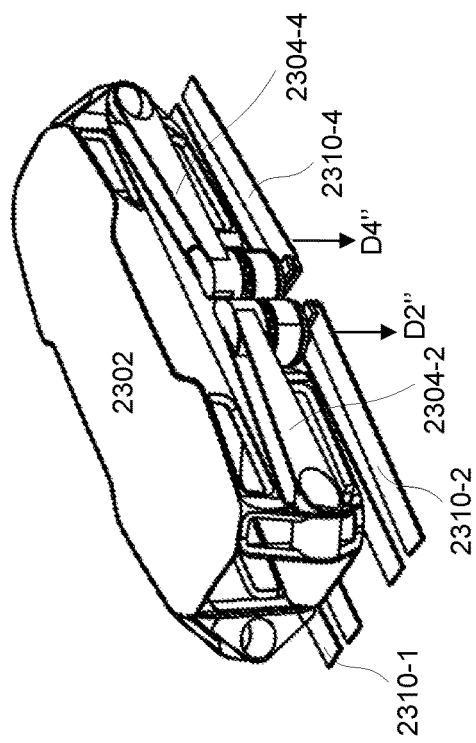
Figure 24A:
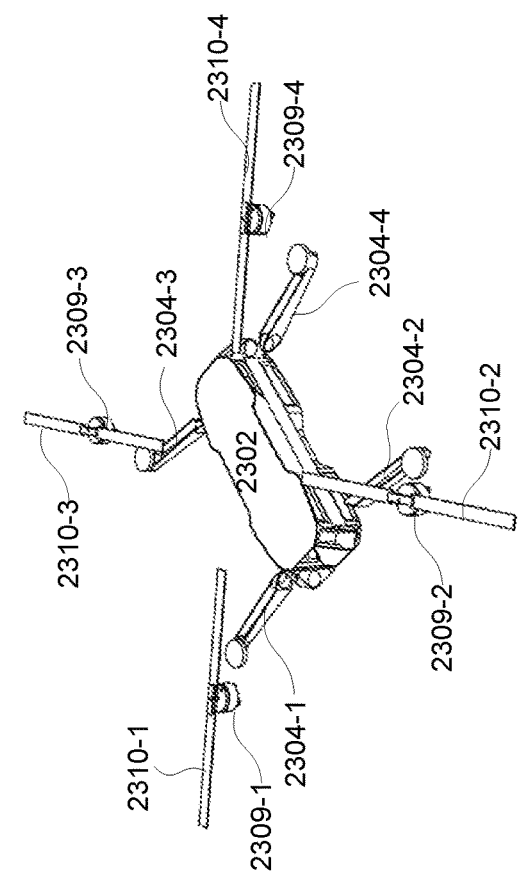
Figure 24B:
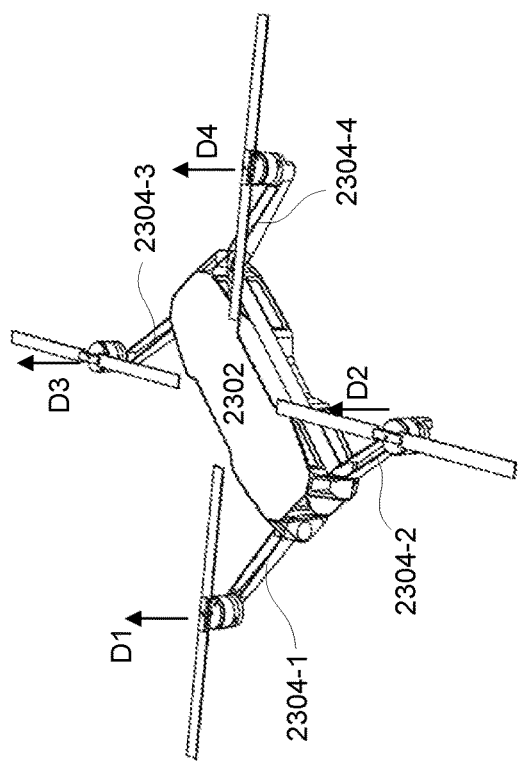

FIGS. 24A-24D illustrate different schematic views of a UAV as its arms transform from a flight configuration to a compact configuration via rotation about different axes, in accordance with another embodiment. A UAV may comprise a central body 2302 and a plurality of arms extendable from the central body. The central body may correspond to an airframe or a housing of the UAV. The plurality of arms may include a first arm 2304-1 and a second arm 2304-2 extendable from a head of the central body, and a third arm 2304-3 and a fourth arm 2304-4 extendable from a tail of the central body. Propulsion units may be attachable on distal ends of the arms. For example, as shown in FIGS. 24A and 24B, a first propulsion unit (comprising a first motor 2309-1 and rotor blades 2310-1) may be attached onto a distal end of the first arm; a second propulsion unit (comprising a second motor 2309-2 and rotor blades 2310-2) may be attached onto a distal end of the second arm; a third propulsion unit (comprising a third motor 2309-3 and rotor blades 2310-3) may be attached onto a distal end of the third arm; and a fourth propulsion unit (comprising a fourth motor 2309-4 and rotor blades 2310-4) may be attached onto a distal end of the fourth arm.

FIG. 24B shows a schematic view of the UAV when the arms are in the flight configuration. When the arms are in the flight configuration, the first, second, third, and fourth rotor blades may respectively face a first direction D1, second direction D2, third direction D3, and fourth direction D4. The first to fourth directions D1, D2, D3, and D4 may extend substantially in a same direction (e.g., from a top side of the central body).

FIG. 24C shows a schematic view of the UAV during folding of the arms from the flight configuration to the compact configuration. The arms may fold by rotating about one or more rotational axes. The rotation of the arms may cause an orientation of the propulsion units on the arms to change. For example, as shown in FIG. 24C, the first direction in which the first rotor blades face may change from D1 to D1', the second direction in which the second rotor blades face may change from D2 to D2', the third direction in which the third rotor blades face may change from D3 to D3', and the fourth direction in which the fourth rotor blades face may change from D4 to D4'. The directions D1', D2', D3', and D4' may extend in substantially different directions, and may be oblique or orthogonal to one another, as shown in FIG. 24C.

FIG. 24D shows a schematic view of the UAV when the arms are in the compact configuration. As shown in FIG. 24D, all of the arms may be folded below the bottom side of the central body. The first and third arms may be folded against the right side of the central body, and the second and fourth arms may be folded against the left side of the central body. The first and third arms may or may not overlap. The second and fourth arms may or may not overlap. When the arms are in the compact configuration, the first, second, third, and fourth rotor blades may respectively face a first direction D1" (not shown), second direction D2", third direction D3" (not shown), and fourth direction D4". The first to fourth directions D1", D2", D3", and D4" may extend substantially in a same direction (e.g., from a bottom side of the central body). In the example of FIGS. 24A-24D, the directions (D1, D2, D3, and D4) of the rotor blades when the arms in the flight configuration may be opposite to the directions (D1", D2", D3", and D4") of the rotor blades when the arms in the compact configuration.

Figure 25A:
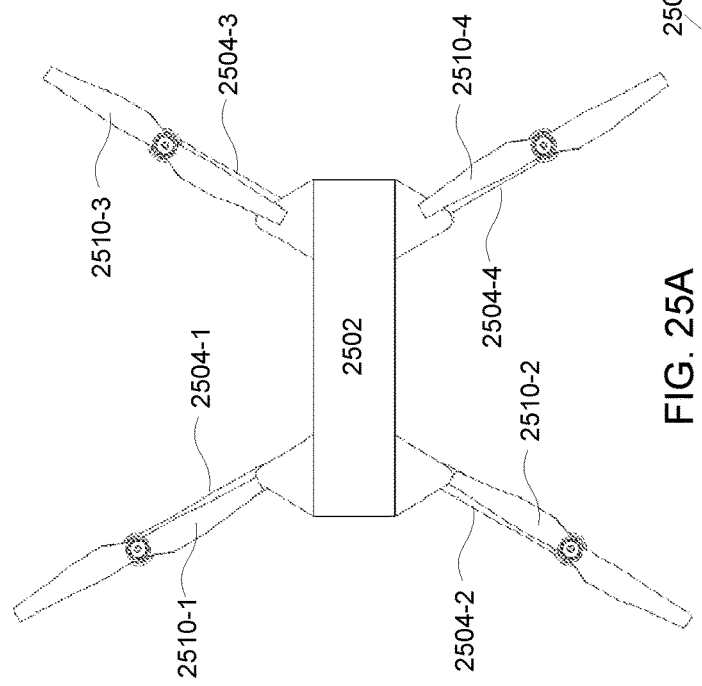
FIGS. 25A-25C illustrate different schematic views of a UAV as the arms transform from a flight configuration to a compact configuration via a rotational motion, in accordance with a further embodiment.
Figure 25C:
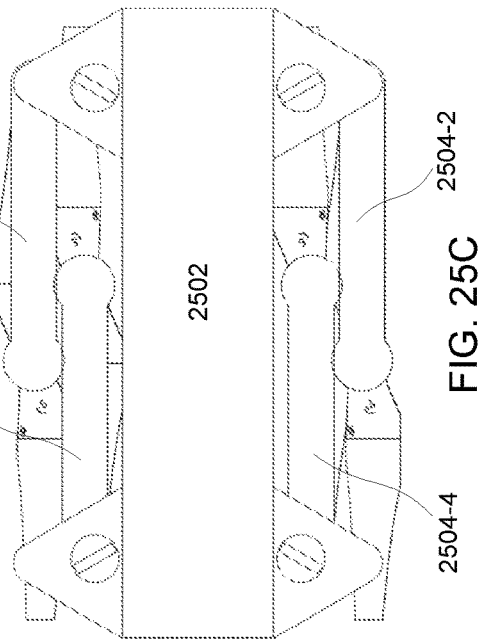
Figure 25B:
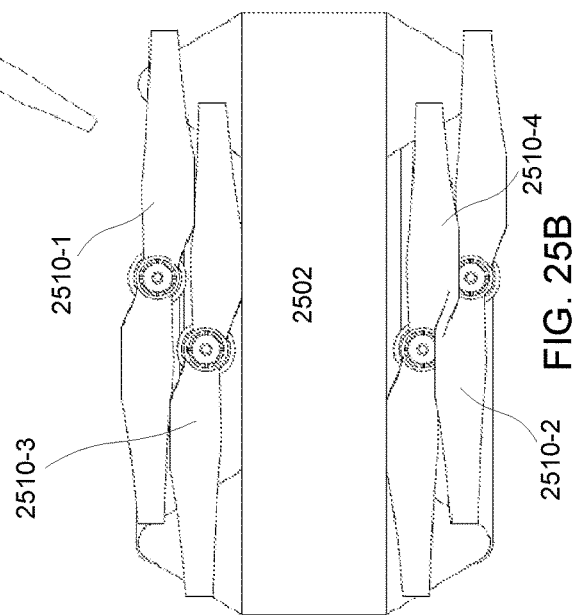

FIGS. 25A-25C illustrate different schematic views of a UAV as its arms transform from a flight configuration to a compact configuration via rotation about different axes, in accordance with another embodiment. A UAV may comprise a central body 2502 and a plurality of arms extendable from the central body. The central body may correspond to an airframe or a housing of the UAV. The plurality of arms may include a first arm 2504-1 and a second arm 2504-2 extendable from a head of the central body, and a third arm 2504-3 and a fourth arm 2504-4 extendable from a tail of the central body. Propulsion units may be attachable on distal ends of the arms. For example, as shown in FIGS. 25A and 25B, a first propulsion unit (comprising rotor blades 2510-1) may be attached onto a distal end of the first arm; a second propulsion unit (comprising rotor blades 2510-2) may be attached onto a distal end of the second arm; a third propulsion unit (comprising rotor blades 2510-3) may be attached onto a distal end of the third arm; and a fourth propulsion unit (comprising rotor blades 2510-4) may be attached onto a distal end of the fourth arm.

FIG. 25A shows a schematic view of the UAV from its top side when the arms are extended out in the flight configuration. FIG. 25B shows a schematic view of the UAV from its top side when the arms are folded in the compact configuration. FIG. 25C shows a schematic view of the UAV from its bottom side when the arms are folded in the compact configuration. As shown in FIGS. 25A and 25B, the rotor blades on the arms face substantially a same direction (e.g., extending from the top side of the central body) when the arms are in the flight configuration and the compact configuration.

Figure 26A:
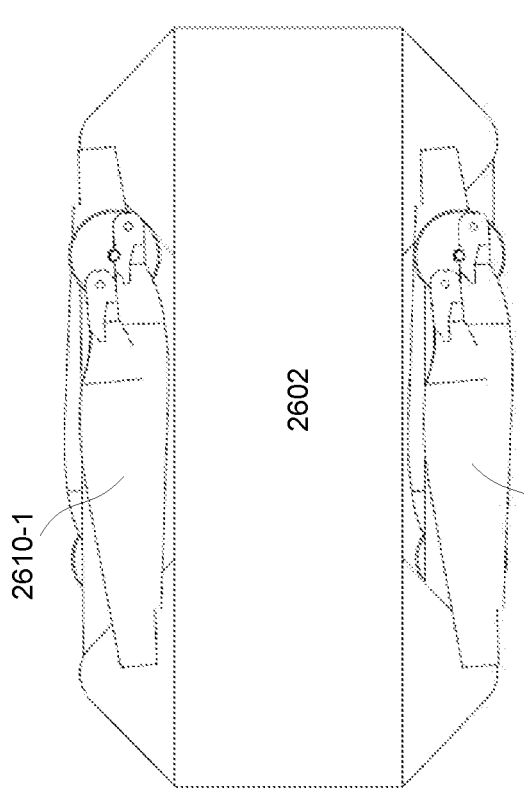
FIGS. 26A and 26B illustrate different schematic views of a UAV when the arms in a compact configuration, in accordance with an embodiment.
Figure 26B:
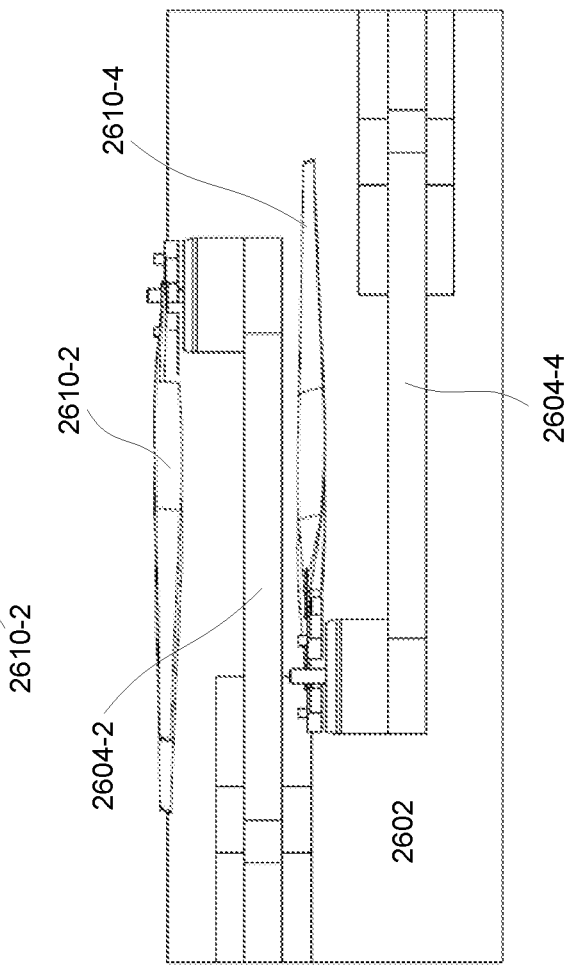

FIGS. 26A and 26B illustrate different schematic views of a UAV when its arms are in a compact configuration, in accordance with an embodiment. FIG. 26A shows a schematic view of the UAV from its top side, and FIG. 26B shows a schematic view of the UAV from its left side. As shown in FIG. 26A, when the arms are in the compact configuration, first rotor blades 2610-1 on a first arm and second rotor blades 2610-2 on a second arm may be facing a same direction (e.g., extending from the top side of the central body). As shown in FIG. 26B, fourth rotor blades 2610-4 on a fourth arm 2604-4 may also face the same direction as the second rotor blades on the second arm (i.e., extending from the top side of the central body). Third rotor blades on a third arm may also face the same direction as the first rotor blades on the first arm (not shown). Similar to the example of FIGS. 25A-25C, the rotor blades on the arms in FIGS. 26A and 26B may face substantially the same direction (e.g., extending from the top side of the central body) when the arms are in the flight configuration and the compact configuration.

Figure 27A:
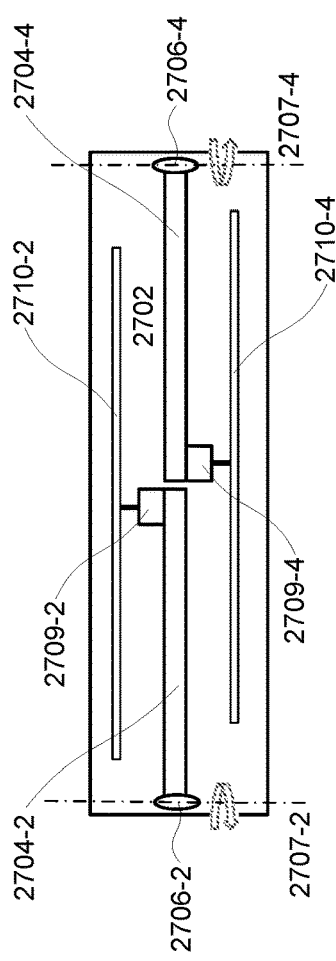
FIGS. 27A-27C illustrate different schematic views of a UAV having non-foldable rotor blades and the arms of the UAV are configured to transform between a compact configuration and a flight configuration, in accordance with a further embodiment.
Figure 27B:
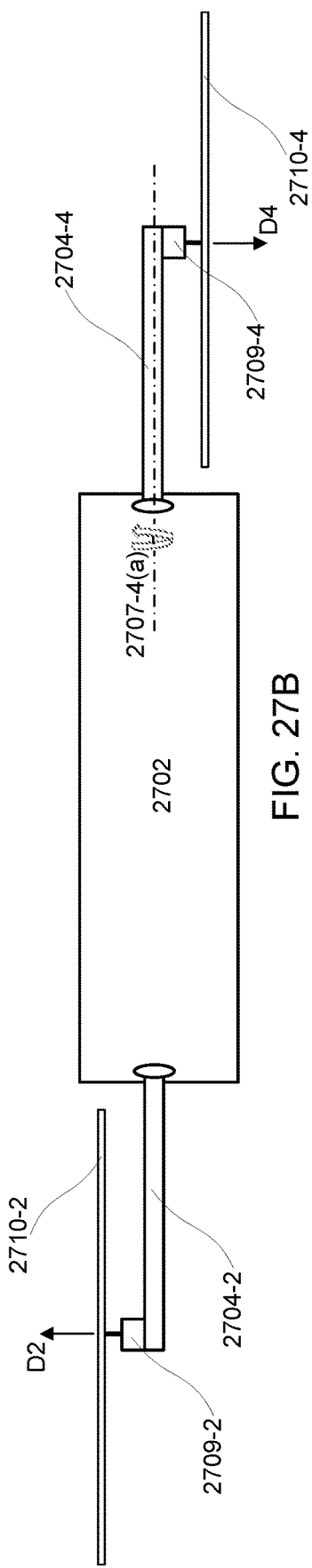
Figure 27C:
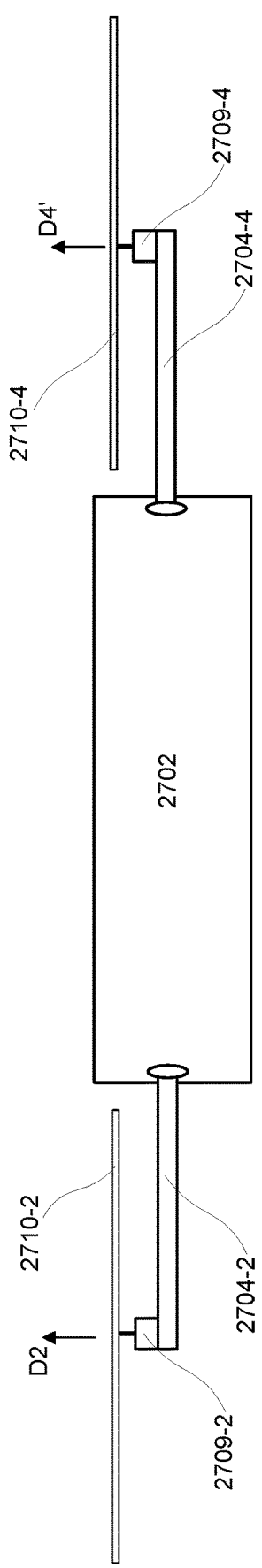

FIGS. 27A-27C illustrate different schematic views of a UAV having non-foldable rotor blades and the arms of the UAV are configured to transform between a compact configuration and a flight configuration, in accordance with a further embodiment. A UAV may comprise a central body 2702 and a plurality of arms extendable from the central body. The central body may correspond to an airframe or a housing of the UAV. The plurality of arms may include a first arm 2704-1 (not shown) and a second arm 2704-2 extendable from a head of the central body, and a third arm 2704-3 (not shown) and a fourth arm 2704-4 extendable from a tail of the central body. Propulsion units may be attachable on distal ends of the arms. For example, a first propulsion unit (comprising first rotor blades 2710-1, not shown) may be attached onto a distal end of the first arm; a second propulsion unit (comprising second rotor blades 2710-2) may be attached onto a distal end of the second arm; a third propulsion unit (comprising third rotor blades 2710-3, not shown) may be attached onto a distal end of the third arm; and a fourth propulsion unit (comprising fourth rotor blades 2710-4) may be attached onto a distal end of the fourth arm. The rotor blades may be non-foldable. Each set of rotor blades in a propulsion unit may be formed as a single rigid component, such that no sections within a set of rotor blades are movable relative to one another. For example, sections within a set of rotor blades may not be capable of rotating or translating relative to one another.

In the example shown in FIGS. 27A-27C, a length of the rotor blades on each arm may be greater than a length of the arm. In some embodiments, a length of the rotor blades may be about 10%, 20%, 30%, 40%, 50%, 60%, 10%, 80%, 90%, 100%, 125%, 150%, 175%, 200%, or greater than 200% of the length of the arm.

FIG. 27A shows a schematic view of the UAV from its left side when the arms are in the compact configuration. As shown in FIG. 27A, the second arm and the fourth arm may be folded on the left side of the central body when the arms are in the compact configuration. The second and fourth arms may be aligned with each other in a same line, or on a same plane. The second propulsion unit may comprise a second motor 2709-2 and the second rotor blades 2710-2 disposed on the distal end of the second arm, such that the second motor and the second rotor blades substantially face an upward direction D2 (relative to the central body). The fourth propulsion unit may comprise a fourth motor 2709-4 and the fourth rotor blades 2710-4 disposed on the distal end of the fourth arm, such that the fourth motor and the fourth rotor blades substantially face a downward direction D4 (relative to the central body). The directions D2 and D4 may be substantially opposite to each other. The second propulsion unit may be located on one side of the second arm, and the fourth propulsion unit may be located on one side of the fourth arm, such that the second and fourth propulsion units are not aligned in a same line or on a same plane. The second rotor blades may be disposed above, adjacent, or proximate to the top side of the central body when the second arm is in the compact configuration. Conversely, the fourth rotor blades may be disposed below, adjacent, or proximate to the bottom side of the central body when the fourth arm is in the compact configuration.

FIG. 27B shows a schematic view of the UAV from its left side when the arms are extended out partially in the flight configuration. As shown in FIG. 27B, the second arm and the fourth arm may extend out from the central body when the arms are partially in the flight configuration. For example, the second arm may be extended out by rotating the second arm about a second joint 2706-2 relative to a second rotational axis 2707-2. The fourth arm may be extended out by rotating the fourth arm about a fourth joint 2706-4 relative to a fourth rotational axis 2707-4. The second and fourth rotational axes may be parallel to a yaw axis of the central body. When the second arm is extended out as shown in part B, the second propulsion unit may continue to face the upward direction D2. Similarly, when the fourth arm is extended out as shown in part B, the fourth propulsion unit may continue to face the downward direction D4.

FIG. 27C shows a schematic view of the UAV from its left side when the arms are extended out fully in the flight configuration. As shown in FIG. 27C, the fourth arm may be rotated relative to a rotational axis 2707-4(*a*), such that the fourth propulsion unit faces an upward direction D4'. The upward direction D4' may be substantially opposite to the downward direction D4, and may be substantially parallel to the upward direction D2.

The fourth arm may be rotated relative to the rotational axis 2707-4(*a*) using, for example, the embodiment shown FIG. 9C. Alternatively, the fourth propulsion unit on the distal end of the fourth arm may be rotated relative to the rotational axis 2707-4(*a*) using, for example, the embodiment shown FIG. 13C. The rotation of the arm (or the distal end of the arm) can cause a propulsion unit (e.g., rotor blades and motor) located on the arm to face different directions relative to different sides of the central body. As previously described, the rotation of the arm(s) about different rotational axes can fold the arm(s) in a compact configuration to optimize space usage surrounding the central body.

The systems, devices, and methods described herein can be applied to a wide variety of movable objects. As previously mentioned, any description herein of an aerial vehicle may apply to and be used for any movable object. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

In some embodiments, a UAV can include a propulsion system having a plurality of rotors. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length. For example, the length can be less than or equal to 2 m, or less than equal to 5 m. In some embodiments, the length can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touch-screen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 22:
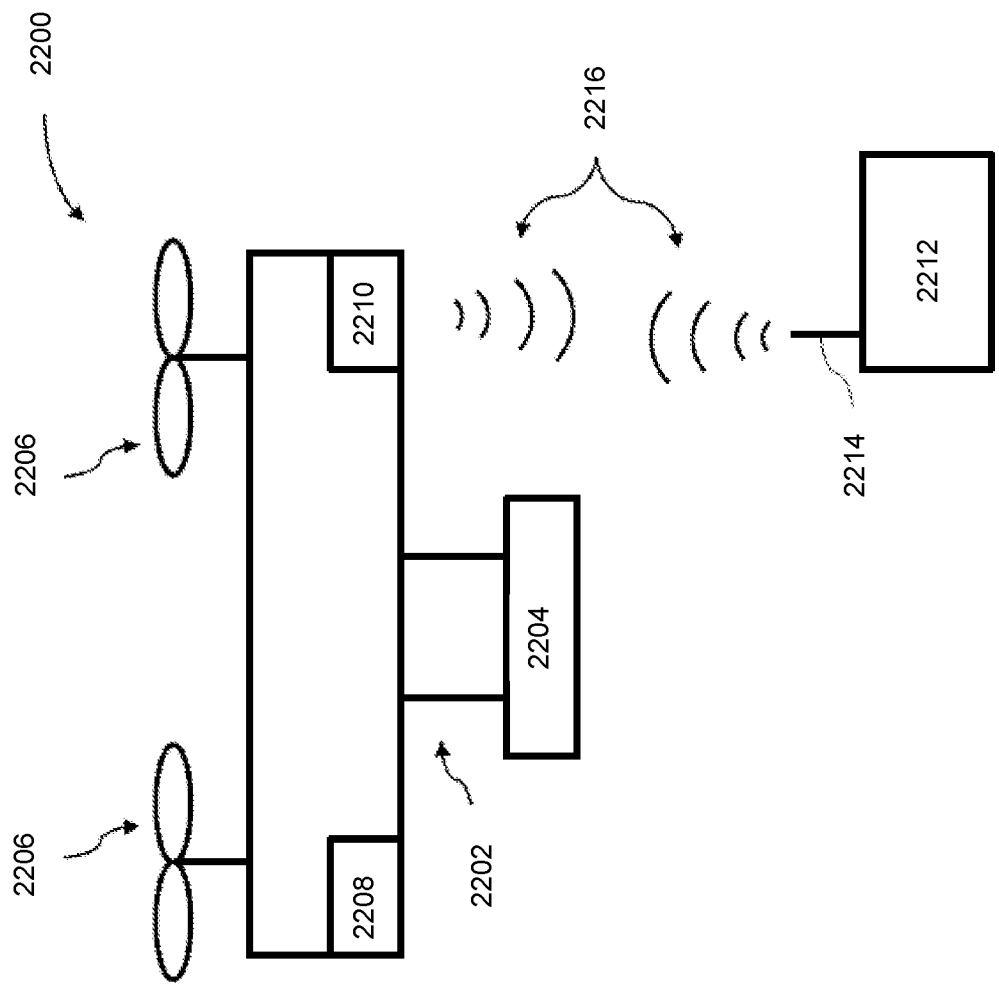
FIG. 22 illustrates a movable object, in accordance with embodiments.

FIG. 22 illustrates a movable object 2200 including a carrier 2202 and a payload 2204, in accordance with embodiments. Although the movable object 2200 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 2204 may be provided on the movable object 2200 without requiring the carrier 2202. The movable object 2200 may include propulsion mechanisms 2206, a sensing system 2208, and a communication system 2210.

The propulsion mechanisms 2206 can include one or more of rotors, propellers, blades, engines, motors, wheels, axles, magnets, or nozzles, as previously described. For example, the propulsion mechanisms 2206 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 2206 can be mounted on the movable object 2200 using any suitable means, such as a support element (e.g., a drive shaft) as described elsewhere herein. The propulsion mechanisms 2206 can be mounted on any suitable portion of the movable object 2200, such on the top, bottom, front, back, sides, or suitable combinations thereof.

In some embodiments, the propulsion mechanisms 2206 can enable the movable object 2200 to take off vertically from a surface or land vertically on a surface without requiring any horizontal movement of the movable object 2200 (e.g., without traveling down a runway). Optionally, the propulsion mechanisms 2206 can be operable to permit the movable object 2200 to hover in the air at a specified position and/or orientation. One or more of the propulsion mechanisms 2200 may be controlled independently of the other propulsion mechanisms. Alternatively, the propulsion mechanisms 2200 can be configured to be controlled simultaneously. For example, the movable object 2200 can have multiple horizontally oriented rotors that can provide lift and/or thrust to the movable object. The multiple horizontally oriented rotors can be actuated to provide vertical takeoff, vertical landing, and hovering capabilities to the movable object 2200. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 2200 (e.g., with respect to up to three degrees of translation and up to three degrees of rotation).

The sensing system 2208 can include one or more sensors that may sense the spatial disposition, velocity, and/or acceleration of the movable object 2200 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 2208 can be used to control the spatial disposition, velocity, and/or orientation of the movable object 2200 (e.g., using a suitable processing unit and/or control module, as described below). Alternatively, the sensing system 2208 can be used to provide data regarding the environment surrounding the movable object, such as weather conditions, proximity to potential obstacles, location of geographical features, location of manmade structures, and the like.

The communication system 2210 enables communication with terminal 2212 having a communication system 2214 via wireless signals 2216. The communication systems 2210, 2214 may include any number of transmitters, receivers, and/or transceivers suitable for wireless communication. The communication may be one-way communication, such that data can be transmitted in only one direction. For example, one-way communication may involve only the movable object 2200 transmitting data to the terminal 2212, or vice-versa. The data may be transmitted from one or more transmitters of the communication system 2210 to one or more receivers of the communication system 2212, or vice-versa. Alternatively, the communication may be two-way communication, such that data can be transmitted in both directions between the movable object 2200 and the terminal 2212. The two-way communication can involve transmitting data from one or more transmitters of the communication system 2210 to one or more receivers of the communication system 2214, and vice-versa.

In some embodiments, the terminal 2212 can provide control data to one or more of the movable object 2200, carrier 2202, and payload 2204 and receive information from one or more of the movable object 2200, carrier 2202, and payload 2204 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 2206), or a movement of the payload with respect to the movable object (e.g., via control of the carrier 2202). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 2208 or of the payload 2204). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 2212 can be configured to control a state of one or more of the movable object 2200, carrier 2202, or payload 2204. Alternatively or in combination, the carrier 2202 and payload 2204 can also each include a communication module configured to communicate with terminal 2212, such that the terminal can communicate with and control each of the movable object 2200, carrier 2202, and payload 2204 independently.

In some embodiments, the movable object 2200 can be configured to communicate with another remote device in addition to the terminal 2212, or instead of the terminal 2212. The terminal 2212 may also be configured to communicate with another remote device as well as the movable object 2200. For example, the movable object 2200 and/or terminal 2212 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 2200, receive data from the movable object 2200, transmit data to the terminal 2212, and/or receive data from the terminal 2212. Optionally, the remote device can be connected to the Internet or other telecommunications network, such that data received from the movable object 2200 and/or terminal 2212 can be uploaded to a website or server.

In some embodiments, a system for controlling a movable object may be provided in accordance with embodiments. The system can be used in combination with any suitable embodiment of the systems, devices, and methods disclosed herein. The system can include a sensing module, processing unit, non-transitory computer readable medium, control module, and communication module.

The sensing module can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module can be operatively coupled to a processing unit having a plurality of processors. In some embodiments, the sensing module can be operatively coupled to a transmission module (e.g., a Wi-Fi image transmission module) configured to directly transmit sensing data to a suitable external device or system. For example, the transmission module can be used to transmit images captured by a camera of the sensing module to a remote terminal.

The processing unit can have one or more processors, such as a programmable processor (e.g., a central processing unit (CPU)). The processing unit can be operatively coupled to a non-transitory computer readable medium. The non-transitory computer readable medium can store logic, code, and/or program instructions executable by the processing unit for performing one or more steps. The non-transitory computer readable medium can include one or more memory units (e.g., removable media or external storage such as an SD card or random access memory (RAM)). In some embodiments, data from the sensing module can be directly conveyed to and stored within the memory units of the non-transitory computer readable medium. The memory units of the non-transitory computer readable medium can store logic, code and/or program instructions executable by the processing unit to perform any suitable embodiment of the methods described herein. For example, the processing unit can be configured to execute instructions causing one or more processors of the processing unit to analyze sensing data produced by the sensing module. The memory units can store sensing data from the sensing module to be processed by the processing unit. In some embodiments, the memory units of the non-transitory computer readable medium can be used to store the processing results produced by the processing unit.

In some embodiments, the processing unit can be operatively coupled to a control module configured to control a state of the movable object. For example, the control module can be configured to control the propulsion mechanisms of the movable object to adjust the spatial disposition, velocity, and/or acceleration of the movable object with respect to six degrees of freedom. Alternatively or in combination, the control module can control one or more of a state of a carrier, payload, or sensing module.

The processing unit can be operatively coupled to a communication module configured to transmit and/or receive data from one or more external devices (e.g., a terminal, display device, or other remote controller). Any suitable means of communication can be used, such as wired communication or wireless communication. For example, the communication module can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module can transmit and/or receive one or more of sensing data from the sensing module, processing results produced by the processing unit, predetermined control data, user commands from a terminal or remote controller, and the like.

The components of the system can be arranged in any suitable configuration. For example, one or more of the components of the system can be located on the movable object, carrier, payload, terminal, sensing system, or an additional external device in communication with one or more of the above. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system can occur at one or more of the aforementioned locations.

As used herein A and/or B encompasses one or more of A or B, and combinations thereof such as A and B. It will be understood that although the terms "first," "second," "third" etc. may be used herein to describe various elements, components, regions and/or sections, these elements, components, regions and/or sections should not be limited by these terms. These terms are merely used to distinguish one element, component, region or section from another element, component, region or section. Thus, a first element, component, region or section discussed below could be termed a second element, component, region or section without departing from the teachings of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the figures. It will be understood that relative terms are intended to encompass different orientations of the elements in addition to the orientation depicted in the figures. For example, if the element in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the element in one of the figures were turned over, elements described as "below" or "beneath" other elements would then be oriented "above" the other elements. The exemplary terms "below" or "beneath" can, therefore, encompass both an orientation of above and below.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. An unmanned aerial vehicle (UAV), comprising:
a central body; and
a plurality of arms extendable from the central body, wherein each of the plurality of arms is configured to support one or more propulsion units;
wherein:
each of the plurality of arms is configured to transform between (1) a flight configuration in which the arm is extending away from the central body, and (2) a compact configuration in which the arm is folded against the central body;
at least one of the plurality of arms is rotatably coupled to a side surface of the central body via a joint and is configured to rotate about a first rotational axis and at least a portion of the at least one of the plurality of arms is configured to rotate about a second rotational axis not parallel to the first rotational axis, the first rotational axis extending through the joint in a direction substantially parallel to a first plane and intersect a second plane at an acute or obtuse angle, the first plane extending along a roll axis and a pitch axis of the UAV, the second plane extending along the roll axis and a yaw axis of the UAV; and the plurality of arms are parallel to each other when the plurality of arms are in the compact configuration.

2. The UAV of claim 1, wherein the second rotational axis is oblique to the first rotational axis.

3. The UAV of claim 1, wherein the second rotational axis is substantially perpendicular to the first rotational axis.

4. The UAV of claim 1, wherein the at least one of the plurality of arms includes a proximal portion coupled to the central body and a distal portion supporting one or more propulsion units, and wherein the distal portion is configured to rotate about the second rotational axis.

5. The UAV of claim 1, wherein a rotation of the at least one of the plurality of arms occurs about at least two of the axes selected from the group consisting of the yaw, roll, and pitch axes of the UAV.

6. The UAV of claim 1, wherein at least one of the plurality of arms is configured to be reversibly folded on a side of the central body when transforming from the flight configuration to the compact configuration.

7. The UAV of claim 1, wherein the one or more propulsion units include one or more rotor blades, and the one or more rotor blades supported by at least one of the plurality of arms are located against a side of the central body when the at least one of the plurality of arms is in the compact configuration.

8. The UAV of claim 1, wherein the central body comprises a head at one end of a roll axis of the central body and a tail at another end of the roll axis of the central body, and the head of the central body comprises a depression configured to receive a payload.

9. The UAV of claim 8, wherein the payload includes a camera.

10. The UAV of claim 1, wherein a proximal end of at least one of the plurality of arms is attached to the central body near or at a head of the central body.

11. The UAV of claim 1, further comprising one or more elastic elements, wherein each elastic element is configured to cause at least one of the plurality of arms to automatically retract when the at least one of the plurality of arms is reversibly folded to a predetermined state.

12. The UAV of claim 1, further comprising one or more elastic elements, wherein each elastic element is configured to cause at least one of the plurality of arms to automatically extend when the at least one of the plurality of arms is reversibly extended to a predetermined state.

13. The UAV of claim 1, wherein a first portion of the central body is configured to move with respect to a second portion of the central body when transforming between the flight configuration and the compact configuration.

14. The UAV of claim 13, wherein the first portion is configured to support at least one of the plurality of arms.

15. The UAV of claim 1, wherein a rotation of the at least one of the plurality of arms about the first rotational axis causes a distal end of the at least one of the plurality of arms to move both horizontally and vertically relative to the central body when transforming between the flight configuration and compact configuration.

16. The UAV of claim 1, wherein each of the plurality of arms is arranged such that the one or more propulsion units supported by the arm face a first direction when the arm is in the flight configuration, and face a second direction when the arm is in the compact configuration, wherein the second direction is different from the first direction.

17. The UAV of claim 16, wherein the second direction is substantially opposite to the first direction or substantially orthogonal to the first direction.

18. The UAV of claim 1, wherein at least another one of the plurality of arms is rotatably coupled to the central body via a cam pivot joint.

19. The UAV of claim 1, wherein the first rotational axis is disposed at an acute or obtuse angle to at least one of the roll, pitch, or yaw axis of the UAV.

* * * * *